United States Patent [19]

Neely et al.

[11] Patent Number: 5,214,711
[45] Date of Patent: May 25, 1993

[54] METHOD AND APPARATUS FOR DETECTING AND QUANTIFYING MOTION OF A BODY PART

[75] Inventors: John G. H. Neely, Edmond; John Y. Cheung, Oklahoma City, both of Okla.

[73] Assignee: Board of Regents of the University of Oklahoma, Norman, Okla.

[21] Appl. No.: 872,805

[22] Filed: Apr. 23, 1992

Related U.S. Application Data

[63] Continuation of Ser. No. 573,502, Aug. 24, 1990, Pat. No. 5,148,477.

[51] Int. Cl.[5] .............................................. G06K 9/00
[52] U.S. Cl. .................................. 782/6; 364/413.02; 364/413.27; 382/51
[58] Field of Search .................... 382/6, 54, 42, 30, 48, 382/44, 18, 1; 364/413.13, 413.16, 413.22, 413.23, 413.27, 413.02; 358/185

[56] References Cited

U.S. PATENT DOCUMENTS

| | | | |
|---|---|---|---|
| 4,430,749 | 2/1984 | Schardt | 382/54 |
| 4,437,161 | 3/1984 | Anderson | 382/6 |
| 4,635,293 | 1/1987 | Watanabe | 382/6 |
| 4,641,352 | 2/1987 | Fenster et al. | 382/54 |
| 4,685,146 | 8/1987 | Fenster et al. | 382/6 |
| 4,706,296 | 11/1987 | Pedotti et al. | 382/6 |
| 4,858,128 | 8/1989 | Nowak | 382/6 |
| 4,870,692 | 9/1989 | Zuiderveld et al. | 382/6 |
| 5,008,947 | 4/1991 | Yamada | 382/6 |

*Primary Examiner*—Joseph Mancuso
*Attorney, Agent, or Firm*—Dunlap, Codding & Lee

[57] ABSTRACT

A method for detecting and quantifying motion of a body part of an individual or animal, such as an individual's face or portion thereof. A digitized image of the body part in a reference position is produced (referenced image). A digitized image of the body part in a changed position then is produced (changed image). The referenced image is compared with the changed image to determine movement parameters indicating the movement of the body part from the referenced image to the changed image.

20 Claims, 3 Drawing Sheets

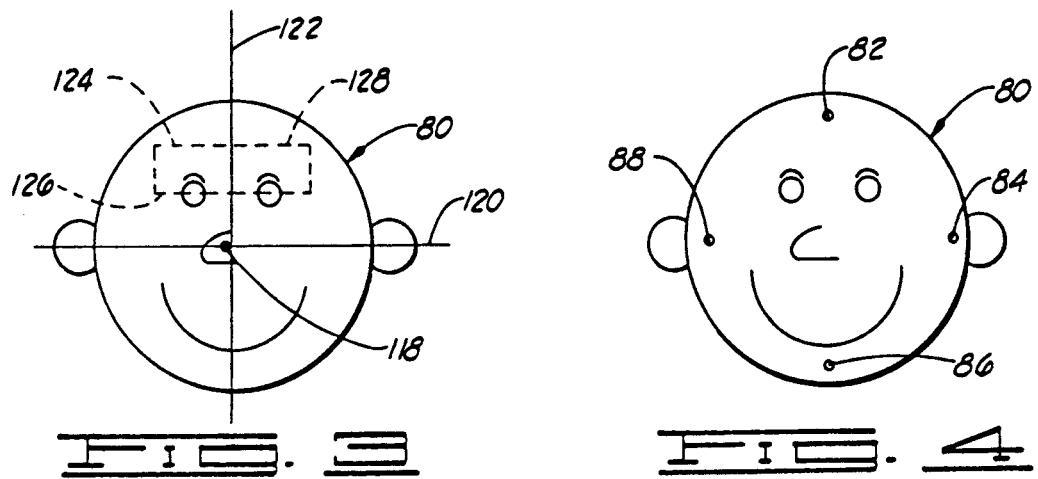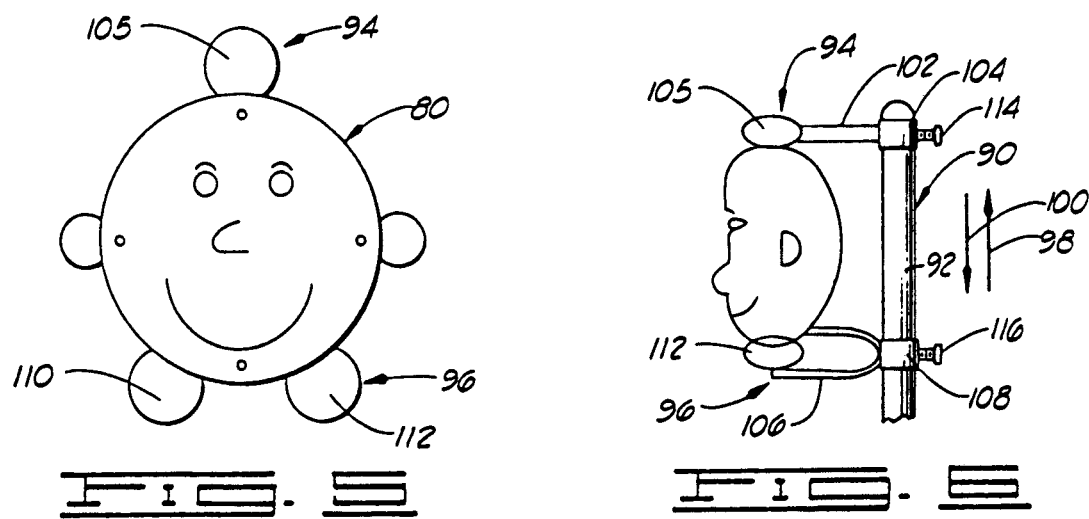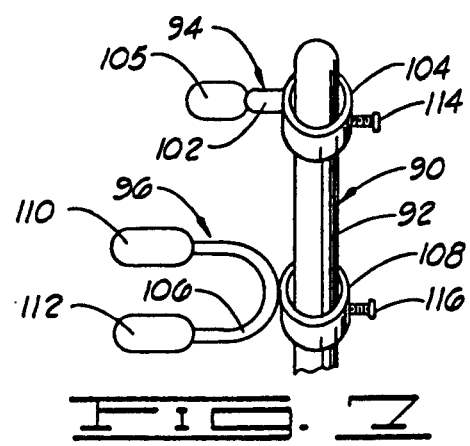

METHOD AND APPARATUS FOR DETECTING AND QUANTIFYING MOTION OF A BODY PART

This application is a continuation of U.S. Pat. Ser. No. 573,502, filed Aug. 24, 1990, now U.S.Pat. No. 5,148,977.

FIELD OF THE INVENTION

The present invention relates generally to methods for detecting and quantifying motion of a body part, and more particularly, but not by way of limitation, to a method for detecting and quantifying motion of a body wherein a digitized image of a body part in a control position is produced and a digitized image of the body part in a changed position is produced and the two images are compared to determine movement of the body part between the two digitized images.

BRIEF DESCRIPTION OF THE DRAWINGS

FIG. 3 is a diagrammatic view of an individual's or patient's face to be analyzed using the system of FIG. 1, and showing grid lines and areas of interest used in the system of FIG. 1 and showing such grid lines and areas of interest as they would appear on the screen of the computer monitor portion of the system shown in FIG. 1.

FIG. 4 is a diagrammatic view of the face of FIG. 3 with marker dots placed on the face for use in aligning frames to be compared which are used in one embodiment of the present invention.

FIG. 5 is a pictorial view of the face of FIGS. 3 and 4 showing the individual's head located in a head holder.

FIG. 6 is a side view of an individual with its head disposed in the head holder.

FIG. 7 is a partial perspective view of the head holder of FIGS. 5 and 6.

DESCRIPTION OF THE PREFERRED EMBODIMENTS

Figure 1:
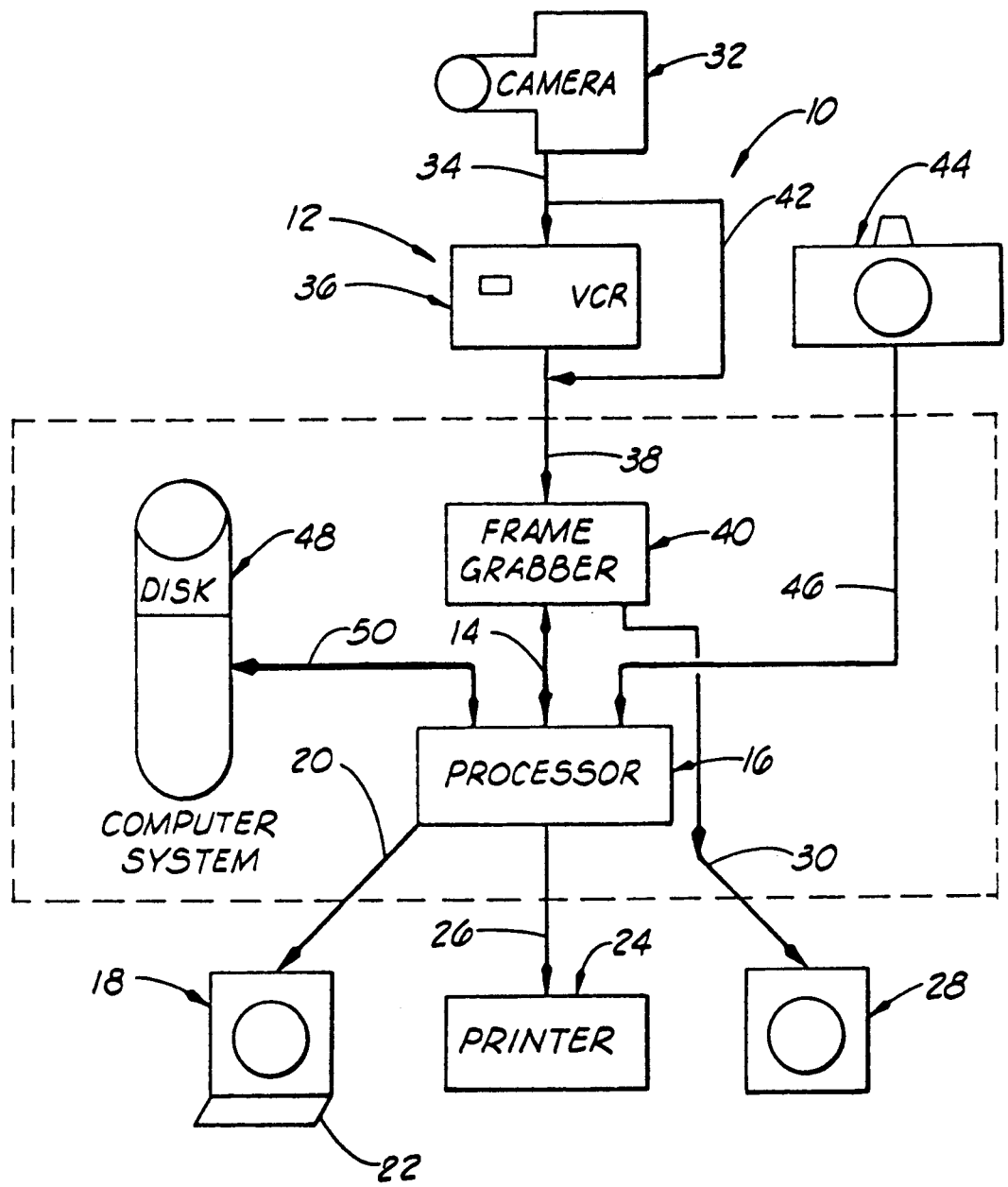
FIG. 1 is a diagrammatic, schematic view of the system of the present invention.

Treatment of paralysis, such as facial paralysis, has been confounded by lack of ability to measure in a quantitative fashion the degrees of paralysis or paresis, recovery, and abnormal movements such as synkinesis. The major difficulty in measuring movement is the complexity of the neural, muscular, and ultimately the biomechanical structure and characteristic of the skin and the underlined musculoaponeurotic system, thereby creating not only linear and curvilinear movements, but also the three dimensional deformations along the lines of maximum tension.

At present, the standardized technique for quantifying degrees of facial movement consist of the six point clinical grading scale proposed by John House, M.D. and adopted by the American Academy of Otolaryngology-Head and Nech Surgery. This grading scale is subjective, some what arbitrary and overlapping. There is no grading scale, clinical or otherwise, for synkinesis.

The system of the present invention provides a means for detecting and quantifying body parts and, more particularly, facial movements.

Using the motion analysis apparatus 10, movements such as facial and body movements, easily can be detected and quantified. Gradations in effort can be recognized and quantified. The variations in observer appreciated movement of the individual's face versus the pixel quantification between sides of the face and between maximum and minimum movement are valid. It has been found that test/retest measurement utilizing the same cursor designated area and same degree of maximal movement have been shown to be quite reliable. The results of the system described herein are applicable for detecting appreciable, under-appreciated and even unappreciated movements.

In some facial movement, such as the maximal movement of the nose superiorly as though one were sniffing a particularly unpleasant odor, not only is the expected nears movement noted, but additional accessory strategies which vary considerably among individuals may be observed. The present computer analysis system permits the separation of the accessory strategy movement from the requested movement and the analysis of these two movements in combination or separately.

The present system can separate brow movement into at least three components (forehead wrinkling, eyebrow movement and upper eyelid movement). The present system also can analyze these movements individually or collectively.

The system of the present invention can identify three components of eye closure (upper eye lid movement, lower eye lid movement, and surrounding orbicularis oculi movement) and analyze these components individually or collective.

The system of the present invention also can detect several components of smiling at cites around the mouth and distant from it. For example, movement of the commissure, movement of the nasolabial fold, movement of the eye and upper cheek, movement along the distribution of the zygomaticus major.

The system of the present invention can identify and measure movement in secondary areas to the primary area of requested movement thereby allowing quantitative measurement of abnormal facial movement, such as synkinesis.

It should be noted that, although the system of the present invention has been described herein, in some instances, with specific reference to detecting and quantifying facial movements, the system of the present invention is useable for detecting and quantifying motion of any body part. The references herein to facial movements are not to be construed as limiting the present invention to facial movement. The present invention also is useful for analyzing motion of a body part of an animal.

Shown in FIG. 1 is a diagrammatic, schematic view of a motion analysis apparatus 10 which is constructed in accordance with the present invention. The motion analysis apparatus 10 includes an image producing means 12 which is constructed and adapted to produce a digitized image of the body part and to output the digitized image over a signal path 14. The digitized image outputted over the signal path 14 is inputted into a processor 16. The processor 16 processes the digitized image in a manner to be described in greater detail herein.

A computer monitor 18 is connected to the processor 16 via a signal path 20. The computer monitor 18 includes a keyboard 22. A printer 24 is connected to the processor 16 via a signal path 26. The processor 16 is adapted to output images in a printer readable format over the signal path 26 and the printer 24 is adapted to output the images received from the processor 16 in a human perceivable printed format.

A display monitor 28 also is connected to the processor 16 for receiving an image from the processor 16 via a signal path 30 and for displaying the received image.

The image producing means 12, more particularly, comprises a video camera 32. The video camera 32 responds to the intensity of light reflected off an image. The light intensity is converted into an analog signal by the video camera 32. The brighter the light intensity, the higher the amplitude of the analog signal. The video camera 32 produces the video images in the analog format and outputs the video images in the analog format over a signal path 34.

The video images in the analog format are inputted into a video cassette recorder 36. The video cassette recorder 36 records on a video medium the video images in the analog format received from the video camera 32 on a video tape.

The video images in an analog format are outputted by the video cassette recorder 32 over a signal path 38. The video images outputted by the video cassette recorder 36 are inputted into a frame grabber 40. The video images outputted by the video camera 32 and the video cassette recorder 36 consist of a number of individual frames. The frame grabber 40 includes a high speed analog to digital converter and a high speed digital to analog converter. The frame grabber 40 is constructed to capture a single frame of the video images outputted by the video cassette recorder 36 in the analog format and to digitize each scan line in the captured frame to produce a digitized image which is outputted over the signal path 14. In the frame grabber 40 each scan line is sampled at a constant rate. The amplitude of the analog signal which corresponds to the light intensity at that spot of the image now is represented by a digital number. The more light intensity there is at a given spot of the image, the higher the digital number. Each spot is called a pixel (image element) and the corresponding digital number is the value of that pixel.

In the alternative, the video images in the analog format are outputted via the video camera 32 over the signal path 34 and over a signal path 42 whereby the video images in the analog format are directly inputted into the frame grabber 40. In this last mentioned instance, the video cassette recorder 36 is by-passed and a video tape record is not necessarily maintained of the video images outputted by the video camera 32. In either instance, the frame grabber 40 digitizes the video images in the analog format and outputs the digitized images over the signal path 14.

In the alternative, the body part to be analyzed is recorded via a camera 44 which is adapted to produce a still image or frame in a digitized format of the photographed body part and to output the still frame in a digital format, a digitized image. Thus, the camera 44 outputs the digitized image over a signal path 46.

The processor 16 is connected a disk storage 48. The digitized images outputted by the camera 44 over the signal path 46 or the digitized images outputted by the frame grabber 40 over the signal path 14 can be inputted into the disk storage 48 over a signal path 50 and stored therein as directed by the processor 16.

In general, an individual is placed in front of the video camera 32 and the video camera 32 is focused on the body part to be analyzed. The body part to be analyzed is positioned in a reference or control position. The individual then moves the body part to be analyzed to a changed position. It should be noted that it may be desirable to move the body part to be analyzed from the control position to the changed position and back to the control position in some applications. Also, it may be desirable to have the individual repeat the movement a number of times so the operator will have a number of images from which to select the desired images for processing.

The video camera 32 produces the video images in the analog format of the body part to be analyzed through the movement of the body part from the reference position to the changed position. These video images outputted by the camera 32 are recorded on video tape by the recorder 36 or directly inputted into the frame grabber 40. If recorded on tape by the video cassette recorder 36, the recorded video images then are played back and outputted by the video cassette recorder 36 and inputted into the frame grabber 40.

The video images in the analog format are outputted from the frame grabber 40 via the signal path 30 to the video monitor 28. Each frame of the video images also are digitized to produce a series of digitized images and the digitized images are outputted from the frame grabber 40 over the signal paths 14 and 50 and inputted in disk storage 48, as directed by the processor 16.

When it is desired to analyze the images, the digitized images are outputted from disk storage 48 over the signal path 50 and inputted into the frame grabber 40, as directed by the processor 16. The frame grabber 40 converts the digitized images to video images in the analog format. The video images in the analog format are outputted over the signal path 30 and inputted into the video monitor 28 where the video images are displayed. More particularly, the frame grabber 40 and the processor 16 are adapted to sequence through the digitized images frame by frame and each frame sequentially is displayed on the video monitor 28. The operator using the keyboard 22 instructs the processor 16 to cause the frames sequentially to be displayed.

In this capture mode of operation, the operator can select either one of two modes of operation: a select pair mode or a select sequence mode. In the select pair mode, the operator sequences through the images, while viewing each image on the video monitor 28, until the operator is satisfied that a particular frame represents a good image of the body part in the control position. The operator then operates the keyboard 22 to instruct the processor 16 to output a capture code over the signal path 14 which is inputted into the frame grabber 40. In response to receiving the capture code, the frame grabber 40 captures the frame and this captured frame in a digitized format is outputted by the frame grabber 40 is marked and stored in the processor 16 memory or inputted into the disk storage 48 where it is identified as a digitized control frame or digitized control image.

In the select pair mode, the operator then continues to sequence through the frames until the operator is satisfied that a particular frame represents a good image of the body part in the changed position. The operator then causes the capture code to be outputted by the processor 16. In response, the frame grabber 40 outputs the captured frame in the digitized frame which is stored in the processor 16 memory or inputted into the disk storage 48 where it is identified as a digitized moved frame or digitized changed image.

The operator then instructs the processor 16 by way of the keyboard 22 to process the selected control frame and the selected changed frame. In the process mode of operation, the processor 16 causes the digitized control image and the digitized changed image to be withdrawn from disk storage 48 into the processor 16 memory if they are not already previously stored in the processor 16 memory. The processor 16 then compares the digitized control image to the digitized changed image and the processor 16 produces a digitized compare frame or digitized compare image which is indicative of the movement of the body part from the control frame or image to the moved or changed frame of image. The processor 16 is programmed to determine movement parameters indicative of the movement from the control image relative to the changed frame or image and to output the movement parameters, as well as to cause the digitized compare image to be processed through frame grabber 40 which outputs the compare image in the analog format. The compare image in the analog format is outputted over the signal path 30 for display on the video monitor 28.

In addition, the determined movement parameters are outputted over the signal paths 14 and 20. The determined movement parameters are displayed on the computer monitor 18 screen. The processor 16 also can cause the determined movement parameters, as well as the compare image, to be outputted on the signal path 26 for outputting the compare image and the determined movement parameters in the printed format via the printer 24.

As mentioned before, the operator also can select the select sequence mode of operation, rather than the select pair mode of operation just described. In the select sequence mode of operation, the video images are produced and each frame of the video images is digitized via the frame grabber 40 and stored in the processor 16 memory or disk storage 48 in a manner exactly like that described before with respect to the select pair mode of operation.

In the select sequence mode of operation, the operator sequences through the images while viewing each image on the video monitor 28. Using the keyboard 22, the operator selects a particular frame which represents a good image of the body part in the control position and the operator instructs the processor 16 to mark the selected frame.

After selecting the control frame, the operator then sequences through the frames and selects a plurality of moved or changed frames. For example, the operator may select a plurality of moved or changed frames between the control frame showing the body part in the control position through the frames showing the body part in the changed position, and back through a frame showing the body part in a position similar to the control position.

The control frame and the moved or changed frames each are assigned a number. In one present embodiment of the invention, up to thirty-six frames can be selected as the control frame and the moved or changed frames. The number of frames that can be selected is limited only by the availability of the processor 16 memory. The selected control frame and each of the selected moved or changed frames are stored in the disk storage 48 along with a reference number identifying each of the selected frames.

The operator then instructs the processor 16 by way of the keyboard 22 to process the selected frames. The processor 16 is conditioned in the process mode of operation in response to this command.

In the process mode of operation, processor 16 causes the digitized control frame and the next selected moved frame to be withdrawn from disk storage 48 into the processor 16 memory if they are not previously stored there already. The processor 16 then compares the digitized control image or frame to the digitized changed image or frame and the processor 16 produces a first digitized compare frame or first digitized compare image which is indicative of movement of the body part from the control frame or image to the moved or changed frame or image. The processor 16 also is programmed to determine movement parameters indicative of the movement change from the control frame or image relative to the moved or changed frame or image.

The processor 16 then compares in sequence each of the moved or changed frames or images with the control frame or image to produce a plurality of digitized compare frames or images, each of which is indicative of the movement of the body part between the control frame or image and each respective moved or changed frame. The processor 16 is programmed to determined movement parameters indicative of the movement change from the control frame or image relative to each of the moved frames or images. The movement parameters determined by the processor 16 are outputted by the processor 16 over the signal path 20 and displayed on the screen of the computer monitor 18. In addition, the movement parameters indicative of movement change can be outputted over the signal path 26 and printed by the printer 24 to provide a list of the determined parameters in a printed format.

Video cameras such as the video camera 32, video cassette recorders such as the video cassette recorder 36 and cameras such as the camera 44 are all well known in the art and a detailed description of the construction and operation of these components is not deemed necessary. The format of the video tape used in the video cassette recorder 36 can be Beta, VHS, PAL, or ½" or ¾" video tape or any other suitable video tape format. Also it should be noted that a video disk recorder can be used in lieu of the video cassette recorder.

Frame grabbers which are constructed to operate in a manner described herein with respect to the frame grabber 40 are well known in the art and a detailed description of the construction and operation of such frame grabbers is not deemed necessary. For example, one frame grabber suitable for use with the present invention is a frame grabber sold by Data Translation, and identified by Model DT-2853. This frame grabber is constructed to receive video images and to receive capture commands and to isolate and capture a selected frame in the video images received by the frame grabber as instructed by the received capture command. This commercially available frame grabber also is adapted to digitize each scan line in the selected or capture frame. This type of frame grabber also is constructed to receive digitized images and convert such digitized images to their analog formats for viewing in human perceivable forms such as via the display monitor 28.

A processor such as the general purpose digital computer available from Master Systems, Model Executive AT has been found suitable for use as the processor 16 of the present invention. This processor was used in connection with a disk storage commercially available Seagate, Model 225, and this system was found suitable for use in the present invention.

It should be noted that there are available other types of frame grabbers which can be used to combine the digital image with messages from the processor 16 using a digital video interactive (DVI) protocol. In this case, only one high resolution video monitor is required. Further, in lieu of the keyboard 22 used with the computer monitor 18, an optional interface box with push buttons can be used to communicate with the processor 16.

To detect motion, the subregions of the same image that have been moved need to be identified. This requires at least two images. The first one is referred to herein as the control image or control frame. The second image is the changed image where subregions of the body part have been relocated referred to herein as the moved image or moved frame. In the case of facial motion analysis, the control image can be the face at rest while the second or moved image can be the face after a specific feature, such as the eyebrow, has been moved. Alternatively, the comparison also can be made between the left half and the right half of the same image or frame.

In the processing mode of operation, the processor 16 preforms four distinct processes: (1) image pre-processing; (2) motion detection, (3) image post processing and (4) measurement.

IMAGE PRE-PROCESSING

In the image pre-processing step, digitized images are processed to yield a consistent image quality. This is an optional step. Due to differences in lighting between images and between the various features of the image, pre-processing is necessary to equalize or normalize the pixel ranges of the digitized images or frames. The lighting can be changed from one image to another at the same photo session or between series of images. The equalization process compensates for the varying intensity and minimizes the shadow zones often occurring from three dimensional objects. In the system of the present invention, the equalization process is accomplished by equalizing the histogram of pixel values into a specific distribution. This equalization step produces images that have an average intensity throughout and with a specific distribution of pixel intensity variations.

The captured images are usually taken under varying lighting conditions dependent on the environmental setting. Even when the setting is carefully controlled, the light reflected from the face also may vary according to the complexion, skin color, head shape, skin texture and other facial features. Therefore, it is essential to normalize the intensity of the image. From the existing intensity histogram, the pixel levels are remapped to give a specific histogram shape such as a bell curve, a Poisson curve, a linear curve, a logarithmic curve, or a user defined curve. In the present invention, a bell curve was utilized so that the equalized images had the same average intensity and the same intensity deviation for later comparsions between two images or between sets of images.

MOTION DETECTION

After pre-processing the images or frames, the subregions of the image or frame that are different between images are highlighted. This is done by comparing two images or frames and removing areas that are common in the two images or frames. When the common or subregions are suppressed, only the regions that have been moved remain. This is the main operation for detecting motion. By examining the two images, the common area can be subtracted out thus leaving a small residual pixel value. In an idea case, if the two images were identical, there would be no residual value for all pixels. If any subregion in the image have been relocated, a substantial difference in pixel values results after the subtraction. The relocated region can now readily be differentiated by their pixel values from the other common regions.

After the subtraction of the two images, negative values may arise. Three methods are possible for handling such negative values: (1) negative values are treated as zero; (2) negative values are changed to absolute values; and (3) all values are scaled and offset to eliminate negative values. When negative values are treated as zero, most moved regions are highlighted. When negative values are changed to absolute values, a true difference between two images or frames is obtained. This last mentioned scheme may provide more accurate assessment of the moved regions. When all values are scaled and offset to eliminate the negative values, the difference in images or frame seen may be advantageous for some type of measurement. In the system of the present invention, negative values were changed to absolute values.

IMAGE POST PROCESSING

After the common areas between images have been removed, the last step is image post processing. This is an optional step. In this step, an image enhancement process first is utilized to bring out the regions that have been moved. Then, a digital filter in software may be used to clean up unwanted and spurious spots in the image.

For image enhancement, it is desirable, after image subtraction, to highlight the moved regions for visual study and verification. The subtracted image may be enhanced through a number of techniques: (1) contrast enhancement, or (2) thresholding. In contrast enhancement, the subtracted image is enhanced so that the brighter regions appear to be more bright. This essentially is a histogram equalization process. In thresholding, the gray scale is divided so that the pixels above a certain threshold appear extremely bright, while those pixels below the threshold appear extremely dark. In other words, the image is thresholded so that a small residual errors in the common regions are replaced by a null value, while those pixels representing the dislocated or moved regions that are above the threshold are amplified to the maximum values. The common regions have zero pixel values and the dislocated or moved regions have maximum pixel values. The thresholding can be set manually or automatically. In one embodiment of the present invention, thresholding was utilized in the image post processing step and the threshold values were set manually by the operator using the keyboard 22.

It is not unusual that, after the image substraction process and the image enhancement process, many spurious points may remain in the image. The spurious points are usually isolated points placed randomly around the image. Therefore, a further step in post processing is to remove these isolated, spurious points. This may be done by a cleansing filter such as a Sobel filter that sharpens the enhanced regions and deemphasizes the isolated points. At this stage of the process, the remaining image or frame is ready for quantitative measurements.

MEASUREMENT

The final step is to quantify (determine the movement parameters) the regions of interest and to measure the movement in terms of the brightness of the subtracted image. This quantification step can be accomplished in a number of different ways. Two possible approaches are pixel counting and area integration. In pixel counting, the area of movement is measured by the number of pixel above a certain threshold. Therefore, the moved region is approximated by counting the number of pixels above the threshold. In area integration, the moved region is approximated by the summation of the actual subtracted values, i.e., the difference of the two images in gray level. The last mentioned approach may be more indicative of the movement and possibly the effort of movement. In one operational embodiment of the present invention, pixel counting was used to quantify the regions of interest and to measure the movement in terms of the brightness of the subtracted image.

Figure 2:
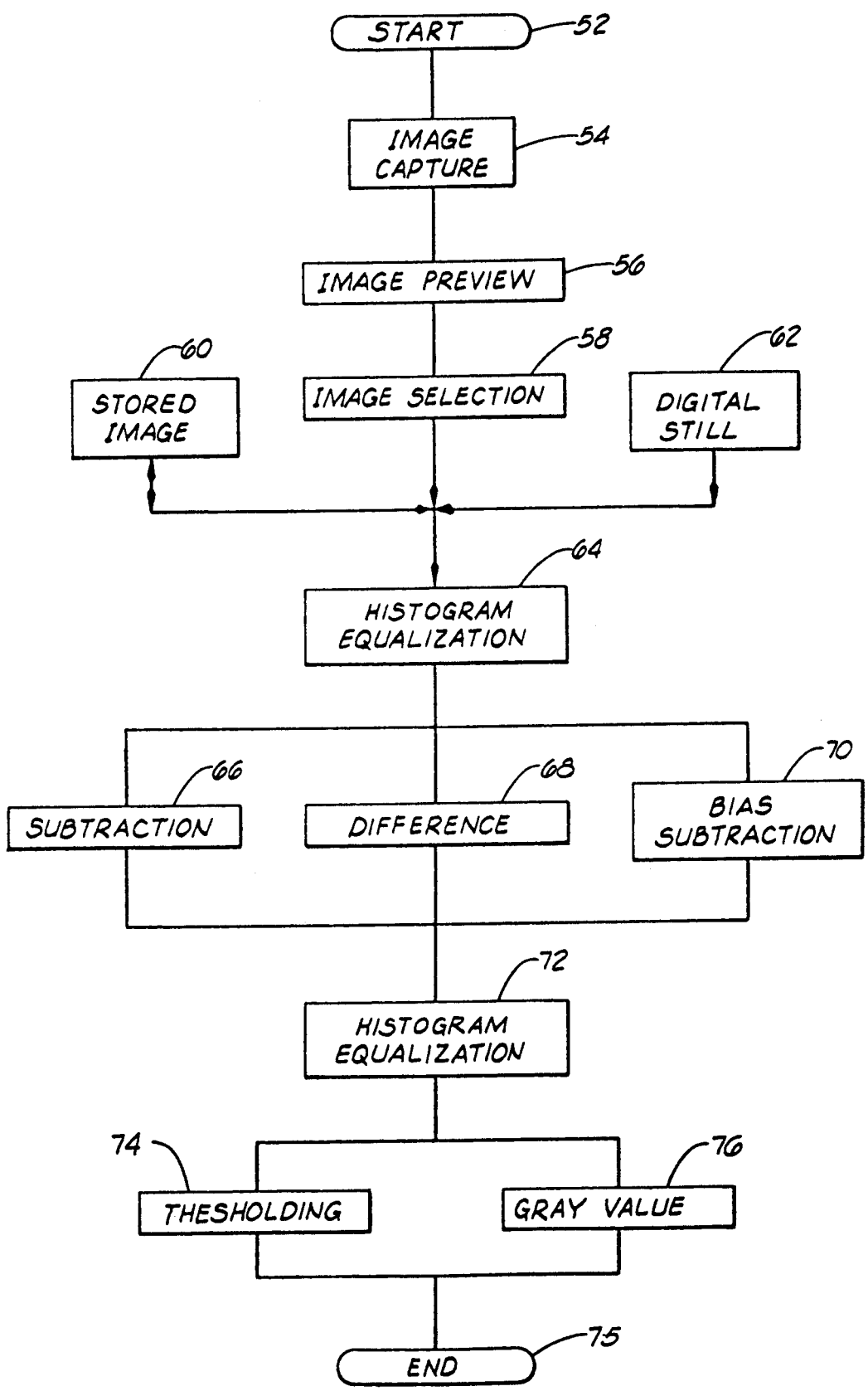
FIG. 2 is a flow chart diagrammatic illustrating the program used in connection with the processor shown in FIG. 1.

Shown in FIG. 2 is a diagrammatic view of the software or processing operations performed via the processor 16. In other words, the processor 16 is programmed to operate in this manner.

The program in the processor 16 first is invoked and initialized (START 52 in FIG. 2). In response to receiving a capture code inputted into the processor 16 via the computer keyboard 22 by the operator, the processor 16 is conditioned in the capture mode of operation (Image Capture 54 in FIG. 2).

In the capture mode of operation, the digitized images are captured and transferred to the processor memoy and optionally the disk storage 48.

After the digitized images have been captured, the captured images can be previewed on the display monitor 28 (Image Preview 56 in FIG. 2) to insure that the digitized images of interest have in fact been captured and stored.

After previewing the digitized images, the operator can select the particular images to be stored for later selection and processing (Image Selection 58 in FIG. 2). It should be noted that during the image preview 56 or the image selection 58, the digitized images are reconverted into images visually perceivable in a human viewable format and outputted on the video monitor 28. The operator or user then uses the keyboard 22 of the computer monitor 18 to effect the selection of images being displayed on the display monitor 28. The selected digitized images are stored in the disk storage 48 as controlled by the processor 16 (Stored Image 60 in FIG. 2) or the digitized images may be inputted directly from the camera 44 (Digital Still 62 in FIG. 2).

In any event, the selected digitized control image and the selected digitized moved or changed image are taken either from the disk storage 48 where the images previously have been stored or from the frame grabber 40 where the images were just captured or from the digitized still camera 44. The images to be analyzed by the processor 16 are selected by the user and the user marks the areas of interest in the selected digitized control image and the selected digitized changed image. The digitized control image and the digitized changed image then are processed via the processor 16.

In the process mode of the processor 16, the selected images (a selected digitized control image and the selected digitized changed images) are screened and analyzed to remove various artifacts. The purpose of this step is to eliminate white spots and to account for any differences in skin pigmentation, uneven lighting reflection and undesirable image translation. The primary tool used to accomplish this step is histogram equalization indicated in FIG. 2 by the reference numeral 64.

After histogram equalization 64, the digitized control image and the digitized changed image are compared through a substraction process (Subtraction 66 in FIG. 2) or a difference process (Different 68) or a biased subtraction process (Bias Subtraction 70) to produce a digitized compare image. The digitized compare image then is processed to remove artifacts and the moved regions in the digitized compare image are enhanced. This step is accomplished by way of histogram equalization 72.

After histogram equalization 72, the digitized compare image is processed to quantify the movement either through the counting of threshold pixels (Threshold 74 in FIG. 2) or through integration of pixel gray values in the area of interest (Gray Value 76 in FIG. 2). After the measurement step, the processor 16 software returns to the main menu for further processing (END 75 in FIG. 2).

It should be noted that at any step in the image capture or processing or detection or post processing or measurement steps, the operator has the option to return to the main menu.

Set forth below is the program which was used to operate the processor 16 in one operational embodiment of the present invention.

```
#define MAX_LINE            512
#define MAX_PIXEL           512
#define NOVE_LENGTH         512*100
#define IMAGE_BOARD_BASE    0XA00000
#define PROTECT_MODE_INT    0x15
#define P_MODE_DATA_MOVE    0x87
#define INCSR1      0x230
#define INCSR2      0x232
#define OUTCSR      0x234
#define CURSOR      0x236
#define INDEX       0x238
#define INLUT       0x23A
#define REDGRN      0x23C
#define BLUE1       0x23E
```

```c
#define ACCESS_RIGHT  0x93
#define SOURCE        18
#define TARGET        26
#define FROM_BOARD    0
#define TO_BOARD      10
struct  adsmem (unsigned offset ;
                unsigned segment ;);
struct  ad3mem (unsigned char low;
                unsigned char mid;
                unsigned char hi;);
union   SO_ADDR (struct adsmem v_addr;
                 unsigned char far *ptr;);
union   DW_ADDR (struct ad3mem separated;
                 unsigned long integral;);

#include "windows.h"
#include "image1.h"
#include <stdio.h>
#include <dos.h>
#include <graph.h>
#include <stdlib.h>
#include <bios.h>
#define BUF_LEN 0x8000
#define INIT_Y 256
#define INIT_X 238
#define TRUE 1
#define FALSE 0
union REGS inregs,outregs;
char message[80];
char string[14];
char frame[14];
FILE *fp;
char frame_array[2];
unsigned int row,col,row1,col1,cent_row,cent_col;
long vector;
unsigned char first_byte,random;
char string[14]="TESTING";
unsigned char buffer[BUF_LEN];
unsigned char buffer1[BUF_LEN];
int choice;
char fin,fin1,fin2,print_flag;
FILE *fp;
int name_length,frame_number,pair_no,
starting_frame,ending_frame,ref_frame;
long gray_val[256];
int thresh;
int left_x[10];
int left_y[10];
int right_x[10];
int right_y[10];
char reference_pair;
char no_box = -1;
int quad_left_x[4];
int quad_left_y[4];
int quad_right_x[4];
int quad_right_y[4];
```

```
unsigned short int x,y,i,j,k;
int count;
long frame_quad[36][4];
long box_quadl[36][5];
long box_quadr[36][5];
long frame_pixel[36][4];
long box_pixell[36][5];
long  box_pixelr[36][5];
union REGS regs,outregs;
struct SREGS segregs;
unsigned char GDT[48];
union   SO_ADDR GDT_addr,buffer_addr;
union   DW_ADDR source,target,board_addr,converter;
char first_capture = FALSE,first_retrieve=FALSE;
float new_thresh,new_thresh1;
long white1,white2,white3,white4;
char first_pair[36];
char second_pair[36];
char selected,side;
long start_frame[37]={
0,0x200000,0x240000,0x280000,0x2C0000,
   0x300000,0x340000,0x1C0000,0x3C0000,
   0x400000,0x440000,0x480000,0x4C0000,
   0x500000,0x540000,0x580000,0x5C0000,
   0x600000,0x640000,0x680000,0x6C0000,
   0x700000,0x740000,0x780000,0x7C0000,
   0x800000,0x840000,0x880000,0x8C0000,
   0x900000,0x940000,0x980000,0x9C0000,
   0xA00000,0xA40000,0xA80000,0xAC0000};
struct mitem {int r;
   int c;
   char *t;
   int rv;};
struct pmenu {WINDOWPTR wpsave;
int winopn;
int lndx;
int fm;
int lm;
struct mitem scrn[25];};
static struct pmenu mainmenu = {00,FALSE,00,
00,02 ,{
02,19,"CAPTURE MODE",1,
03,19,"PROCESS",2,
04,19,"EXIT",3,
011,00,"_____
_____",0,
012,00,"Use Arrow Keys To Select      Hit Return To
Execute",0,
99,99," ",99}};
static struct pmenu capture = {00,FALSE,00,
00,02,{
02,19,"PROCEED",1,
03,19,"CHANGE PARAMETERS",2,
04,19,"RETURN TO PREVIOUS MENU",3,
011,00,"_____
_____",0,
012,00,"Use Arrow Keys To Select      Hit Return To
```

```
Execute",0,
99,99," ",99)};
static struct pmenu loadstore = (00,FALSE,00,
00,04,(
02,19,"RETRIEVE FROM DISK",1,
03,19,"SAVE TO DISK",2,
04,19,"COMPOSITE VIEW",3,
05,19,"INDIVIDUAL VIEW",4,
06,19,"RETURN TO PREVIOS MENU",5,
011,00,"_____
_____",0,
012,00,"Use Arrow Keys To Select     Hit Return To
Execute",0,
99,99," ",99)};
static struct pmenu process = (00,FALSE,00,
00,02,(
02,19,"SELECT",1,
03,19,"PROCESS",2,
04,19,"RETURN TO PREVIOUS MENU",3,
011,00,"_____
_____",0,
012,00,"Use Arrow Keys To Select     Hit Return To
Execute",0,
99,99," ",99)};
static struct pmenu configuration = (00,FALSE,00,
00,02,(
02,19,"PROCEED",1,
03,19,"CHANGE PARAMETERS",2,
04,19,"RETURN TO PREVIOUS MENU",3,
011,00,"_____
_____",0,
012,00,"Use Arrow Keys To Select     Hit Return To
Execute",0,
99,99," ",99)};
static struct pmenu proceed = (00,FALSE,00,
00,02,(
02,19,"NORMAL FRAME RATE",1,
03,19,"SLOW FRAME RATE",2,
04,19,"RETURN TO PREVIOUS MENU",3,
011,00,"_____
_____",0,
012,00,"Use Arrow Keys To Select     Hit Return To
Execute",0,
99,99," ",99)};
static struct pmenu st_capture = (00,FALSE,00,
00,03,(
02,19,"CAPTURE",1,
03,19,"COMPOSITE VIEW",2,
04,19,"INDIVIDUAL VIEW",3,
05,19,"RETURN TO MAIN MENU",4,
011,00,"_____
_____",0,
012,00,"Use Arrow Keys To Select     Hit Return To
Execute",0,
99,99," ",99)};
static struct pmenu pairs = (00,FALSE,00,
```

```
00,02,(
02,19,"RANDOM PAIRS",1,
03,19,"SERIES",2,
04,19,"RETURN TO PREVIOUS MENU",3,
011,00,"_____
_____",0,
012,00,"Use Arrow Keys To Select     Hit Return To
Execute",0,
99,99," ",99)};
static struct pmenu proces_sel = (00,FALSE,00,
00,04,(
02,19,"REVIEW SELECTION",1,
03,19,"SELECT REFERENCE",2,
04,19,"PROCESS - START",3,
05,19,"REVIEW RESULTS",4,
06,19,"RETURN TO PREVIOUS MENU",5,
011,00,"_____
_____",0,
012,00,"Use Arrow Keys To Select     Hit Return To
Execute",0,
99,99," ",99)};
static struct pmenu ref_menu = (00,FALSE,00,
00,02,(
02,5,"LEFT",1,
03,5,"RIGHT",2,
04,5,"RETURN TO PREVIOUS MENU",3,
011,00,"_____
_____",0,
012,00,"Use Arrow Keys To Select     Hit Return To
Execute",0,
99,99," ",99)};
static struct db (char frame_rt[2];
int frame_rate;
char slow_frame_rt[2];
int slow_frame_rate;
char no_of_frames[2];
int num_frames;
) rec;
static struct db1(char filename[8];)rec1;
char pat_name[8];
char card_no[8];
static struct db2(char response[1];)rec2;
static struct db3(
char response[2];
int ref_pair_no;
)rec3;
struct db5(char filename[13];)rec5;
struct db6(
char date[10];
int month,day,year;
char tno[4];
int tapeno;
char area_exm[15];
)rec6;
char area_examined[15];
int month,day,year;
```

```
int tape_no;
char box_string[5][15];
char fchar,selected;
int frame_rate;
WINDOWPTR w1,w2,w3,w4,w5,w6,w7,w8,w9,w10,
w11,wn,wn1,wn2,wn3;
WIFORM frm,frm1,frm2;
int batrib,attr,attr1,atrib;
int watrib,rv,rv1,rv2,rv3;
char finish,fin,fin1,fin2;
union inkey{char ch[2];
        int i;}c;
int pair_no;
char title[20];
char c1;
char disk_flag;
char file_name[20];
long find_pixel(row,col,row1,col1,choice)
unsigned row,col,row1,col1;
char choice;
{
unsigned int i,j , pixel;
long white;
long num_buf,target1,num_buf1;
white = 0;
target1 =0x100000;
num_buf = row /64 ;
target1 += num_buf * 0x8000;
num_buf1 = row - num_buf *64;
if(row1 < (num_buf +1 )*64) j = row1 -num_buf*64 +1;
else j = 64;
source.integral = target1;
buffer_addr.ptr = buffer;
move_one(1);
for(k=num_buf1;k < j;k++)
{
for(i=col;i<col1;i++)
{
switch(choice)
{
case 0:
pixel = i+k*512;
if(buffer[pixel] != 0)
white++;
break;
case 1:
pixel =i+k*512;
white += buffer[pixel];
break;
}}}
num_buf = row/64;
num_buf = (num_buf + 2) *64;
while(num_buf < row1)
{
target1 +=0x8000;
source.integral = target1;
```

```c
buffer_addr.ptr = buffer;
move_one(1);
for(k=0;k<64;k++)
{
for(i=col;i<col1;i++)
{
switch(choice)
{
case 0:
pixel = i+k*512;
if(buffer[pixel] == 0xff)
white++;
break;
case 1:
pixel = i+k*512;
white +=buffer[pixel];
break;
}}}
num_buf += 64;
}
target1 += 0x8000;
source.integral = target1;
buffer_addr.ptr = buffer;
move_one(1);
num_buf -=64;
num_buf =row1-num_buf;
if(num_buf > 0)
{
for(k=0;k<num_buf;k++)
{
for(i=col;i<col1;i++)
{
switch(choice)
{
case 0:
pixel = i+k*512;
if(buffer[pixel] == 0xff)
white++;
break;
case 1:
pixel = i+k*512;
white +=buffer[pixel];
break;
}}}}
return(white);
}
main()
{
strcpy(title,"MAIN MENU");
init();
finish = 0;
fin = 0;
fin1 =0;
wn_init();
batrib = v_setatr(BLUE,WHITE,0,BOLD);
watrib = v_setatr(WHITE,BLACK,0,BOLD);
```

```
attr= v_setatr(BLUE,RED,0,BOLD);
attr1 =v_setatr(RED,WHITE,0,BOLD);
w1 = wn_open(0,0,0,76,23,watrib,batrib);
if(!w1) exit(1);
wn_title(w1,"NeC-MAS");
wn_putsa(w1,10,30,"NeC-MAS",attr);
wn_putsa(w1,12,15,"THE NEELY-CHEUNG MOTION ANALYSER
SYSTEM",attr1);
v_getch();
do
{
rv=popup(0,5,15,51,11,batrib,batrib,&mainmenu,FALSE,
 title);
switch(rv)
{
case 1:
capture_frame();
break;
case 2:
do
{
strcpy(title,"PROCESS MODE");
rv1=popup(0,6,15,51,11,batrib,batrib,&process,FALSE,
 title);
switch(rv1)
{
case 1:
do
{
strcpy(title,"SELECT PAIRS");
rv2=popup(0,7,15,51,11,batrib,batrib,&pairs,FALSE,
 title);
switch(rv2)
{
case 1:
pair_no = -1;
count =1;
do
{
pair_no += 1;
w3 = wn_open(0,9,25,45,14,(BLUE << 4 | YELLOW |
BOLD),(BLUE << 4|WHITE|BOLD));
wn_title(w3,"SELECT PAIRS");
if(!w3) exit(1);
wn_putsa(w3,2,2,"USE ARROW KEYS TO PACE THROUGH
FRAMES",batrib);
wn_putsa(w3,3,3,"PRESS RETURN TO SELECT FIRST
FRAME",batrib);
wn_putsa(w3,5,8,"SHOWING FRAME ",attr);
wn_locate(w3,5,25);
wn_printf(w3,"%d",count);
selected = 0;
show_frame(1);
first_pair[pair_no]=count;
wn_putsa(w3,5,8,"FIRST FRAME     ",attr);
wn_locate(w3,5,25);
```

```
wn_printf(w3,"%d",count);
if(selected == 1)
{
wn_putsa(w3,6,2,"USE ARROW KEYS TO PACE THROUGH
FRAMES",batrib);
wn_putsa(w3,7,3,"PRESS RETURN TO SELECT SECOND FRAME
",batrib);
wn_putsa(w3,9,8,"SHOWING FRAME ",attr);
wn_locate(w3,9,25);
wn_printf(w3,"%d",count);
show_frame(2);
second_pair[pair_no] =count;
}
else pair_no -=1;
wn_close(w3);
wn2 = wn_open(0,15,40,30,3,(BLUE << 4 | YELLOW |
BOLD),(BLUE << 4|WHITE|BOLD));
frm2 = wn_frmopn(2);
if(!frm2)
{
printf("wn_frmopn failed !!\n");
exit(1);
}
*rec2.response = NUL;
atrib = (BLUE << 4 ) | WHITE | BOLD;
wn_gtext(SET,frm2,0,wn2,1,1,"SELECT ANOTHER PAIR(y/n)
: ",atrib,' ',1,rec2.response,NSTR,NSTR);
if(!wn_frmget(frm2))
{
printf("memory corruption error \n");
exit(1);
}
wn_frmcls(frm2);
wn_close(wn2);
}
while(rec2.response[0] == 'y');
show_reference();
random =1;
break;
case 2:
count =1;
w3 = wn_open(0,6,25,45,17,(BLUE << 4 | YELLOW |
BOLD),(BLUE << 4|WHITE|BOLD));
wn_title(w3,"SELECT SERIES");
if(!w3) exit(1);
wn_putsa(w3,2,2,"USE ARROW KEYS TO PACE THROUGH
FRAMES",batrib);
wn_putsa(w3,3,3,"PRESS RETURN TO SELECT REFERENCE
FRAME ",batrib);
wn_putsa(w3,5,8,"SHOWING FRAME ",attr);
wn_locate(w3,5,25);
wn_printf(w3,"%d",count);
show_frame(1);
wn_putsa(w3,5,8,"REFERENCE FRAME",attr);
ref_frame = count;
wn_putsa(w3,6,2,"USE ARROW KEYS TO PACE THROUGH
```

```
FRAMES",batrib);
wn_putsa(w3,7,3,"PRESS RETURN TO SELECT START FRAME
",batrib);
wn_putsa(w3,9,8,"SHOWING FRAME ",attr);
wn_locate(w3,9,25);
wn_printf(w3,"%d",count);
show_frame(2);
wn_putsa(w3,9,8,"SERIES START FRAME ",attr);
wn_locate(w3,9,28);
wn_printf(w3,"%d",count);
starting_frame = count;
wn_putsa(w3,11,2,"USE ARROW KEYS TO PACE THROUGH
FRAMES",batrib);
wn_putsa(w3,12,3,"PRESS RETURN TO SELECT END FRAME
",batrib);
wn_putsa(w3,13,8,"SHOWING FRAME ",attr);
wn_locate(w3,13,25);
wn_printf(w3,"%d",count);
show_frame(3);
wn_putsa(w3,13,8,"SERIES END FRAME    ",attr);
wn_locate(w3,13,28);
wn_printf(w3,"%d",count);
ending_frame = count;
v_getch();
wn_close(w3);
random =0;
first_pair[0] = ref_frame;
second_pair[0]=starting_frame;
pair_no = ending_frame - starting_frame;
for(I=1;i<=pair_no;i++)
{
first_pair[i]= ref_frame;
second_pair[i]=starting_frame+i;
}
break;
case 3:
fin1 =1;
wn_close(pairs.wpsave);
pairs.winopn = FALSE;
break;
})
while(!fin1);
break;
case 2:
fin1 =0;
do
{
rv1=popup(0,7,15,51,11,batrib,batrib,&proces_sel,
FALSE,title);
switch(rv1)
{
case 1:
review_selection();
break;
case 2:
select_reference();
```

```
break;
case 3:
pro_proceed();
break;
case 4: display_results(0);
break;
case 5:
fin1 =1;
wn_close(proces_sel.wpsave);
proces_sel.winopn = FALSE;
break;
)
)
while(!fin1);
break;
case 3:
fin =1;
wn_close(process.wpsave);
process.winopn = FALSE;
break;
)
)
while(!fin);
break;
case 3:
finish = 1;
wn_close(mainmenu.wpsave);
mainmenu.winopn =FALSE;
break;
)
)
while(!finish);
v_getch();
wn_close(w1);
wn_exit();
)
show_frame(i)
char i;
(
wn_locate(w3,i*4+1,25);
wn_printf(w3,"%s","  ");
wn_locate(w3,i*4+1,25);
wn_printf(w3,"%d",count);
mvbuf(start_frame[count],0xC00000);
for(;;)
(
if(kbhit())
(
c.i = _bios_keybrd(_KEYBRD_READ);
if(c.i==0x11b)goto again;
if(c.ch[0] != 0)
(
switch(c.ch[0])
(
case '\r':
selected =1;
```

```
goto again;
break;
))
else
{
switch(c.ch[1])
{
case 80:if(count > 1)
count--;
else count =36;
break;
case 72: if(count < 36)
count++;
else count =1;
break;
}
wn_locate(w3,i*4+1,25);
wn_printf(w3,"%s","   ");
wn_locate(w3,i*4+1,25);
wn_printf(w3,"%d",count);
mvbuf(start_frame[count],0xC00000);
)))
again:
;
}
capture_frame()
{
capture_proceed();
}
load_store()
{
do
{
strcpy(title,"LOAD/STORE MODE");
rv1=popup(0,6,15,51,11,batrib,batrib,&loadstore,
FALSE,title);
switch(rv1)
{
case 1:
case 2:
wn1 = wn_open(0,15,40,30,5,(BLUE << 4 | YELLOW |
BOLD),(BLUE << 4|WHITE|BOLD));
wn_title(wn1,"FILE NAME");
frm1 = wn_frmopn(2);
if(!frm1)
{
printf("wn_frmopn failed !!\n");
exit(1);
}
*rec1.filename = NUL;
atrib = (BLUE << 4 ) | WHITE | BOLD;
wn_gtext(SET,frm1,0,wn1,1,1,"ENTER FILE NAME  :
",atrib,' ',8,rec1.filename,NSTR,NSTR);
if(!wn_frmget(frm1))
{
printf("memory corruption error \n");
```

```
exit(1);
}
v_getch();
wn_frmcls(frm1);
wn_close(wn1);
break;
case 3:
case 4:
case 5:
fin =1;
wn_close(loadstore.wpsave);
loadstore.winopn = FALSE;
break;
})
while(!fin);
}
capture_proceed()
{
int count;
fin2 =0;
do
{
strcpy(title,"READY TO CAPTURE");
rv3=popup(0,6,15,51,11,batrib,batrib,&st_capture,
FALSE,title);
switch(rv3)
{
case 1:
start_capture();   /* START CAPTURING */
break;
case 2:                /* VIEW COMPOSITE VIEW */
composite();
break;
case 3:
individual_frame();/* VIEW INDIVIDUAL FRAMES */
break;
case 4:
fin2 =1;
wn_close(st_capture.wpsave);
st_capture.winopn =FALSE;
break;
}
}
while(!fin2);
}
capture_stop()
{
outpw(INCSR1,0x8);
x = inpw(INCSR1);
while (x & 0x80)( x = inpw(INCSR1);)
x = inpw(OUTCSR);
while ( x & 0x8000)( x = inpw(OUTCSR);)
outpw(INCSR1,0x8);
outpw(INCSR2,0x10);
outpw(OUTCSR ,0xA0);
x = inpw(INCSR1);
```

```c
x &= 0xffff;
outpw(INCSR1,x);
x |= 0x80;
outpw(INCSR1,x);
}
mvbuf(source1,target1)
long source1,target1;
{
for(j=0;j<48;j++)GDT[j] = 0;
GDT[17]=0x80;
GDT[21]=0x93;
GDT[25]=0x80;
GDT[29]=0x93;
GDT_addr.ptr = GDT;
regs.h.ah = 0x87;
regs.x.cx =0x4000;
segregs.es =GDT_addr.v_addr.segment;
regs.x.si = GDT_addr.v_addr.offset;
source.integral = source1;
target.integral = target1;
for(i=0;i<8;i++)
{GDT[SOURCE+2] =source.separated.hi;
GDT[SOURCE+1] =source.separated.mid;
GDT[TARGET+2] = target.separated.hi;
GDT[TARGET+1] = target.separated.mid;
int86x(0x15,®s,&outregs,&segregs);
source.integral += 0x8000;
target.integral += 0x8000;
}}
capt()
{
outpw(INCSR1,0x8);
x = inpw(INCSR1);
while (x & 0x80){ x = inpw(INCSR1);}
x = inpw(OUTCSR);
while ( x & 0x8000)x = inpw(OUTCSR);
outpw(INCSR2,0x40);
outpw(INCSR1,0x8);
x = inpw(INCSR1);
outpw(INCSR2,0x10);
outpw(OUTCSR ,0xA0);
x = inpw(INCSR1);
x &= 0xfff7;
outpw(INCSR1,x);
x |= 0x80;
outpw(INCSR1,x);
}
init()
{
unsigned int x;
unsigned int i,j,k;
outpw(OUTCSR,0x20);
x = inpw(INCSR1);
x = x | 0x8;
outpw(INCSR1,x);
x = inpw(INCSR1);
```

```
x = x & 0xff7f;
outpw(INCSR1,x);
i = inpw(INCSR1);
j = inpw(INCSR2);
outpw(INCSR2,0x40);
for(k=0;k<256;k++)
{
x = inpw(INCSR1);
x = x & 0xfff8;
outpw(INCSR1,x);
outpw(INDEX,k);
outpw(INLUT,k);
}
outpw(INCSR1,i);
outpw(INCSR2,j);
x = inpw(INCSR1);
while(x & 0x0080);
i = inpw(INCSR2);
j = inpw(OUTCSR);
outpw(INCSR2,0x40);
for(k=0;k<256;k++)
{
x = inpw(OUTCSR);
x = x & 0xfff0;
outpw(OUTCSR,x);
outpw(INDEX,k);
i =k;
i <<=8;
i =i | k;
outpw(REDGRN,i);
outpw(BLUE1,k);
}
outpw(INCSR2,i);
outpw(OUTCSR,j);
outpw(INCSR2,0x10);
outpw(OUTCSR,0x20);
}
start_capture()
{
capt();
w3 = wn_open(0,10,15,50,3,(BLUE << 4 | YELLOW |
BOLD),(BLUE << 4|WHITE|BOLD));
wn_locate(w3,1,5);
wn_printf(w3,"PRESS RETURN TO START CAPTURING");
v_getch();
wn_close(w3);
w3 = wn_open(0,10,15,30,3,(BLUE << 4 | YELLOW |
BOLD),(BLUE << 4|WHITE|BOLD));
wn_locate(w3,1,5);
wn_printf(w3,"CAPTURING FRAMES");
for(count=1;count<37;count++)
{
capture_stop();
mvbuf(0xC00000,start_frame[count]);
}
wn_close(w3);
```

```
differ()
{
for(count =0;count < BUF_LEN;count++)
{
if(buffer1[count] > buffer[count])
buffer[count] = buffer1[count]-buffer[count];
else buffer[count] = buffer[count]-buffer1[count];
}}
difference(target1,target2)
long target1,target2;
{
long target3;
target3 =0x100000;
for(i=0;i<8;i++)
{
source.integral = target1;
buffer_addr.ptr = buffer;
move_one(1);
source.integral = target2;
buffer_addr.ptr = buffer1;
move_one(1);
differ();
buffer_addr.ptr = buffer;
target.integral =target3;
trans_one();
target1 += 0x8000;
target2 += 0x8000;
target3 +=0x8000;
}}
comp_ress(original)
long original;
{
int k2,k1;
int i,j,k;
int x1;
k2 =0;
source.integral = original;
for(x1= 0;x1<8;x1++)
{
buffer_addr.ptr = buffer;
move_one(1);
for(row =0;row < 64;row +=4)
{
k1 =row *512;
k =0;
for(j=0;j < 512; j+= 4)
{
buffer1[k2+k] =buffer[k1+j];
k++;
}
k2 +=128;
}
source.integral += 0x8000;
}}
compress(original)
```

```
long original;
{
int k2,k1;
int i,j,k;
k2=0;
source.integral = original;
buffer_addr.ptr = buffer;
move_one(1);
for(row=0;row<64;row+=6)
{
k1=row*512;
k =0;
for(j=0;j<512;j+=6)
{
buffer1[k2+k] = buffer[k1+j];
k++;
}
k2+=85;
}
source.integral +=0x8000;
buffer_addr.ptr = buffer;
move_one(1);
for(row=2;row<64;row+=6)
{
k1=row*512;
k=0;
for(j=0;j<512;j+=6)
{
buffer1[k2+k] = buffer[k1+j];
k++;
}
k2+=85;
}
source.integral +=0x8000;
buffer_addr.ptr = buffer;
move_one(1);
for(row=4;row<64;row+=6)
{
k1=row*512;
k =0;
for(j=0;j<512;j+=6)
{
buffer1[k2+k] = buffer[k1+j];
k++;
}
k2+=85;
}
source.integral +=0x8000;
buffer_addr.ptr = buffer;
move_one(1);
for(row=0;row<64;row+=6)
{
k1=row*512;
k =0;
for(j=0;j<512;j+=6)
{
```

```
buffer1[k2+k] = buffer[k1+j];
k++;
)
k2+=85;
)
source.integral +=0x8000;
buffer_addr.ptr = buffer;
move_one(1);
for(row=2;row<64;row+=6)
(
k1=row*512;
k =0;
for(j=0;j<512;j+=6)
(
buffer1[k2+k] = buffer[k1+j];
k++;
)
k2+=85;
)
source.integral +=0x8000;
buffer_addr.ptr = buffer;
move_one(1);
for(row=4;row<64;row+=6)
(
k1=row*512;
k =0;
for(j=0;j<512;j+=6)
(
buffer1[k2+k] = buffer[k1+j];
k++;
)
k2+=85;
)
source.integral +=0x8000;
buffer_addr.ptr = buffer;
move_one(1);
for(row=0;row<64;row+=6)
(
k1=row*512;
k =0;
for(j=0;j<512;j+=6)
(
buffer1[k2+k] = buffer[k1+j];
k++;
)
k2+=85;
)
source.integral +=0x8000;
buffer_addr.ptr = buffer;
move_one(1);
for(row=2;row<64;row+=6)
(
k1=row*512;
k =0;
for(j=0;j<512;j+=6)
(
```

```
buffer1[k2+k] = buffer[k1+j];
k++;
)
k2+=85;
)
)
move_one(attr)
char attr;
(
for(j=0;j <48; j++)GDT[j] = 0;
GDT[17] =0x80;
GDT[21]=0x93;
GDT[25] =0x80;
GDT[29]=0x93;
GDT_addr.ptr = GDT;
regs.h.ah = 0x87;
if(attr ==1)
regs.x.cx =BUF_LEN / 2;
else regs.x.cx = BUF_LEN/4;
segregs.es =GDT_addr.v_addr.segment;
regs.x.si = GDT_addr.v_addr.offset;
GDT[SOURCE+2] =source.separated.hi;
GDT[SOURCE+1] =source.separated.mid;
GDT[SOURCE]   = source.separated.low;
converter.integral =  (long)buffer_addr.v_addr.offset
+(long)buffer_addr.v_addr.segment * 0x10;
GDT[TARGET+2] = converter.separated.hi;
GDT[TARGET+1] = converter.separated.mid;
GDT[TARGET]   = converter.separated.low;
int86x(0x15,®s,&outregs,&segregs);
)
trans_one1(target1,buffer,attr)
long target1;
char *buffer;
char attr;
(
regs.h.ah =0x87;
if(attr==1)
regs.x.cx =BUF_LEN / 2;
else regs.x.cx = BUF_LEN/4;
for (j=0;j <48;j++)GDT[j] = 0;
GDT[17] = 0x80;
GDT[21] = 0x93;
GDT[25] =0x80;
GDT[29] =0x93;
GDT_addr.ptr = GDT;
segregs.es =GDT_addr.v_addr.segment;
regs.x.si = GDT_addr.v_addr.offset;
buffer_addr.ptr = buffer;
target.integral = target1;
converter.integral =(long)buffer_addr.v_addr.offset +
 (long)buffer_addr.v_addr.segment * 0x10;
GDT[SOURCE+2] =converter.separated.hi;
GDT[SOURCE+1] = converter.separated.mid;
GDT[SOURCE]   =converter.separated.low;
GDT[TARGET +2] = target.separated.hi;
```

```c
GDT[TARGET +1] = target.separated.mid;
GDT[TARGET]    = target.separated.low;
int86x(0x15,®s,&outregs,&segregs);
)
composite()
{
w3 = wn_open(0,10,25,20,2,(BLUE << 4 | YELLOW |
BOLD),(BLUE << 4 | WHITE |BOLD));
wn_locate(w3,1,1);
wn_printf(w3,"Please wait...");
for(i=1;i<7;i++)
{
for(count=1;count<7;count++)
{
compress(start_frame[6*(i-1)+count]);
picture(i,count);
})
mvbuf(0x100000,0xC00000);
wn_close(w3);
)
individual_frame()
{
count =1;
w3 = wn_open(0,9,25,45,7,(BLUE << 4 | YELLOW |
BOLD),(BLUE << 4 | WHITE | BOLD));
if(!w3) exit(1);
wn_putsa(w3,2,2,"USE ARROW KEYS TO PACE THROUGH
FRAMES ",batrib);
wn_putsa(w3,3,2,"HIT RETURN TO EXIT",batrib);
wn_putsa(w3,5,8,"SHOWING FRAMES : ",attr);
wn_locate(w3,5,25);
wn_printf(w3,"%d",count);
show_frame(1);
wn_close(w3);
)
trans_one()
{
for(j=0;j <48; j++)GDT[j] = 0;
GDT[17] =0x80;
GDT[21]=0x93;
GDT[25] =0x80;
GDT[29]=0x93;
GDT_addr.ptr = GDT;
regs.h.ah =0x87;
regs.x.cx =BUF_LEN / 2;
converter.integral =(long)buffer_addr.v_addr.offset +
 (long)buffer_addr.v_addr.segment * 0x10;
GDT[SOURCE+2] =converter.separated.hi;
GDT[SOURCE+1] = converter.separated.mid;
GDT[SOURCE]   =converter.separated.low;
GDT[TARGET +2] = target.separated.hi;
GDT[TARGET +1] = target.separated.mid;
GDT[TARGET]    = target.separated.low;
int86x(0x15,®s,&outregs,&segregs);
)
centre_screen()
```

```
{
if((cl=cursor_set())==-1){return(-1);}
y = inpw(CURSOR);
cent_col = y & 0x00ff;
cent_row = y & 0xff00;
cent_row >>= 8;
draw_box(2*(cent_row-1),2*(cent_col-1),
 2*(cent_row+1),2*(cent_col+1),1);
)
top_left_corner()
{
if((cl=cursor_set())==-1){return(-1);}
y = inpw(CURSOR);
col1 = y & 0x00ff;
row1 = y & 0xff00;
row1 >>= 8;
draw_box(2*(row1-1),2*(col1-1),2*(row1+1),
 2*(col1+1),1);
if(row1 > cent_row || col1 > cent_col){return;}
quad_left_x[0]=2*row1;
quad_left_y[0]=2*col1;
quad_right_x[0]=2*cent_row;
quad_right_y[0]=2*cent_col;
draw_box(2*row1,2*col1,2*cent_row,2*cent_col,1);
col1 = 2*cent_col - col1;
quad_left_x[2]=2*row1;
quad_left_y[2]=2*cent_col;
quad_right_x[2]=2*cent_row;
quad_right_y[2]=2*col1;
draw_box(2*row1,2*cent_col,2*cent_row,2*col1,1);
)
bottom_left_corner()
{
if((cl=cursor_set())==-1) {return(-1);}
y = inpw(CURSOR);
col1 = y & 0x00ff;
row1 = y & 0xff00;
row1 >>= 8;
draw_box(2*(row1-1),2*(col1-1),2*(row1+1),
 2*(col1+1),1);
if(row1 < cent_row || col1 > cent_col){return;}
quad_left_x[1]=2*cent_row;
quad_left_y[1]=2*col1;
quad_right_x[1]=2*row1;
quad_right_y[1]=2*cent_col;
draw_box(2*cent_row,2*col1,2*row1,2*cent_col,1);
col1 =2*cent_col -col1;
quad_left_x[3]=2*cent_row;
quad_left_y[3]=2*cent_col;
quad_right_x[3]=2*row1;
quad_right_y[3]=2*col1;
draw_box(2*cent_row,2*cent_col,2*row1,2*col1,1);
)
draw_box(row,col,row1,col1,attr)
unsigned row,col,row1,col1;
char attr;
```

```
{
draw_line(row,col,col1,attr);
draw_vline(col,row,row1,attr);
draw_vline(col1,row,row1,attr);
draw_line(row1,col,col1,attr);
}
draw_vline(col,row,row1,attr)
unsigned row,col,row1;
{
unsigned int i,j , pixel;
long num_buf,num_buf1,target1;
if(attr == 1)attr =0xff;
else attr =0x88;
target1 =0xC00000;
num_buf = row /64 ;
target1 += num_buf * 0x8000;
num_buf1 = row - num_buf *64;
if(row1 < (num_buf+1)*64) j  =row1 - num_buf*64+1;
else j =64;
source.integral = target1;
buffer_addr.ptr = buffer;
move_one(1);
num_buf = num_buf1 * 512;
num_buf = num_buf + col;
for(i=num_buf1;i<j;i++)
{
pixel = num_buf;
buffer[pixel] = attr;
num_buf += 512;
}
num_buf = row/64;
num_buf = (num_buf + 2) *64;
j =1;
while(num_buf < row1)
{
trans_one1(target1,buffer,1);
target1 +=0x8000;
source.integral = target1;
buffer_addr.ptr = buffer;
move_one(1);
num_buf1 = col;
for(i=64 * j;(i< 64 *(j+1) && i < row1);i++)
{
pixel = num_buf1;
buffer[pixel] = attr;
num_buf1 += 512;
}
j++;
num_buf += 64;
}
num_buf -=64;
num_buf =row1-num_buf;
if(num_buf > 0)
{
trans_one1(target1,buffer,1);
target1 += 0x8000;
```

```
source.integral = target1;
buffer_addr.ptr = buffer;
move_one(1);
num_buf1 = col;
for(i=0;i<num_buf;i++)
{
pixel = num_buf1;
buffer[pixel] = attr;
num_buf1 += 512;
}}
trans_one1(target1,buffer,1);
}
draw_line(row,col,col1,attr)
unsigned row,col,col1;
char attr;
{
unsigned int i,j , pixel;
long num_buf,target1;
if(attr==1)attr = 0xff;
else attr =0;
target1 =0xC00000;
num_buf = row /64 ;
target1 += num_buf * 0x8000;
num_buf = row - num_buf *64;
source.integral = target1;
buffer_addr.ptr = buffer;
move_one(1);
num_buf = num_buf * 512;
for(i=col;i<col1;i++)
{
pixel = i+num_buf;
buffer[pixel] = attr;
}
trans_one1(target1,buffer,1);
}
cursor_set()
{
unsigned int row,col;
char c;
outpw(OUTCSR,0xE0);
col = INIT_Y;
row = INIT_X;
row >>=1;
col >>=1;
outpw(CURSOR,(row<<8) + col);
if((c1=select()) == -1) return(-1);
outpw(OUTCSR,0xA0);
}
select()
{
unsigned int row,col;
union inkey{
char ch[2];
int i;
}c;
col = inpw(CURSOR);
```

```
row = col & 0xff00;
row = col >> 8;
col = col & 0x00ff;
for(;;)
{
if(kbhit())
{
c.i = _bios_keybrd(_KEYBRD_READ);
if(c.i==0x1Ib)return(-1);
if(c.ch[0] != 0)
{
switch(c.ch[0])
{
case '\r':
outpw(CURSOR,(row << 8) + col);
return;
break;
}}
else
{
switch(c.ch[1])
{
case 72:row--;
outpw(CURSOR,(row<<8)+col);
break;
case 80: row++;
outpw(CURSOR,(row<<8)+col);
break;
case 75: col--;
outpw(CURSOR,(row<<8)+col);
break;
case 77: col++;
outpw(CURSOR,(row<<8)+col);
break;
}}}}
pict1(y)
int y;
{
long k;
int i,j;
int k2,k1,k3;
int x1;
k2 =0;
k3 = (y-1) *128;
source.integral=0xC00000;
for(x1 =0; x1 < 2; x1++)
{
buffer_addr.ptr = buffer;
move_one(1);
for(row =0;row < 64;row++)
{
k1 = row *512;
for(j=0; j < 128; j++)
{
buffer[k1+j+k3] = buffer1[k2+j];
}
```

```
k2 +=128;
)
buffer_addr.ptr =buffer;
target.integral = source.integral;
trans_one1(target.integral,buffer,1);
source.integral += 0x8000;
))
picture(x,y)
int x,y;
{
long k;
int i,j;
int k2,k1,k3;
switch(x)
{
case 1:
k2=0;
k3=(y-1)*85;
source.integral = 0x100000;
buffer_addr.ptr = buffer;
move_one(1);
for(row=0;row<64;row++)
{
k1=row*512;
for(j=0;j<85;j++)
{
buffer[k1+j+k3] = buffer1[k2+j];
}
k2+=85;
}
buffer_addr.ptr = buffer;
target.integral =source.integral;
trans_one1(target.integral,buffer,1);
source.integral +=0x8000;
buffer_addr.ptr = buffer;
move_one(1);
for(row=0;row<16;row++)
{
k1=row*512;
for(j=0;j<85;j++)
{
buffer[k1+j+k3] = buffer1[k2+j];
}
k2+=85;
}
buffer_addr.ptr = buffer;
target.integral =source.integral;
trans_one1(target.integral,buffer,1);
break;
case 2:
k=(x-1)*65536;
k2=0;
k3=(y-1)*85;
source.integral = 0x100000+0x8000;
buffer_addr.ptr = buffer;
move_one(1);
```

```
for(row=16;row<64;row++)
{
k1=row*512;
for(j=0;j<85;j++)
{
buffer[k1+j+k3] = buffer1[k2+j];
}
k2+=85;
}
buffer_addr.ptr = buffer;
target.integral =source.integral;
trans_one1(target.integral,buffer,1);
source.integral += 0x8000;
buffer_addr.ptr = buffer;
move_one(1);
for(row=0;row<32;row++)
{
k1=row*512;
for(j=0;j<85;j++)
{
buffer[k1+j+k3] = buffer1[k2+j];
}
k2+=85;
}
buffer_addr.ptr = buffer;
target.integral =source.integral;
trans_one1(target.integral,buffer,1);
break;
case 3:
k=(x-1)*65536;
k2=0;
k3=(y-1)*85;
source.integral = 0x100000+0x8000+0x8000;
buffer_addr.ptr = buffer;
move_one(1);
for(row=32;row<64;row++)
{
k1=row*512;
for(j=0;j<85;j++)
{
buffer[k1+j+k3] = buffer1[k2+j];
}
k2+=85;
}
buffer_addr.ptr = buffer;
target.integral =source.integral;
trans_one1(target.integral,buffer,1);
source.integral +=0x8000;
buffer_addr.ptr = buffer;
move_one(1);
for(row=0;row<48;row++)
{
k1=row*512;
for(j=0;j<85;j++)
{
buffer[k1+j+k3] = buffer1[k2+j];
```

```
}
k2+=85;
}
buffer_addr.ptr = buffer;
target.integral =source.integral;
trans_one1(target.integral,buffer,1);
break;
case 4:
k=(x-1)*65536;
k2=0;
k3=(y-1)*85;
source.integral = 0x100000+0x8000+0x8000+0x8000;
buffer_addr.ptr = buffer;
move_one(1);
for(row=48;row<64;row++)
{
k1=row*512;
for(j=0;j<85;j++)
{
buffer[k1+j+k3] = buffer1[k2+j];
}
k2+=85;
}
buffer_addr.ptr = buffer;
target.integral =source.integral;
trans_one1(target.integral,buffer,1);
source.integral += 0x8000;
buffer_addr.ptr = buffer;
move_one(1);
for(row=0;row<64;row++)
{
k1=row*512;
for(j=0;j<85;j++)
{
buffer[k1+j+k3] = buffer1[k2+j];
}
k2+=85;
}
buffer_addr.ptr = buffer;
target.integral =source.integral;
trans_one1(target.integral,buffer,1);
break;
case 5:
k2=0;
k3=(y-1)*85;
source.integral =
0x100000+0x8000+0x8000+0x8000+0x8000+0x8000;
buffer_addr.ptr = buffer;
move_one(1);
for(row=0;row<64;row++)
{
k1=row*512;
for(j=0;j<85;j++)
{
buffer[k1+j+k3] = buffer1[k2+j];
}
```

```
k2+=85;
}
buffer_addr.ptr = buffer;
target.integral =source.integral;
trans_one1(target.integral,buffer,1);
source.integral +=0x8000;
buffer_addr.ptr = buffer;
move_one(1);
for(row=0;row<16;row++)
{
k1=row*512;
for(j=0;j<85;j++)
{
buffer[k1+j+k3] = buffer1[k2+j];
}
k2+=85;
}
buffer_addr.ptr = buffer;
target.integral =source.integral;
trans_one1(target.integral,buffer,1);
break;
case 6:
k=(x-1)*65536;
k2=0;
k3=(y-1)*85;
source.integral =
0x100000+0x8000+0x8000+0x8000+0x8000+0x8000+0x8000;
buffer_addr.ptr = buffer;
move_one(1);
for(row=16;row<64;row++)
{
k1=row*512;
for(j=0;j<85;j++)
{
buffer[k1+j+k3] = buffer1[k2+j];
}
k2+=85;
}
buffer_addr.ptr = buffer;
target.integral =source.integral;
trans_one1(target.integral,buffer,1);
source.integral +=0x8000;
buffer_addr.ptr = buffer;
move_one(1);
for(row=0;row<32;row++)
{
k1=row*512;
for(j=0;j<85;j++)
{
buffer[k1+j+k3] = buffer1[k2+j];
}
k2+=85;
}
buffer_addr.ptr = buffer;
target.integral =source.integral;
trans_one1(target.integral,buffer,1);
```

```
break;
))
select_first_corner()
{
char c;
if((c=cursor_set())==-1)return(-1);
y = inpw(CURSOR);
col = y & 0x00ff;
row = y & 0xff00;
row >>= 8;
draw_box(2*(row-1),2*(col-1),2*(row+1),2*(col+1),1);
}
select_second_corner()
{
char c;
if((c=cursor_set())==-1)return(-1);
y = inpw(CURSOR);
col1 = y & 0x00ff;
row1 = y & 0xff00;
row1 >>= 8;
draw_box(2*(row1-1),2*(col1-1),2*(row1+1),
 2*(col1+1),1);
}
box_title()
{
wn1 = wn_open(0,16,25,30,3,(BLUE << 4 | YELLOW |
BOLD),(BLUE << 4|WHITE|BOLD));
wn_title(wn1,"BOX LABEL");
frm1 = wn_frmopn(1);
if(!frm1)
{
printf("wn_frmopn failed !!\n");
exit(1);
}
*rec5.filename = NUL;
atrib = (BLUE << 4 ) | WHITE | BOLD;
wn_gtext(SET,frm1,0,wn1,1,1,"BOX LABEL:",atrib,'
',13,rec5.filename,NSTR,NSTR);
if(!wn_frmget(frm1))
{
printf("memory corruption error \n");
exit(1);
}
strcpy(box_string[no_box],rec5.filename);
wn_frmcls(frm1);
wn_close(wn1);
}
make_box()
{
no_box +=1;
if(row1 > row && col1 > col)
{
left_x[no_box]=row;
left_y[no_box]=col;
right_x[no_box]=row1;
right_y[no_box]=col1;
```

```c
draw_box(2*left_x[no_box],2*left_y[no_box],2*right_x[no_box],2*right_y[no_box],1);
y = left_y[no_box];
col = 2*cent_col-right_y[no_box];
col1 =2*cent_col -y;
draw_box(2*left_x[no_box],2*col,2*right_x[no_box],2*col1,1);
}
if(row1 < row && col1 < col)
{
left_x[no_box]=row1;
left_y[no_box]=col1;
right_x[no_box]=row;
right_y[no_box]=col;
draw_box(2*left_x[no_box],2*left_y[no_box],2*right_x[no_box],2*right_y[no_box],1);
y = left_y[no_box];
col = 2*cent_col-right_y[no_box];
col1 =2*cent_col -y;
draw_box(2*left_x[no_box],2*col,2*right_x[no_box],
 2*col1,1);
}
if(row > row1 && col < col1)
{
left_x[no_box]=row1;
left_y[no_box]=col;
right_x[no_box]=row;
right_y[no_box]=col1;
draw_box(2*left_x[no_box],2*left_y[no_box],
 2*right_x[no_box],2*right_y[no_box],1);
y = left_y[no_box];
col = 2*cent_col-right_y[no_box];
col1 =2*cent_col -y;
draw_box(2*left_x[no_box],2*col,2*right_x[no_box],
 2*col1,1);
}
if(row < row1 && col > col1)
{
left_x[no_box]=row;
left_y[no_box]=col1;
right_x[no_box]=row1;
right_y[no_box]=col;
draw_box(2*left_x[no_box],2*left_y[no_box],
 2*right_x[no_box],2*right_y[no_box],1);
y = left_y[no_box];
col = 2*cent_col-right_y[no_box];
col1 =2*cent_col -y;
draw_box(2*left_x[no_box],2*col,2*right_x[no_box],
 2*col1,1);
}
box_title();
}
pro_proceed()
{
char x;
```

```c
patient_name();
wn2 = wn_open(0,15,20,55,3,(BLUE << 4 | YELLOW |
BOLD),(BLUE << 4|WHITE|BOLD));
frm2 = wn_frmopn(2);
if(!frm2)
{
printf("wn_frmopn failed !!\n");
exit(1);
}
*rec2.response = NUL;
atrib = (BLUE << 4 ) | WHITE | BOLD;
wn_gtext(SET,frm2,0,wn2,1,1,"Do you want to print the
results(y/n) : ",atrib,'
',1,rec2.response,NSTR,NSTR);
if(!wn_frmget(frm2))
{
printf("memory corruption error \n");
exit(1);
}
wn_frmcls(frm2);
wn_close(wn2);
if(rec2.response[0] == 'y')print_flag = TRUE;
else print_flag = FALSE;
wn2 = wn_open(0,15,20,55,3,(BLUE << 4 | YELLOW |
BOLD),(BLUE << 4|WHITE|BOLD));
frm2 = wn_frmopn(2);
if(!frm2)
{
printf("wn_frmopn failed !!\n");
exit(1);
}
*rec2.response = NUL;
atrib = (BLUE << 4 ) | WHITE | BOLD;
wn_gtext(SET,frm2,0,wn2,1,1,"Do you want to store
results on diskette(y/n) : ",atrib,'
',1,rec2.response,NSTR,NSTR);
if(!wn_frmget(frm2))
{
printf("memory corruption error \n");
exit(1);
}
wn_frmcls(frm2);
wn_close(wn2);
if(rec2.response[0] == 'y')
{
disk_flag = TRUE;
wn1 = wn_open(0,15,40,34,3,(BLUE << 4 | YELLOW |
BOLD),(BLUE << 4|WHITE|BOLD));
wn_title(wn1,"FILE NAME");
frm1 = wn_frmopn(2);
if(!frm1)
{
printf("wn_frmopn failed !!\n");
exit(1);
}
*rec5.filename = NUL;
```

```
atrib = (BLUE << 4 ) | WHITE | BOLD;
wn_gtext(SET,frm1,0,wn1,1,1,"ENTER FILE NAME  :
",atrib,' ',12,rec5.filename,NSTR,NSTR);
if(!wn_frmget(frm1))
{
printf("memory corruption error \n");
exit(1);
)
strcpy(file_name,"a:");
strcat(file_name,rec5.filename);
wn_frmcls(frm1);
wn_close(wn1);
)
else disk_flag = FALSE;
w3 = wn_open(0,10,25,20,2,(BLUE << 4 | YELLOW |
BOLD),(BLUE << 4 | WHITE |BOLD));
wn_locate(w3,1,1);
wn_printf(w3,"Please wait...");
difference(start_frame[first_pair[reference_pair]],st
art_frame[second_pair[reference_pair]]);
mvbuf(0x100000,0xC00000);
comp_ress(start_frame[first_pair[reference_pair]]);
pict1(1);
comp_ress(start_frame[second_pair[reference_pair]]);
pict1(4);
wn_close(w3);
w3 = wn_open(0,7,15,51,11,(BLUE << 4 | YELLOW |
BOLD),(BLUE << 4|WHITE|BOLD));
wn_locate(w3,1,1);
wn_printf(w3,"FOLLOW THE INSTRUCTIONS AS THEY APPEAR
");
wn_locate(w3,2,5);
wn_printf(w3,"ON THE SCREEN BELOW");
wn3= wn_open(0,12,16,53,6,batrib,batrib);
wn_putsa(wn3,1,1,"QUADRANT DEFINITION",attr);
wn_locate(wn3,3,2);
wn_printf(wn3,"USE ARROW KEYS TO FIND THE CENTER OF
SCREEN");
wn_putsa(wn3,5,10,"USE RETURN TO SELECT",attr1);
if((x = centre_screen()) == -1){
wn_close(w3);
wn_close(wn3);
return;
)
wn_putsa(wn3,3,2,"USE ARROW KEYS TO FIND THE TOP LEFT
CORNER",(BLUE <<4|YELLOW|BOLD));
wn_putsa(wn3,5,10,"USE RETURN TO SELECT",attr1);
if((x = top_left_corner()) == -1)
{
wn_close(w3);
wn_close(wn3);
return;
)
wn_putsa(wn3,3,2,"USE ARROW KEYS TO FIND THE BOTTOM
LEFT CORNER ",(BLUE<<4|GREEN|BOLD));
if((x = bottom_left_corner()) == -1){
```

```
wn_close(w3);
wn_close(wn3);
return;
}
wn_close(wn3);
wn3= wn_open(0,12,16,53,7,batrib,batrib);
wn_putsa(wn3,1,1,"BOX DEFINITION",attr);
no_box =-1;
do
{
wn2 = wn_open(0,15,30,40,3,(BLUE << 4 | YELLOW |
BOLD),(BLUE << 4|WHITE|BOLD));
frm2 = wn_frmopn(2);
if(!frm2)
{
printf("wn_frmopn failed !!\n");
exit(1);
}
*rec2.response = NUL;
atrib = (BLUE << 4 ) | WHITE | BOLD;
wn_gtext(SET,frm2,0,wn2,1,1,"DO YOU WANT TO MAKE ANY
BOX(y/n)  : ",atrib,' ',1,rec2.response,NSTR,NSTR);
if(!wn_frmget(frm2))
{
printf("memory corruption error \n");
exit(1);
}
wn_frmcls(frm2);
wn_close(wn2);
if(rec2.response[0]=='y')
{
wn2 = wn_open(0,15,15,59,7,(BLUE << 4 | YELLOW |
BOLD),(BLUE << 4|WHITE|BOLD));
wn_putsa(wn2,3,2,"USE ARROW KEYS TO FIND THE TOP LEFT
CORNER OF THE BOX",(BLUE<<4|GREEN|BOLD));
wn_putsa(wn2,5,10,"USE RETURN TO SELECT",attr1);
if((x = select_first_corner())== -1) {
wn_close(w3);
wn_close(wn3);
wn_close(wn2);
return;
}
wn_putsa(wn2,3,2,"USE ARROW KEYS TO FIND THE BOTTOM
RIGHT CORNER OF THE BOX",(BLUE<<4|YELLOW|BOLD));
if((x = select_second_corner()) == -1){
wn_close(w3);
wn_close(wn3);
wn_close(wn2);
return;
}
make_box();
wn_close(wn2);
}
}
while(rec2.response[0]=='y');
wn_close(w3);
```

```c
wn_close(wn3);
make_cat();
cdf();
}
view_pair()
{
union inkey{
char ch[2];
int i;
}c;
char i;
count =0;
i = 1;
mvbuf(start_frame[first_pair[count]],0xC00000);
w4 = wn_open(0,15,15,55,3,(BLUE << 4 | YELLOW |
BOLD),(BLUE << 4|WHITE|BOLD));
wn_locate(w4,1,1);
wn_printf(w4,"PAIR %d - %d  SHOWING FRAME %d
",first_pair[count],second_pair[count],first_pair[cou
nt]);
v_getch();
for(;;)
{
if(kbhit())
{
c.i = _bios_keybrd(_KEYBRD_READ);
if(c.i==0x11b)
{wn_close(w4);
return(-1);
}
if(c.ch[0] != 0)
{
switch(c.ch[0])
{
case '\r':
wn_close(w4);
return;
break;
}}
else
{
switch(c.ch[1])
{
case 80: if(i==1)
{
if(count>0)count--;
else count =pair_no;
i=2;
}
else
{i=1;}
break;
case 72:
if(i==1)
{i=2;}
else
```

```
{
if(count < pair_no)count++;
else count =0;
i =1;
}
break;
))
wn_locate(w4,1,1);
wn_printf(w4,"
    ");
switch(i)
{
case 1:
mvbuf(start_frame[first_pair[count]],0xC00000);
wn_locate(w4,1,1);
wn_printf(w4,"PAIR %d - %d   SHOWING FRAME %d ",
 first_pair[count],second_pair[count],
 first_pair[count]);
break;
case 2:
mvbuf(start_frame[second_pair[count]],0xC00000);
wn_locate(w4,1,1);
wn_printf(w4,"PAIR %d - %d   SHOWING FRAME %d
",first_pair[count],second_pair[count],second_pair[co
unt]);
break;
)})
wn_close(w4);
}
select_reference()
{
if(pair_no >=0)
{
w3 = wn_open(0,9,10,55,14,(BLUE << 4 | YELLOW |
BOLD),(BLUE << 4|WHITE|BOLD));
wn_title(w3,"SELECTED PAIRS");
if(!w3) exit(1);
for(count =0;count<=pair_no & count < 9;count++)
{
wn_locate(w3,count+1,2);
wn_printf(w3,"%d%s%d%s%d",count+1,".
",first_pair[count],"-",second_pair[count]);
})
i =1;
if(count < pair_no)
{
while(count <= pair_no && i < 10)
{
wn_locate(w3,i,15);
wn_printf(w3,"%d%s%d%s%d",count+1,".
",first_pair[count],"-",second_pair[count]);
i++;
count++;
}
}
i =1;
```

```
if(count < pair_no)
{
while(count <= pair_no && i < 10)
{
wn_locate(w3,i,30);
wn_printf(w3,"%d%s%d%s%d",count+1,".
",first_pair[count],"-",second_pair[count]);
i++;
count++;
}}
i =1;
if(count < pair_no)
{
while(count <= pair_no && i < 10)
{
wn_locate(w3,i,45);
wn_printf(w3,"%d%s%d%s%d",count+1,".
",first_pair[count],"-",second_pair[count]);
i++;
count++;
}}
wn1 = wn_open(0,20,29,30,3,(BLUE << 4 | YELLOW |
BOLD),(BLUE << 4|WHITE|BOLD));
frm1 = wn_frmopn(2);
if(!frm1)
{
printf("wn_frmopn failed !!\n");
exit(1);
)
*rec3.response = NUL;
atrib = (BLUE << 4 ) | WHITE | BOLD;
wn_gint(SET,frm1,0,wn1,1,1,"SELECT REFERENCE PAIR  :
",atrib,'
',&rec3.ref_pair_no,2,1,18,rec3.response,NSTR,NSTR);
if(!wn_frmget(frm1))
{
printf("memory corruption error \n");
exit(1);
}
wn_frmcls(frm1);
wn_close(wn1);
wn_close(w3);
reference_pair = rec3.ref_pair_no - 1;
)
review_selection()
{
w3 = wn_open(0,10,10,50,3,(BLUE << 4 | RED |
BOLD),(BLUE << 4|WHITE|BOLD));
wn_locate(w3,1,1);
wn_printf(w3,"Use Arrow Keys To Pace Through Frames
");
view_pair();
wn_close(w3);
}
threshold()
{
```

```
do
{
mvbuf(0x100000,0xC00000);
wn2 = wn_open(0,15,40,30,3,(BLUE << 4 | YELLOW |
BOLD),(BLUE << 4|WHITE|BOLD));
frm2 = wn_frmopn(2);
if(!frm2)
{
printf("wn_frmopn failed !!\n");
exit(1);
}
atrib = (BLUE << 4 ) | WHITE | BOLD;
wn_gfloat(SET,frm2,0,wn2,1,1,"ENTER THE THRESHOLD  :
",atrib,'_',&new_thresh,3,2,0.0,1.0,string,NSTR,NSTR)
;
if(!wn_frmget(frm2))
{
printf("memory corruption error \n");
exit(1);
}
wn_frmcls(frm2);
wn_close(wn2);
new_thresh1 =new_thresh;
new_thresh = new_thresh * gray_val[255];
i=0;
while((float)gray_val[i] < new_thresh)
i++;
thresh =i;
adjust_thresh();
wn2 = wn_open(0,15,20,45,3,(BLUE << 4 | YELLOW |
BOLD),(BLUE << 4|WHITE|BOLD));
frm2 = wn_frmopn(2);
if(!frm2)
{
printf("wn_frmopn failed !!\n");
exit(1);
}
*rec2.response = NUL;
atrib = (BLUE << 4 ) | WHITE | BOLD;
wn_gtext(SET,frm2,0,wn2,1,1,"Do you want to change
threshold(y/n) : ",atrib,'
',1,rec2.response,NSTR,NSTR);
if(!wn_frmget(frm2))
{
printf("memory corruption error \n");
exit(1);
}
wn_frmcls(frm2);
wn_close(wn2);
}
while(rec2.response[0] == 'y');
start_work();
}
show_reference()
{
if(pair_no >=0)
{
```

```c
w3 = wn_open(0,9,5,55,14,(BLUE << 4 | YELLOW |
BOLD),(BLUE << 4|WHITE|BOLD));
wn_title(w3,"SELECTED PAIRS");
if(!w3) exit(1);
for(count =0;count<=pair_no & count < 9;count++)
{
wn_locate(w3,count+1,2);
wn_printf(w3,"%d%s%d%s%d",count+1,".
",first_pair[count],"-",second_pair[count]);
}}
i=1;
if(count < pair_no)
{
while(count <= pair_no)
{
wn_locate(w3,i,15);
wn_printf(w3,"%d%s%d%s%d",count+1,".
",first_pair[count],"-",second_pair[count]);
i++;
count++;
}}
i =1;
if(count < pair_no)
{
while(count <= pair_no)
{
wn_locate(w3,i,30);
wn_printf(w3,"%d%s%d%s%d",count+1,".
",first_pair[count],"-",second_pair[count]);
i++;
count++;
}}
i =1;
if(count < pair_no)
{
while(count <= pair_no)
{
wn_locate(w3,i,45);
wn_printf(w3,"%d%s%d%s%d",count+1,".
",first_pair[count],"-",second_pair[count]);
i++;
count++;
}}
wn_locate(w3,11,2);
wn_printf(w3,"Press Enter To Continue...");
v_getch();
wn_close(w3);
}
make_cat()
{
unsigned char  value;
long target1;
unsigned int i,j;
mvbuf(0x100000,0xC00000);
for(i=0;i<256;i++)gray_val[i]=0;
target1=0xC00000;
```

```
for(j=0;j<8;j++)
{
source.integral = target1;
buffer_addr.ptr = buffer;
move_one(1);
for(i=0;i < BUF_LEN;i++)
{
value = buffer[i];
gray_val[value] +=1;
}
target1 +=0x8000;
}}
cdf()
{
char c;
unsigned int i,j;
for(i=1;i<256;i++)
{
gray_val[i] += gray_val[i-1];
}
threshold();
}
adjust_thresh()
{
long target1;
target1 = 0xC00000;
for(i=0;i<8;i++)
{
source.integral = target1;
buffer_addr.ptr = buffer;
move_one(1);
for(j=0;j<BUF_LEN;j++)
{
if(buffer[j] > thresh)
buffer[j] = 0xff;
else buffer[j]=0;
}
trans_one1(target1,buffer,1);
target1 += 0x8000;
}}
start_work()
{
char c,menu;
union inkey{
char ch[2];
int i;
}c1;
for(c =0;c <=pair_no;c++)
{
if(!kbhit())
{
w3 = wn_open(0,9,25,45,3,(BLUE << 4 | YELLOW |
BOLD),(BLUE << 4|WHITE|BOLD));
wn_locate(w3,1,1);
wn_printf(w3,"Working On Pair : %d",c+1);
wn_locate(w3,2,1);
wn_printf(w3,"Press ESC to stop processing");
```

```
difference(start_frame[first_pair[c]],start_frame[sec
ond_pair[c]]);
mvbuf(0x100000,0xC00000);
gray_quad(c);
if (no_box >=0)
gray_box(c);
make_cat();
adjust_thresh();
mvbuf(0xC00000,0x100000);
count_quad(c);
if(no_box >= 0)
count_box(c);
wn_close(w3);
}
else
{
cl.i = _bios_keybrd(_KEYBRD_READ);
if(cl.i==0x11b)
goto stop_work;
}
}
display_results(1);
stop_work:;
}
gray_quad(frame)
char frame;
{
for(i=0;i<4;i++)
{
frame_quad[frame][i]=find_pixel(quad_left_x[i],quad_l
eft_y[i],quad_right_x[i],quad_right_y[i],1);
}
}
gray_box(frame)
char frame;
{
if(no_box >= 0)
{
for(i=0;i<=no_box;i++)
{
box_quadl[frame][i]=find_pixel(2*left_x[i],2*left_y[i
],2*right_x[i],2*right_y[i],1);
y = left_y[i];
col = 2*cent_col-right_y[i];
col1 =2*cent_col -y;
box_quadr[frame][i]=find_pixel(2*left_x[i],2*col,2*ri
ght_x[i],2*col1,1);
}}}
count_quad(frame)
char frame;
{
unsigned int i,j,k,pixel;
for(i=0;i<4;i++)
{
frame_pixel[frame][i]
=find_pixel(quad_left_x[i],quad_left_y[i],quad_right_
```

```c
x[i],quad_right_y[i],0);
}
}
count_box(frame)
char frame;
{
if(no_box >= 0)
{
for(i=0;i<=no_box;i++)
{
box_pixell[frame][i]=find_pixel(2*left_x[i],
2*left_y[i],2*right_x[i],2*right_y[i],0);
y = left_y[i];
col = 2*cent_col-right_y[i];
coll =2*cent_col -y;
box_pixelr[frame][i] =
find_pixel(2*left_x[i],2*col,2*right_x[i],2*coll,0);
}}}
open_windows(c)
char c;
{
attr= v_setatr(BLUE,RED,0,BOLD);
wn2 = wn_open(0,1,1,77,21,(BLUE << 4 | YELLOW |
BOLD),(BLUE << 4|WHITE|BOLD));
wn_locate(wn2,0,25);
wn_printf(wn2,"PAIR BEING OBSERVED : %d - %d
",first_pair[c],second_pair[c]);
wn_putsa(wn2,1,15,"Gray Values Of Quadrants
   Difference        % ",attr);
wn_putsa(wn2,16,5,"Left HALf                    Right HAlf
",attr);
w1 = wn_open(0,4,5,20,5,(RED << 4 | WHITE |
BOLD),(RED << 4 | WHITE | BOLD));
w2 = wn_open(0,4,27,20,5,(GREEN << 4 | WHITE
|BOLD),(GREEN << 4 | WHITE | BOLD));
w3 = wn_open(0,10,5,20,5,(CYAN << 4 | WHITE |
BOLD),(CYAN << 4 | WHITE | BOLD));
w4 = wn_open(0,10,27,20,5,(YELLOW << 4 | WHITE
|BOLD),(YELLOW << 4 | WHITE | BOLD));
w5= wn_open(0,4,51,25,11,(MAGENTA << 4 | WHITE |
BOLD),(MAGENTA << 4 | WHITE |BOLD));
w6 =wn_open(0,19,5,71,1,(RED << 4 | WHITE | BOLD),(
RED << 4 | WHITE | BOLD));
}
open_windp(c)
char c;
{
attr= v_setatr(BLUE,RED,0,BOLD);
wn2 = wn_open(0,1,1,77,21,(BLUE << 4 | YELLOW |
BOLD),(BLUE << 4|WHITE|BOLD));
wn_locate(wn2,0,25);
wn_printf(wn2,"PAIR BEING OBSERVED : %d - %d
",first_pair[c],second_pair[c]);
wn_putsa(wn2,1,15,"No. Of Pixels In Quadrant
   Difference        % ",attr);
wn_putsa(wn2,16,5,"Left HALf                    Right HAlf
```

```
",attr);
w1 = wn_open(0,4,5,20,5,(RED << 4 | WHITE |
BOLD),(RED << 4 | WHITE | BOLD));
w2 = wn_open(0,4,27,20,5,(GREEN << 4 | WHITE
|BOLD),(GREEN << 4 | WHITE | BOLD));
w3 = wn_open(0,10,5,20,5,(CYAN << 4 | WHITE |
BOLD),(CYAN << 4 | WHITE | BOLD));
w4 = wn_open(0,10,27,20,5,(YELLOW << 4 |.WHITE
|BOLD),(YELLOW << 4 | WHITE | BOLD));
w5= wn_open(0,4,51,25,11,(MAGENTA << 4 | WHITE |
BOLD),(MAGENTA << 4 | WHITE |BOLD));
w6 =wn_open(0,19,5,71,1,(RED << 4 | WHITE | BOLD),(
RED << 4 | WHITE | BOLD));
}
close_windows()
{
wn_close(wn2);
wn_close(w1);
wn_close(w2);
wn_close(w3);
wn_close(w4);
wn_close(w5);
wn_close(w6);
}
disp_gray1(c,side)
char c,side;
{
union inkey{
char ch[2];
int i;
}c1;
float percn,percn1;
int pixel_count;
wn_putsa(w1,1,2,"TOP LEFT ",(RED << 4 | WHITE |
BOLD));
wn_locate(w1,3,3);
wn_printf(w1,"              ");
wn_locate(w1,3,3);
wn_printf(w1,"%ld",frame_quad[c][0]);
wn_putsa(w2,1,2,"TOP RIGHT ",(GREEN << 4 | WHITE |
BOLD));
wn_locate(w2,3,3);
wn_printf(w2,"              ");
wn_locate(w2,3,3);
wn_printf(w2,"%ld",frame_quad[c][2]);
wn_putsa(w3,1,2,"BOTTOM LEFT " , (CYAN << 4 | WHITE |
BOLD));
wn_locate(w3,3,3);
wn_printf(w3,"              ");
wn_locate(w3,3,3);
wn_printf(w3,"%ld",frame_quad[c][1]);
wn_putsa(w4,1,2,"BOTTOM RIGHT ", ( YELLOW << 4 |
WHITE | BOLD));
wn_locate(w4,3,3);
wn_printf(w4,"              ");
wn_locate(w4,3,3);
```

```
wn_printf(w4,"%ld",frame_quad[c][3]);
wn_locate(w6,0,3);
wn_printf(w6,"                    ");
wn_locate(w6,0,3);
wn_printf(w6,"%ld",frame_quad[c][0]+frame_quad[c][1])
;
wn_locate(w6,0,23);
wn_printf(w6,"                    ");
wn_locate(w6,0,23);
wn_printf(w6,"%ld",frame_quad[c][2]+frame_quad[c][3])
;
switch(side)
{
case 1:
wn_locate(w5,3,1);
wn_printf(w5,"            ");
wn_locate(w5,3,1);
wn_printf(w5,"%ld",frame_quad[c][2]-
frame_quad[c][0]);
percn1 = frame_quad[c][2] *100.00;
percn = percn1/frame_quad[c][0];
wn_locate(w5,3,15);
wn_printf(w5,"         ");
wn_locate(w5,3,15);
wn_printf(w5,"%.2f",percn);
wn_locate(w5,8,3);
wn_printf(w5,"             ");
wn_locate(w5,8,3);
wn_printf(w5,"%ld",frame_quad[c][3]-
frame_quad[c][1]);
percn1 = frame_quad[c][3] *100.00;
percn = percn1/frame_quad[c][1];
wn_locate(w5,8,15);
wn_printf(w5,"         ");
wn_locate(w5,8,15);
wn_printf(w5,"%.2f",percn);
wn_locate(w6,0,52);
wn_printf(w6,"            ");
wn_locate(w6,0,52);
wn_printf(w6,"%ld",frame_quad[c][2]+frame_quad[c][3]-
frame_quad[c][0]-frame_quad[c][1]);
percn1=(frame_quad[c][2]+frame_quad[c][3])*100.00;
percn = percn1/(frame_quad[c][0]+frame_quad[c][1]);
wn_locate(w6,0,61);
wn_printf(w6,"         ");
wn_locate(w6,0,61);
wn_printf(w6,"%.2f",percn);
break;
case 2:
wn_locate(w5,3,1);
wn_printf(w5,"            ");
wn_locate(w5,3,1);
wn_printf(w5,"%ld",frame_quad[c][0]-
frame_quad[c][2]);
percn1 = frame_quad[c][0] *100.00;
percn = percn1/frame_quad[c][2];
```

```
wn_locate(w5,3,15);
wn_printf(w5,"      ");
wn_locate(w5,3,15);
wn_printf(w5,"%.2f",percn);
wn_locate(w5,8,3);
wn_printf(w5,"      ");
wn_locate(w5,8,3);
wn_printf(w5,"%ld",frame_quad[c][1]-
frame_quad[c][3]);
percn1 = frame_quad[c][1] *100.00;
percn = percn1/frame_quad[c][3];
wn_locate(w5,8,15);
wn_printf(w5,"     ");
wn_locate(w5,8,15);
wn_printf(w5,"%.2f",percn);
wn_locate(w6,0,52);
wn_printf(w6,"      ");
wn_locate(w6,0,52);
wn_printf(w6,"%ld",frame_quad[c][0]+frame_quad[c][1]-
frame_quad[c][2]-frame_quad[c][3]);
percn1=(frame_quad[c][0]+frame_quad[c][1])*100.00;
percn = percn1/(frame_quad[c][2]+frame_quad[c][3]);
wn_locate(w6,0,61);
wn_printf(w6,"     ");
wn_locate(w6,0,61);
wn_printf(w6,"%.2f",percn);
break;
)
wait_again:
while(!kbhit());
cl.i = _bios_keybrd(_KEYBRD_READ);
if(cl.i==0x1lb)return(-1);
if(cl.ch[0] != 0)
{
switch(cl.ch[0])
{
case '\r':return;
}}
goto wait_again;
)
draw_back()
{
for(i=0;i < 4;i++)
{
draw_box(quad_left_x[i],quad_left_y[i],
 quad_right_x[i],quad_right_y[i],1);
}
if(no_box >=0)
{
for(i=0;i<=no_box;i++)
{
draw_box(2*left_x[i],2*left_y[i],2*right_x[i],
 2*right_y[i],1);
y = left_y[i];
col = 2*cent_col-right_y[i];
col1 =2*cent_col -y;
```

```
draw_box(2*left_x[i],2*col,2*right_x[i],2*col1,1);
)})
open_win(c)
char c;
{
attr= v_setatr(BLUE,RED,0,BOLD);
w7 = wn_open(0,1,1,77,21,(BLUE << 4 | YELLOW |
BOLD),(BLUE << 4|WHITE|BOLD));
wn_locate(w7,0,25);
wn_printf(w7,"PAIR BEING OBSERVED : %d - %d
",first_pair[c],second_pair[c]);
wn_putsa(w7,1,15,"Gray Values Of Boxes
Difference       % ",attr);
w8 = wn_open(0,4,5,20,5,(RED << 4 | WHITE |
BOLD),(RED << 4 | WHITE | BOLD));
w9 = wn_open(0,4,27,20,5,(GREEN << 4 | WHITE
|BOLD),(GREEN << 4 | WHITE | BOLD));
w10 = wn_open(0,4,51,26,5,(MAGENTA << 4 | WHITE |
BOLD),(MAGENTA << 4|WHITE|BOLD));
w11 = wn_open(0,12,5,50,2,(CYAN << 4 | WHITE |
BOLD),(CYAN << 4 | WHITE | BOLD));
wn_putsa(w8,1,2,"LEFT HALF ",(GREEN << 4 | WHITE |
BOLD));
wn_putsa(w9,1,2,"RIGHT HALF",(GREEN << 4 | WHITE |
BOLD));
wn_putsa(w11,1,1,"Press Return To Move To Next
Box",(CYAN << 4 | WHITE | BOLD));
}
open_winp(c)
char c;
{
attr= v_setatr(BLUE,RED,0,BOLD);
w7 = wn_open(0,1,1,77,21,(BLUE << 4 | YELLOW |
BOLD),(BLUE << 4|WHITE|BOLD));
wn_locate(w7,0,25);
wn_printf(w7,"PAIR BEING OBSERVED : %d - %d
",first_pair[c],second_pair[c]);
wn_putsa(w7,1,15,"Number Of Pixels In Boxes
Difference       % ",attr);
w8 = wn_open(0,4,5,20,5,(RED << 4 | WHITE |
BOLD),(RED << 4 | WHITE | BOLD));
w9 = wn_open(0,4,27,20,5,(GREEN << 4 | WHITE
|BOLD),(GREEN << 4 | WHITE | BOLD));
w10 = wn_open(0,4,51,26,5,(MAGENTA << 4 | WHITE |
BOLD),(MAGENTA << 4|WHITE|BOLD));
w11 = wn_open(0,12,5,50,2,(CYAN << 4 | WHITE |
BOLD),(CYAN << 4 | WHITE | BOLD));
wn_putsa(w8,1,2,"LEFT HALF ",(GREEN << 4 | WHITE |
BOLD));
wn_putsa(w9,1,2,"RIGHT HALF",(GREEN << 4 | WHITE |
BOLD));
wn_putsa(w11,1,1,"Press Return To Move To Next
Box",(CYAN << 4 | WHITE | BOLD));
}
close_win()
```

```c
{
wn_close(w7);
wn_close(w8);
wn_close(w9);
wn_close(w10);
wn_close(w11);
}
disp_box1(frame,side)
char frame,side;
{
union inkey{
char ch[2];
int i;
}c;
float percn1,percn;
char fin1;
char x;
for(x=0;x<=no_box;x++)
{
wn_locate(w8,3,1);
wn_printf(w8,"            ");
wn_locate(w8,3,1);
wn_printf(w8,"%ld",box_quadl[frame][x]);
wn_locate(w9,3,1);
wn_printf(w9,"            ");
wn_locate(w9,3,1);
wn_printf(w9,"%ld",box_quadr[frame][x]);
switch(side)
{
case 1:
wn_locate(w10,3,1);
wn_printf(w10,"            ");
wn_locate(w10,3,1);
wn_printf(w10,"%ld",
 box_quadr[frame][x]-box_quadl[frame][x]);
percn1 = box_quadr[frame][x] * 100.0;
percn = percn1 /box_quadl[frame][x];
wn_locate(w10,3,15);
wn_printf(w10,"          ");
wn_locate(w10,3,15);
wn_printf(w10,"%.2f",percn);
break;
case 2:
wn_locate(w10,3,1);
wn_printf(w10,"            ");
wn_locate(w10,3,1);
wn_printf(w10,"%ld",
 box_quadl[frame][x]-box_quadr[frame][x]);
percn1 = box_quadl[frame][x] * 100.0;
percn = percn1 /box_quadr[frame][x];
wn_locate(w10,3,15);
wn_printf(w10,"          ");
wn_locate(w10,3,15);
wn_printf(w10,"%.2f",percn);
break;
}
```

```
draw_back();
fin1 =0;
do
{
if(!kbhit())
{
draw_box(2*left_x[x],2*left_y[x],2*right_x[x],2*right_y[x],0);
draw_box(2*left_x[x],2*left_y[x],2*right_x[x],2*right_y[x],1);
}
else
{
c.i = _bios_keybrd(_KEYBRD_READ);
if(c.i==0x11b)return(-1);
if(c.ch[0] != 0)
{
switch(c.ch[0])
{
case '\r': fin1 =1;
break;
}}}}
while(!fin1);
}}
disp_quadp(c,side)
char c,side;
{
union inkey{
char ch[2];
int i;
}c1;
float percn,percn1;
int pixel_count;
wn_putsa(w1,1,2,"TOP LEFT ",(RED << 4 | WHITE | BOLD));
wn_locate(w1,3,3);
wn_printf(w1,"              ");
wn_locate(w1,3,3);
wn_printf(w1,"%ld",frame_pixel[c][0]);
wn_putsa(w2,1,2,"TOP RIGHT ",(GREEN << 4 | WHITE | BOLD));
wn_locate(w2,3,3);
wn_printf(w2,"              ");
wn_locate(w2,3,3);
wn_printf(w2,"%ld",frame_pixel[c][2]);
wn_putsa(w3,1,2,"BOTTOM LEFT " , (CYAN << 4 | WHITE | BOLD));
wn_locate(w3,3,3);
wn_printf(w3,"              ");
wn_locate(w3,3,3);
wn_printf(w3,"%ld",frame_pixel[c][1]);
wn_putsa(w4,1,2,"BOTTOM RIGHT ", ( YELLOW << 4 | WHITE | BOLD));
wn_locate(w4,3,3);
wn_printf(w4,"              ");
wn_locate(w4,3,3);
```

```
wn_printf(w4,"%ld",frame_pixel[c][3]);
wn_locate(w6,0,3);
wn_printf(w6,"            ");
wn_locate(w6,0,3);
wn_printf(w6,"%ld",frame_pixel[c][0]+frame_pixel[c][1
]);
wn_locate(w6,0,23);
wn_printf(w6,"            ");
wn_locate(w6,0,23);
wn_printf(w6,"%ld",
 frame_pixel[c][2]+frame_pixel[c][3]);
switch(side)
{
case 1:
wn_locate(w5,3,1);
wn_printf(w5,"             ");
wn_locate(w5,3,1);
wn_printf(w5,"%ld",
 frame_pixel[c][2]- frame_pixel[c][0]);
percn1 = frame_pixel[c][2] *100.00;
percn = percn1/frame_pixel[c][0];
wn_locate(w5,3,15);
wn_printf(w5,"        ");
wn_locate(w5,3,15);
wn_printf(w5,"%.2f",percn);
wn_locate(w5,8,3);
wn_printf(w5,"          ");
wn_locate(w5,8,3);
wn_printf(w5,"%ld",
 frame_pixel[c][3]- frame_pixel[c][1]);
percn1 = frame_pixel[c][3] *100.00;
percn = percn1/frame_pixel[c][1];
wn_locate(w5,8,15);
wn_printf(w5,"      ");
wn_locate(w5,8,15);
wn_printf(w5,"%.2f",percn);
wn_locate(w6,0,52);
wn_printf(w6,"         ");
wn_locate(w6,0,52);
wn_printf(w6,"%ld",frame_pixel[c][2]+frame_pixel[c][3
]-frame_pixel[c][0]-frame_pixel[c][1]);
percn1=(frame_pixel[c][2]+frame_pixel[c][3])*100.00;
percn = percn1/(frame_pixel[c][0]+frame_pixel[c][1]);
wn_locate(w6,0,61);
wn_printf(w6,"        ");
wn_locate(w6,0,61);
wn_printf(w6,"%.2f",percn);
break;
case 2:
wn_locate(w5,3,1);
wn_printf(w5,"             ");
wn_locate(w5,3,1);
wn_printf(w5,"%ld",frame_pixel[c][0]-
frame_pixel[c][2]);
percn1 = frame_pixel[c][0] *100.00;
percn = percn1/frame_pixel[c][2];
```

```
wn_locate(w5,3,15);
wn_printf(w5,"        ");
wn_locate(w5,3,15);
wn_printf(w5,"%.2f",percn);
wn_locate(w5,8,3);
wn_printf(w5,"        ");
wn_locate(w5,8,3);
wn_printf(w5,"%ld",frame_pixel[c][1]-
frame_pixel[c][3]);
percn1 = frame_pixel[c][1] *100.00;
percn = percn1/frame_pixel[c][3];
wn_locate(w5,8,15);
wn_printf(w5,"        ");
wn_locate(w5,8,15);
wn_printf(w5,"%.2f",percn);
wn_locate(w6,0,52);
wn_printf(w6,"        ");
wn_locate(w6,0,52);
wn_printf(w6,"%ld",frame_pixel[c][0]+frame_pixel[c][1
]-frame_pixel[c][2]-frame_pixel[c][3]);
percn1=(frame_pixel[c][0]+frame_pixel[c][1])*100.00;
percn = percn1/(frame_pixel[c][2]+frame_pixel[c][3]);
wn_locate(w6,0,61);
wn_printf(w6,"        ");
wn_locate(w6,0,61);
wn_printf(w6,"%.2f",percn);
break;
}
wait_again1:
while(!kbhit());
c1.i = _bios_keybrd(_KEYBRD_READ);
if(c1.i==0x11b)
return(-1);
if(c1.ch[0] != 0)
{
switch(c1.ch[0])
{
case '\r':return;
}}
goto wait_again1;
}
disp_boxp(frame,side)
char frame,side;
{
union inkey{
char ch[2];
int i;
}c;
float percn1,percn;
char fin1;
char x;
for(x=0;x<=no_box;x++)
{
wn_locate(w8,3,1);
wn_printf(w8,"        ");
wn_locate(w8,3,1);
```

```
wn_printf(w8,"%ld",box_pixell[frame][x]);
wn_locate(w9,3,1);
wn_printf(w9,"                    ");
wn_locate(w9,3,1);
wn_printf(w9,"%ld",box_pixelr[frame][x]);
switch(side)
{
case 1:
wn_locate(w10,3,1);
wn_printf(w10,"                    ");
wn_locate(w10,3,1);
wn_printf(w10,"%ld",box_pixelr[frame][x]-box_pixell[frame][x]);
percn1 = box_pixelr[frame][x] * 100.0;
percn = percn1 /box_pixell[frame][x];
wn_locate(w10,3,15);
wn_printf(w10,"        ");
wn_locate(w10,3,15);
wn_printf(w10,"%.2f",percn);
break;
case 2:
wn_locate(w10,3,1);
wn_printf(w10,"                    ");
wn_locate(w10,3,1);
wn_printf(w10,"%ld",box_pixell[frame][x]-box_pixelr[frame][x]);
percn1 = box_pixell[frame][x] * 100.0;
percn = percn1 /box_pixelr[frame][x];
wn_locate(w10,3,15);
wn_printf(w10,"        ");
wn_locate(w10,3,15);
wn_printf(w10,"%.2f",percn);
break;
}
draw_back();
fin1 =0;
do
{
if(!kbhit())
{
draw_box(2*left_x[x],2*left_y[x],2*right_x[x],2*right_y[x],0);
draw_box(2*left_x[x],2*left_y[x],2*right_x[x],2*right_y[x],1);
}
else
{
c.i = _bios_keybrd(_KEYBRD_READ);
if(c.i==0x11b)return(-1);
if(c.ch[0] != 0)
{
switch(c.ch[0])
{
case '\r': fin1 =1;
break;
}}}}
```

```
while(!fin1);
}
}
display_results(attr)
char attr;
{
union inkey{
char ch[2];
int i;
}c1;
char fin2,c,c2;
fin2=0;
strcpy(title," SELECT NORMAL SIDE");
do
{
rv2=popup(0,8,25,40,7,batrib,batrib,&ref_menu,FALSE,title);
switch(rv2)
{
case 1: side =1;
break;
case 2: side=2;
break;
case 3: fin2=1;
wn_close(ref_menu.wpsave);
ref_menu.winopn = FALSE;
break;
}
if(fin2 !=1)
{
for(c=0;c<=pair_no;c++)
{
if(!kbhit())
{
w3 =wn_open(0,10,25,20,2,(BLUE << 4 | YELLOW |
BOLD),(BLUE << 4 | WHITE | BOLD));
wn_locate(w3,1,1);
wn_printf(w3,"Please Wait ...");
difference(start_frame[first_pair[c]],start_frame[second_pair[c]]);
mvbuf(0x100000,0xC00000);
draw_back();
wn_close(w3);
open_windows(c);
c2=disp_gray1(c,side);
if(c2==-1)
{ close_windows();
goto stop_display;
}
if(no_box >= 0)
{
open_win(c);
c2 =disp_box1(c,side);
if(c2 == -1)
{
close_win();
```

```
close_windows();
goto stop_display;
}
close_win();
}
close_windows();
if(print_flag == TRUE)
{if(attr == 1)
print(c);
}
if(disk_flag == TRUE)
{if(attr == 1)
disk_p(c);
}
w3 = wn_open(0,10,25,20,2,(BLUE << 4 | YELLOW |
BOLD),(BLUE << 4 | WHITE | BOLD));
wn_locate(w3,1,1);
wn_printf(w3,"Please Wait ....");
mvbuf(0x100000,0xC00000);
make_cat();
adjust_thresh();
draw_back();
wn_close(w3);
open_windp(c);
c2 =disp_quadp(c,side);
if(c2 == -1)
{close_windows();
goto stop_display;}
if(no_box >=0)
{ open_winp(c);
c2 =disp_boxp(c,side);
if(c2 == -1)
{close_win();
close_windows();
goto stop_display;}
close_win();
}
close_windows();
if(print_flag == TRUE)
{
if (attr ==1) print_thresh(c);
}
if(disk_flag == TRUE)
{if(attr == 1)
disk_ph(c);
})})}
while(!fin2);
stop_display:;
}
print(c)
char c;
{
float percn,percn1,percn2;
int i,j,line;
printer_reset();
line=1;
```

```
fprintf(stdprn,"_____
                                              \n\n");
line=4;                                       FINAL
fprintf(stdprn,"
REPORT     ");
fprintf(stdprn,"\n\n  PAIRS %d - %d     PATIENT NAME
: %s      CARD No. :
%s",first_pair[c],second_pair[c],pat_name,card_no);
fprintf(stdprn,"\n\n  DATE: %02d/%02d/%02d  TAPE NO :
%d    AREA EXAMINED :
%s\n",month,day,year,tape_no,area_examined);
fprintf(stdprn,"\n\n                              GRAY VALUES
OF QUADRANTS         \n");
fprintf(stdprn,"
-----------------------                \n");
line =10;
fprintf(stdprn,"\n----------------------------------
-------------------------------");
fprintf(stdprn,"\n\n TOP LEFT QUADRANT       :
%ld",frame_quad[c][0]);
percn1 = frame_quad[c][2] *100.00;
percn = percn1/frame_quad[c][0];
percn1 =frame_quad[c][0]*100.00;
percn2 = percn1/frame_quad[c][2];
fprintf(stdprn,"\n\n          DIFF : %ld   %c(L/R) :
%.2f   %c(R/L) :
%.2f",frame_quad[c][2]-frame_quad[c][0],'%',percn2,'%
',percn);
fprintf(stdprn,"\n\n TOP RIGHT QUADRANT      :
%ld",frame_quad[c][2]);
fprintf(stdprn,"\n\n BOTTOM LEFT  QUADRANT   :
%ld",frame_quad[c][1]);
percn1 = frame_quad[c][3] *100.00;
percn = percn1/frame_quad[c][1];
percn1 =frame_quad[c][1]*100.00;
percn2 = percn1/frame_quad[c][3];
fprintf(stdprn,"\n          DIFF : %ld   %c(L/R) : %.2f
 %c(R/L) :
%.2f",frame_quad[c][3]-frame_quad[c][1],'%',percn2,'%
',percn);
fprintf(stdprn,"\n\n BOTTOM RIGHT QUADRANT   :
%ld",frame_quad[c][3]);
fprintf(stdprn,"\n\n-----------------------------------
-----------------------------\n\n");
                                              NO.
fprintf(stdprn,"\n\n
OF BOXES SELECTED - %d",no_box+1);
fprintf(stdprn,"\n
-------------------------\n");
switch(no_box)
{
case 1:
fprintf(stdprn,"\nBOX   1:    %s\n\n",box_string[0]);
fprintf(stdprn,"\n\n-----------------------------------
-----------------------------\n\n");
fprintf(stdprn,"\n\nGRAY VALUE OF LEFT HALF BOX :
%ld",box_quad1[c][0]);
```

```
percn1 = box_quadr[c][0] *100.00;
percn = percn1/box_quadl[c][0];
percn1 =box_quadl[c][0]*100.00;
percn2 = percn1/box_quadr[c][0];
fprintf(stdprn,"\n            DIFF : %ld    %c(L/R) : %.2f
 %c(R/L) :
%.2f",box_quadr[c][0]-box_quadl[c][0],'%',percn2,'%',
percn);
fprintf(stdprn,"\n\nGRAY VALUE OF RIGHT HALF BOX :
%ld",box_quadr[c][0]);
line =42;
fprintf(stdprn,"\n\n-----------------------------------
------------------------------------\n\n");
fprintf(stdprn,"\n\n\nBOX   2:
%s\n\n",box_string[1]);
fprintf(stdprn,"\n\n-----------------------------------
------------------------------------\n\n");
fprintf(stdprn,"\n\nGRAY VALUE OF LEFT HALF BOX :
%ld",box_quadl[c][1]);
percn1 = box_quadr[c][1] *100.00;
percn = percn1/box_quadl[c][1];
percn1 =box_quadl[c][1]*100.00;
percn2 = percn1/box_quadr[c][1];
fprintf(stdprn,"\n            DIFF : %ld    %c(L/R) : %.2f
 %c(R/L) :
%.2f",box_quadr[c][1]-box_quadl[c][1],'%',percn2,'%',
percn);
fprintf(stdprn,"\n\nGRAY VALUE OF RIGHT HALF BOX :
%ld",box_quadr[c][1]);
line =42;
fprintf(stdprn,"\n\n-----------------------------------
------------------------------------\n\n");

line = 64;
for(i=line;i<66;i++)
{
fprintf(stdprn,"\n");
}
fflush(stdprn);
break;
case 0:
fprintf(stdprn,"\nBOX  1:     %s\n\n",box_string[0]);
fprintf(stdprn,"\n\n-----------------------------------
------------------------------------\n\n");
fprintf(stdprn,"\n\nGRAY VALUE OF LEFT HALF BOX :
%ld",box_quadl[c][0]);
percn1 = box_quadr[c][0] *100.00;
percn = percn1/box_quadl[c][0];
percn1 =box_quadl[c][0]*100.00;
percn2 = percn1/box_quadr[c][0];
fprintf(stdprn,"\n            DIFF : %ld    %c(L/R) :
%.2f    %c(R/L) :
%.2f",box_quadr[c][0]-box_quadl[c][0],'%',percn2,'%',
percn);
fprintf(stdprn,"\n\nGRAY VALUE OF RIGHT HALF BOX :
%ld",box_quadr[c][0]);
```

```
line =42;
fprintf(stdprn,"\n\n------------------------------------
------------------------------------\n\n");
fprintf(stdprn,"\n
    ");
fprintf(stdprn,"\n
    ");
fprintf(stdprn,"\n
    ");
fprintf(stdprn,"\n
    ");
line = 50;
for(i=line;i<66;i++)
{
fprintf(stdprn,"\n");
}
fflush(stdprn);
break;
case 2:
fprintf(stdprn,"\nBOX  1:    %s\n\n",box_string[0]);
fprintf(stdprn,"\n\n------------------------------------
------------------------------------\n\n");
fprintf(stdprn,"\n\nGRAY VALUE OF LEFT HALF BOX :
%ld",box_quadl[c][0]);
percn1 = box_quadr[c][0] *100.00;
percn = percn1/box_quadl[c][0];
percn1 =box_quadl[c][0]*100.00;
percn2 = percn1/box_quadr[c][0];
fprintf(stdprn,"\n           DIFF : %ld   %c(L/R) : %.2f
 %c(R/L) :
%.2f",box_quadr[c][0]-box_quadl[c][0],'%',percn2,'%',
percn);
fprintf(stdprn,"\n\nGRAY VALUE OF RIGHT HALF BOX :
%ld",box_quadr[c][0]);
line =42;
fprintf(stdprn,"\n\n------------------------------------
------------------------------------\n\n");
fprintf(stdprn,"\n\n\nBOX  2:
%s\n\n",box_string[1]);
fprintf(stdprn,"\n\n------------------------------------
------------------------------------\n\n");
fprintf(stdprn,"\n\nGRAY VALUE OF LEFT HALF BOX :
%ld",box_quadl[c][1]);
percn1 = box_quadr[c][1] *100.00;
percn = percn1/box_quadl[c][1];
percn1 =box_quadl[c][1]*100.00;
percn2 = percn1/box_quadr[c][1];
fprintf(stdprn,"\n           DIFF : %ld   %c(L/R) : %.2f
 %c(R/L) :
%.2f",box_quadr[c][1]-box_quadl[c][1],'%',percn2,'%',
percn);
fprintf(stdprn,"\n\nGRAY VALUE OF RIGHT HALF BOX :
%ld",box_quadr[c][1]);
line =42;
fprintf(stdprn,"\n\n------------------------------------
------------------------------------\n\n");
line = 64;
```

```c
for(i=line;i<66;i++)
{
fprintf(stdprn,"\n");
}
fflush(stdprn);
line =1;
fprintf(stdprn,"\nBOX  3:     %s\n\n",box_string[2]);
fprintf(stdprn,"\n\n-------------------------------------------------------------------\n\n");
fprintf(stdprn,"\n\nGRAY VALUE OF LEFT HALF BOX :
%ld",box_quadl[c][2]);
percn1 = box_quadr[c][2] *100.00;
percn = percn1/box_quadl[c][2];
percn1 =box_quadl[c][2]*100.00;
percn2 = percn1/box_quadr[c][2];
fprintf(stdprn,"\n            DIFF : %ld    %c(L/R) : %.2f
 %c(R/L) :
 %.2f",box_quadr[c][2]-box_quadl[c][2],'%',percn2,'%',
percn);
fprintf(stdprn,"\n\nGRAY VALUE OF RIGHT HALF BOX :
%ld",box_quadr[c][2]);
fprintf(stdprn,"\n\n-------------------------------------------------------------------\n\n");
fprintf(stdprn,"\n
");
fprintf(stdprn,"\n
");
fprintf(stdprn,"\n
");
fprintf(stdprn,"\n
");
line = 18;
for(i=line;i<66;i++)
{
fprintf(stdprn,"\n");
}
fflush(stdprn);
break;
case 3:
fprintf(stdprn,"\nBOX  1:     %s\n\n",box_string[0]);
fprintf(stdprn,"\n\n-------------------------------------------------------------------\n\n");
fprintf(stdprn,"\n\nGRAY VALUE OF LEFT HALF BOX :
%ld",box_quadl[c][0]);
percn1 = box_quadr[c][0] *100.00;
percn = percn1/box_quadl[c][0];
percn1 =box_quadl[c][0]*100.00;
percn2 = percn1/box_quadr[c][0];
fprintf(stdprn,"\n            DIFF : %ld    %c(L/R) : %.2f
 %c(R/L) :
 %.2f",box_quadr[c][0]-box_quadl[c][0],'%',percn2,'%',
percn);
fprintf(stdprn,"\n\nGRAY VALUE OF RIGHT HALF BOX :
%ld",box_quadr[c][0]);
line =42;
fprintf(stdprn,"\n\n-------------------------------------
```

```
fprintf(stdprn,"\n\n\nBOX   2:                                    -\n\n");
%s\n\n",box_string[1]);
fprintf(stdprn,"\n\n----------------------------------------
-----------------------------------------------\n\n");
fprintf(stdprn,"\n\nGRAY VALUE OF LEFT HALF BOX :
%ld",box_quadl[c][1]);
percn1 = box_quadr[c][1] *100.00;
percn = percn1/box_quadl[c][1];
percn1 =box_quadl[c][1]*100.00;
percn2 = percn1/box_quadr[c][1];
fprintf(stdprn,"\n         DIFF : %ld    %c(L/R) : %.2f
 %c(R/L) :
%.2f",box_quadr[c][1]-box_quadl[c][1],'%',percn2,'%',
percn);
fprintf(stdprn,"\n\nGRAY VALUE OF RIGHT HALF BOX :
%ld",box_quadr[c][1]);
line =42;
fprintf(stdprn,"\n\n----------------------------------------
-----------------------------------------------\n\n");

line = 64;
for(i=line;i<66;i++)
{
fprintf(stdprn,"\n");
}
fflush(stdprn);
line =1;
fprintf(stdprn,"\nBOX   3:    %s\n\n",box_string[2]);
fprintf(stdprn,"\n\n----------------------------------------
-----------------------------------------------\n\n");
fprintf(stdprn,"\n\nGRAY VALUE OF LEFT HALF BOX :
%ld",box_quadl[c][2]);
percn1 = box_quadr[c][2] *100.00;
percn = percn1/box_quadl[c][2];
percn1 =box_quadl[c][2]*100.00;
percn2 = percn1/box_quadr[c][2];
fprintf(stdprn,"\n         DIFF : %ld    %c(L/R) : %.2f
 %c(R/L) :
%.2f",box_quadr[c][2]-box_quadl[c][2],'%',percn2,'%',
percn);
fprintf(stdprn,"\n\nGRAY VALUE OF RIGHT HALF BOX :
%ld",box_quadr[c][2]);
fprintf(stdprn,"\n\n----------------------------------------
-----------------------------------------------\n\n");
fprintf(stdprn,"\n
");
fprintf(stdprn,"\n
");
fprintf(stdprn,"\n
");
fprintf(stdprn,"\n
");
line = 18;
fprintf(stdprn,"\nBOX   4:    %s\n\n",box_string[3]);
fprintf(stdprn,"\n\n----------------------------------------
-----------------------------------------------\n\n");
```

```
fprintf(stdprn,"\n\nGRAY VALUE OF LEFT HALF BOX :
%ld",box_quadl[c][3]);
percn1 = box_quadr[c][3] *100.00;
percn = percn1/box_quadl[c][3];
percn1 =box_quadl[c][3]*100.00;
percn2 = percn1/box_quadr[c][3];
fprintf(stdprn,"\n          DIFF : %ld    %c(L/R) : %.2f
 %c(R/L) :
%.2f",box_quadr[c][3]-box_quadl[c][3],'%',percn2,'%',
percn);
fprintf(stdprn,"\n\nGRAY VALUE OF RIGHT HALF BOX :
%ld",box_quadr[c][3]);
fprintf(stdprn,"\n\n-----------------------------------
-----------------------------------\n\n");
fprintf(stdprn,"\n
    ");
fprintf(stdprn,"\n
    ");
fprintf(stdprn,"\n
    ");
fprintf(stdprn,"\n
    ");
line =36;
for(i=line;i<66;i++)
{
fprintf(stdprn,"\n");
}
fflush(stdprn);
break;
}
}
print_thresh(c)
char c;
{
float percn,percn1,percn2;
int i,j,line;
printer_reset();
line=1;
fprintf(stdprn,"_____
_____\n\n");
line=4;
fprintf(stdprn,"\n\n  PAIRS %d - %d        PATIENT
NAME:  %s     CARD NO. :
%s",first_pair[c],second_pair[c],pat_name,card_no);
fprintf(stdprn,"\n\n  DATE: %02d/%02d/%02d TAPE NO :
%d   AREA EXAMINED :
%s\n",month,day,year,tape_no,area_examined);
fprintf(stdprn,"\n\n                                NO. OF
WHITE PIXELS IN QUADRANTS AFTER THRESHOLDING
\n");
fprintf(stdprn,"_____
__      \n");
fprintf(stdprn,"\n   THRESHOLD VALUE SELECTED :
%.2f\n",new_thresh1);
line =12;
```

```
fprintf(stdprn,"\n-----------------------------------");
fprintf(stdprn,"\n\n TOP LEFT QUADRANT      :
%ld",frame_pixel[c][0]);
percn1 = frame_pixel[c][2] *100.00;
percn = percn1/frame_pixel[c][0];
percn1 =frame_pixel[c][0]*100.00;
percn2 = percn1/frame_pixel[c][2];
fprintf(stdprn,"\n           DIFF : %ld    %c(L/R) : %.2f
 %c(R/L) :
%.2f",frame_pixel[c][2]-frame_pixel[c][0],'%',percn2,
'%',percn);
fprintf(stdprn,"\n\n TOP RIGHT QUADRANT     :
%ld",frame_pixel[c][2]);
fprintf(stdprn,"\n\n BOTTOM LEFT  QUADRANT  :
%ld",frame_pixel[c][1]);
percn1 = frame_pixel[c][3] *100.00;
percn = percn1/frame_pixel[c][1];
percn1 =frame_pixel[c][1]*100.00;
percn2 = percn1/frame_pixel[c][3];
fprintf(stdprn,"\n           DIFF : %ld    %c(L/R) : %.2f
 %c(R/L) :
%.2f",frame_pixel[c][3]-frame_pixel[c][1],'%',percn2,
'%',percn);
fprintf(stdprn,"\n\n BOTTOM RIGHT QUADRANT  :
%ld",frame_pixel[c][3]);
fprintf(stdprn,"\n\n-------------------------------\n\n");
                                                       NO.
fprintf(stdprn,"\n\n
OF BOXES SELECTED - %d",no_box+1);
fprintf(stdprn,"\n
--------------------------\n");
switch(no_box)
{
case 0:
fprintf(stdprn,"\nBOX  1:   %s\n\n",box_string[0]);
fprintf(stdprn,"\n\n-----------------------------------\n\
n");
fprintf(stdprn,"\n\nPIXEL VALUE OF LEFT HALF BOX :
%ld",box_pixell[c][0]);
percn1 = box_pixelr[c][0] *100.00;
percn = percn1/box_pixell[c][0];
percn1 =box_pixell[c][0]*100.00;
percn2 = percn1/box_pixelr[c][0];
fprintf(stdprn,"\n          DIFF : %ld    %c(L/R) :
%.2f   %c(R/L) :
%.2f",box_pixelr[c][0]-box_pixell[c][0],'%',percn2,'%
',percn);
fprintf(stdprn,"\n\nPIXEL VALUE OF RIGHT HALF BOX :
%ld",box_pixelr[c][0]);
fprintf(stdprn,"\n\n-----------------------------\n\n");

line =49;
for(i=line;i<66;i++)
{
```

```
fprintf(stdprn,"\n");
}
fflush(stdprn);
break;
case 1:
fprintf(stdprn,"\nBOX  1:    %s\n\n",box_string[0]);
fprintf(stdprn,"\n\n----------------------------------\n\
----------------------------------------------
n");
fprintf(stdprn,"\n\nPIXEL VALUE OF LEFT HALF BOX :
%ld",box_pixell[c][0]);
percn1 = box_pixelr[c][0] *100.00;
percn = percn1/box_pixell[c][0];
percn1 =box_pixell[c][0]*100.00;
percn2 = percn1/box_pixelr[c][0];
fprintf(stdprn,"\n          DIFF : %ld   %c(L/R) : %.2f
 %c(R/L) :
%.2f",box_pixelr[c][0]-box_pixell[c][0],'%',percn2,'%
',percn);
fprintf(stdprn,"\n\nPIXEL VALUE OF RIGHT HALF BOX :
%ld",box_pixelr[c][0]);
fprintf(stdprn,"\n\n----------------------------------
-----------------------------------------\n\n");
fprintf(stdprn,"\nBOX  2:    %s\n\n",box_string[1]);
fprintf(stdprn,"\n\n----------------------------------\n\
----------------------------------------------
n");
fprintf(stdprn,"\n\nPIXEL VALUE OF LEFT HALF BOX :
%ld",box_pixell[c][1]);
percn1 = box_pixelr[c][1] *100.00;
percn = percn1/box_pixell[c][1];
percn1 =box_pixell[c][1]*100.00;
percn2 = percn1/box_pixelr[c][1];
fprintf(stdprn,"\n          DIFF : %ld   %c(L/R) : %.2f
 %c(R/L) :
%.2f",box_pixelr[c][1]-box_pixell[c][1],'%',percn2,'%
',percn);
fprintf(stdprn,"\n\nPIXEL VALUE OF RIGHT HALF BOX :
%ld",box_pixelr[c][1]);
fprintf(stdprn,"\n\n----------------------------------
-----------------------------------------\n\n");

line =63;
for(i=line;i<66;i++)
{
fprintf(stdprn,"\n");
}
fflush(stdprn);
break;
case 2:
fprintf(stdprn,"\nBOX  1:    %s\n\n",box_string[0]);
fprintf(stdprn,"\n\n----------------------------------\n\
----------------------------------------------
n");
fprintf(stdprn,"\n\nPIXEL VALUE OF LEFT HALF BOX :
%ld",box_pixell[c][0]);
percn1 = box_pixelr[c][0] *100.00;
```

```c
percn = percn1/box_pixell[c][0];
percn1 =box_pixell[c][0]*100.00;
percn2 = percn1/box_pixelr[c][0];
fprintf(stdprn,"\n          DIFF : %ld    %c(L/R) : %.2f
 %c(R/L) :
%.2f",box_pixelr[c][0]-box_pixell[c][0],'%',percn2,'%
',percn);
fprintf(stdprn,"\n\nPIXEL VALUE OF RIGHT HALF BOX :
%ld",box_pixelr[c][0]);
fprintf(stdprn,"\n\n-------------------------------
---------------------------------\n\n");
fprintf(stdprn,"\nBOX  2:     %s\n\n",box_string[1]);
fprintf(stdprn,"\n\n---------------------------------
----------------------------------\n\
n");
fprintf(stdprn,"\n\nPIXEL VALUE OF LEFT HALF BOX :
%ld",box_pixell[c][1]);
percn1 = box_pixelr[c][1] *100.00;
percn = percn1/box_pixell[c][1];
percn1 =box_pixell[c][1]*100.00;
percn2 = percn1/box_pixelr[c][1];
fprintf(stdprn,"\n          DIFF : %ld    %c(L/R) : %.2f
 %c(R/L) :
%.2f",box_pixelr[c][1]-box_pixell[c][1],'%',percn2,'%
',percn);
fprintf(stdprn,"\n\nPIXEL VALUE OF RIGHT HALF BOX :
%ld",box_pixelr[c][1]);
fprintf(stdprn,"\n\n---------------------------------
----------------------------\n\n");

line =63;
for(i=line;i<66;i++)
{
fprintf(stdprn,"\n");
}
fflush(stdprn);
line =1;
fprintf(stdprn,"\nBOX  3:     %s\n\n",box_string[2]);
fprintf(stdprn,"\n\n---------------------------------
----------------------------------\n\
n");
fprintf(stdprn,"\n\nPIXEL VALUE OF LEFT HALF BOX :
%ld",box_pixell[c][2]);
percn1 = box_pixelr[c][2] *100.00;
percn = percn1/box_pixell[c][2];
percn1 =box_pixell[c][2]*100.00;
percn2 = percn1/box_pixelr[c][2];
fprintf(stdprn,"\n          DIFF : %ld    %c(L/R) : %.2f
 %c(R/L) :
%.2f",box_pixelr[c][2]-box_pixell[c][2],'%',percn2,'%
',percn);
fprintf(stdprn,"\n\nPIXEL VALUE OF RIGHT HALF BOX :
%ld",box_pixelr[c][2]);
fprintf(stdprn,"\n\n---------------------------------
----------------------------\n\n");

line =13;
for(i=line;i<66;i++)
```

```
{
fprintf(stdprn,"\n");
}
fflush(stdprn);
break;
case 3:
fprintf(stdprn,"\nBOX  1:      %s\n\n",box_string[0]);
fprintf(stdprn,"\n\n-------------------------------------\n\
n");
fprintf(stdprn,"\n\nPIXEL VALUE OF LEFT HALF BOX :
%ld",box_pixell[c][0]);
percn1 = box_pixelr[c][0] *100.00;
percn = percn1/box_pixell[c][0];
percn1 =box_pixell[c][0]*100.00;
percn2 = percn1/box_pixelr[c][0];
fprintf(stdprn,"\n           DIFF : %ld   %c(L/R) : %.2f
  %c(R/L) :
%.2f",box_pixelr[c][0]-box_pixell[c][0],'%',percn2,'%
',percn);
fprintf(stdprn,"\n\nPIXEL VALUE OF RIGHT HALF BOX :
%ld",box_pixelr[c][0]);
fprintf(stdprn,"\n\n-------------------------------------\n\n");

fprintf(stdprn,"\nBOX  2:      %s\n\n",box_string[1]);
fprintf(stdprn,"\n\n-------------------------------------\n\
n");
fprintf(stdprn,"\n\nPIXEL VALUE OF LEFT HALF BOX :
%ld",box_pixell[c][1]);
percn1 = box_pixelr[c][1] *100.00;
percn = percn1/box_pixell[c][1];
percn1 =box_pixell[c][1]*100.00;
percn2 = percn1/box_pixelr[c][1];
fprintf(stdprn,"\n           DIFF : %ld   %c(L/R) : %.2f
  %c(R/L) :
%.2f",box_pixelr[c][1]-box_pixell[c][1],'%',percn2,'%
',percn);
fprintf(stdprn,"\n\nPIXEL VALUE OF RIGHT HALF BOX :
%ld",box_pixelr[c][1]);
fprintf(stdprn,"\n\n-------------------------------------\n\n");

line =63;
for(i=line;i<66;i++)
{
fprintf(stdprn,"\n");
}
fflush(stdprn);
fprintf(stdprn,"\nBOX  3:      %s\n\n",box_string[2]);
fprintf(stdprn,"\n\n-------------------------------------\n\
n");
fprintf(stdprn,"\n\nPIXEL VALUE OF LEFT HALF BOX :
%ld",box_pixell[c][2]);
percn1 = box_pixelr[c][2] *100.00;
percn = percn1/box_pixell[c][2];
```

```
percn1 =box_pixell[c][2]*100.00;
percn2 = percn1/box_pixelr[c][2];
fprintf(stdprn,"\n           DIFF : %ld    %c(L/R) : %.2f
%c(R/L) :
%.2f",box_pixelr[c][2]-box_pixell[c][2],'%',percn2,'%
',percn);
fprintf(stdprn,"\n\nPIXEL VALUE OF RIGHT HALF BOX :
%ld",box_pixelr[c][2]);
fprintf(stdprn,"\n\n---------------------------------
-----------------------------------\n\n");
fprintf(stdprn,"\nBOX 4:    %s\n\n",box_string[3]);
fprintf(stdprn,"\n\n---------------------------------
-----------------------------------\n\
n");
fprintf(stdprn,"\n\nPIXEL VALUE OF LEFT HALF BOX :
%ld",box_pixell[c][3]);
percn1 = box_pixelr[c][3] *100.00;
percn = percn1/box_pixell[c][3];
percn1 =box_pixell[c][3]*100.00;
percn2 = percn1/box_pixelr[c][3];
fprintf(stdprn,"\n           DIFF : %ld    %c(L/R) : %.2f
%c(R/L) :
%.2f",box_pixelr[c][3]-box_pixell[c][3],'%',percn2,'%
',percn);
fprintf(stdprn,"\n\nPIXEL VALUE OF RIGHT HALF BOX :
%ld",box_pixelr[c][3]);
fprintf(stdprn,"\n\n---------------------------------
-----------------------------------\n\n");
line =23;
for(i=line;i<66;i++)
{
fprintf(stdprn,"\n");
}
fflush(stdprn);
break;
}
}
disk_p(c)
char c;
{
float percn,percn1,percn2;
int i,j,line;
FILE *fp;
fp = fopen(file_name,"a");
line=1;
fprintf(fp,"_____
_____\n\n");
line=4;
fprintf(fp,"                      FINAL REPORT
");
fprintf(fp,"\n\n  PAIRS %d - %d      PATIENT NAME : %s
   CARD No. :
%s",first_pair[c],second_pair[c],pat_name,card_no);
fprintf(fp,"\n\n  DATE: %02d/%02d/%02d  TAPE NO : %d
AREA EXAMINED :
%s\n",month,day,year,tape_no,area_examined);
```

```
fprintf(fp,"\n\n                          GRAY VALUES OF
QUADRANTS           \n");
fprintf(fp,"
--------------------------        \n");
line =10;
fprintf(fp,"\n----------------------------------------
------------------------------------------");
fprintf(fp,"\n\n TOP LEFT QUADRANT        :
%ld",frame_quad[c][0]);
percn1 = frame_quad[c][2] *100.00;
percn = percn1/frame_quad[c][0];
percn1 =frame_quad[c][0]*100.00;
percn2 = percn1/frame_quad[c][2];
fprintf(fp,"\n\n          DIFF : %ld    %c(L/R) : %.2f
%c(R/L) :
%.2f",frame_quad[c][2]-frame_quad[c][0],'%',percn2,'%
',percn);
fprintf(fp,"\n\n TOP RIGHT QUADRANT       :
%ld",frame_quad[c][2]);
fprintf(fp,"\n\n BOTTOM LEFT  QUADRANT    :
%ld",frame_quad[c][1]);
percn1 = frame_quad[c][3] *100.00;
percn = percn1/frame_quad[c][1];
percn1 =frame_quad[c][1]*100.00;
percn2 = percn1/frame_quad[c][3];
fprintf(fp,"\n          DIFF : %ld    %c(L/R) : %.2f
%c(R/L) :
%.2f",frame_quad[c][3]-frame_quad[c][1],'%',percn2,'%
',percn);
fprintf(fp,"\n\n BOTTOM RIGHT QUADRANT    :
%ld",frame_quad[c][3]);
fprintf(fp,"\n\n----------------------------------------
------------------------------------------\n\n");
fprintf(fp,"\n\n                              NO. OF
BOXES SELECTED - %d",no_box+1);
fprintf(fp,"\n
-----------------------\n");
switch(no_box)
{
case 1:
fprintf(fp,"\nBOX  1:   %s\n\n",box_string[0]);
fprintf(fp,"\n\n----------------------------------------
------------------------------------------\n\n");
fprintf(fp,"\n\nGRAY VALUE OF LEFT HALF BOX  :
%ld",box_quadl[c][0]);
percn1 = box_quadr[c][0] *100.00;
percn = percn1/box_quadl[c][0];
percn1 =box_quadl[c][0]*100.00;
percn2 = percn1/box_quadr[c][0];
fprintf(fp,"\n          DIFF : %ld    %c(L/R) : %.2f
%c(R/L) :
%.2f",box_quadr[c][0]-box_quadl[c][0],'%',percn2,'%',
percn);
fprintf(fp,"\n\nGRAY VALUE OF RIGHT HALF BOX :
%ld",box_quadr[c][0]);
line =42;
```

```
fprintf(fp,"\n\n----------------------------------
----------------------------------------\n\n");
fprintf(fp,"\n\n\nBOX  2:     %s\n\n",box_string[1]);
fprintf(fp,"\n\n----------------------------------
----------------------------------------\n\n");
fprintf(fp,"\n\nGRAY VALUE OF LEFT HALF BOX :
%ld",box_quadl[c][1]);
percn1 = box_quadr[c][1] *100.00;
percn = percn1/box_quadl[c][1];
percn1 =box_quadl[c][1]*100.00;
percn2 = percn1/box_quadr[c][1];
fprintf(fp,"\n         DIFF : %ld    %c(L/R) : %.2f
%c(R/L) :
%.2f",box_quadr[c][1]-box_quadl[c][1],'%',percn2,'%',
percn);
fprintf(fp,"\n\nGRAY VALUE OF RIGHT HALF BOX :
%ld",box_quadr[c][1]);
line =42;
fprintf(fp,"\n\n----------------------------------
----------------------------------------\n\n");
line = 64;
for(i=line;i<66;i++)
{
fprintf(fp,"\n");
}
break;
case 0:
fprintf(fp,"\nBOX  1:    %s\n\n",box_string[0]);
fprintf(fp,"\n\n----------------------------------
----------------------------------------\n\n");
fprintf(fp,"\n\nGRAY VALUE OF LEFT HALF BOX :
%ld",box_quadl[c][0]);
percn1 = box_quadr[c][0] *100.00;
percn = percn1/box_quadl[c][0];
percn1 =box_quadl[c][0]*100.00;
percn2 = percn1/box_quadr[c][0];
fprintf(fp,"\n         DIFF : %ld    %c(L/R) : %.2f
%c(R/L) :
%.2f",box_quadr[c][0]-box_quadl[c][0],'%',percn2,'%',
percn);
fprintf(fp,"\n\nGRAY VALUE OF RIGHT HALF BOX :
%ld",box_quadr[c][0]);
line =42;
fprintf(fp,"\n\n----------------------------------
----------------------------------------\n\n");
fprintf(fp,"\n
");
fprintf(fp,"\n
");
fprintf(fp,"\n
");
fprintf(fp,"\n
");
line = 50;
for(i=line;i<66;i++)
{
```

```
fprintf(fp,"\n");
)
break;
case 2:
fprintf(fp,"\nBOX  1:     %s\n\n", box_string[0]);
fprintf(fp,"\n\n------------------------------------\n\n");
fprintf(fp,"\n\nGRAY VALUE OF LEFT HALF BOX :
%ld",box_quadl[c][0]);
percn1 = box_quadr[c][0] *100.00;
percn = percn1/box_quadl[c][0];
percn1 =box_quadl[c][0]*100.00;
percn2 = percn1/box_quadr[c][0];
fprintf(fp,"\n         DIFF : %ld   %c(L/R) : %.2f
%c(R/L) :
%.2f",box_quadr[c][0]-box_quadl[c][0],'%',percn2,'%',
percn);
fprintf(fp,"\n\nGRAY VALUE OF RIGHT HALF BOX :
%ld",box_quadr[c][0]);
line =42;
fprintf(fp,"\n\n------------------------------------\n\n");
fprintf(fp,"\n\n\nBOX  2:    %s\n\n",box_string[1]);
fprintf(fp,"\n\n------------------------------------\n\n");
fprintf(fp,"\n\nGRAY VALUE OF LEFT HALF BOX :
%ld",box_quadl[c][1]);
percn1 = box_quadr[c][1] *100.00;
percn = percn1/box_quadl[c][1];
percn1 =box_quadl[c][1]*100.00;
percn2 = percn1/box_quadr[c][1];
fprintf(fp,"\n         DIFF : %ld   %c(L/R) : %.2f
%c(R/L) :
%.2f",box_quadr[c][1]-box_quadl[c][1],'%',percn2,'%',
percn);
fprintf(fp,"\n\nGRAY VALUE OF RIGHT HALF BOX :
%ld",box_quadr[c][1]);
line =42;
fprintf(fp,"\n\n------------------------------------\n\n");
line = 64;
for(i=line;i<66;i++)
{
fprintf(fp,"\n");
)
line =1;
fprintf(fp,"\nBOX  3:  %s\n\n",box_string[2]);
fprintf(fp,"\n\n------------------------------------\n\n");
fprintf(fp,"\n\nGRAY VALUE OF LEFT HALF BOX :
%ld",box_quadl[c][2]);
percn1 = box_quadr[c][2] *100.00;
percn = percn1/box_quadl[c][2];
percn1 =box_quadl[c][2]*100.00;
percn2 = percn1/box_quadr[c][2];
fprintf(fp,"\n         DIFF : %ld   %c(L/R) : %.2f
```

```
%c(R/L) :
%.2f",box_quadr[c][2]-box_quadl[c][2],'%',percn2,'%',
percn);
fprintf(fp,"\n\nGRAY VALUE OF RIGHT HALF BOX :
%ld",box_quadr[c][2]);
fprintf(fp,"\n\n-------------------------------------\n\n");
fprintf(fp,"\n
");
fprintf(fp,"\n
");
fprintf(fp,"\n
");
fprintf(fp,"\n
");
line = 18;
for(i=line;i<66;i++)
{
fprintf(fp,"\n");
}
break;
case 3:
fprintf(fp,"\nBOX   1:    %s\n\n",box_string[0]);
fprintf(fp,"\n\n-------------------------------------\n\n");
fprintf(fp,"\n\nGRAY VALUE OF LEFT HALF BOX :
%ld",box_quadl[c][0]);
percn1 = box_quadr[c][0] *100.00;
percn = percn1/box_quadl[c][0];
percn1 =box_quadl[c][0]*100.00;
percn2 = percn1/box_quadr[c][0];
fprintf(fp,"\n           DIFF : %ld    %c(L/R) : %.2f
%c(R/L) :
%.2f",box_quadr[c][0]-box_quadl[c][0],'%',percn2,'%',
percn);
fprintf(fp,"\n\nGRAY VALUE OF RIGHT HALF BOX :
%ld",box_quadr[c][0]);
line =42;
fprintf(fp,"\n\n-------------------------------------\n\n");
fprintf(fp,"\n\n\nBOX   2:    %s\n\n",box_string[1]);
fprintf(fp,"\n\n-------------------------------------\n\n");
fprintf(fp,"\n\nGRAY VALUE OF LEFT HALF BOX :
%ld",box_quadl[c][1]);
percn1 = box_quadr[c][1] *100.00;
percn = percn1/box_quadl[c][1];
percn1 =box_quadl[c][1]*100.00;
percn2 = percn1/box_quadr[c][1];
fprintf(fp,"\n           DIFF : %ld    %c(L/R) : %.2f
%c(R/L) :
%.2f",box_quadr[c][1]-box_quadl[c][1],'%',percn2,'%',
percn);
fprintf(fp,"\n\nGRAY VALUE OF RIGHT HALF BOX :
%ld",box_quadr[c][1]);
```

```
line =42;
fprintf(fp,"\n\n-------------------------------------------
------------------------------------\n\n");
line = 64;
for(i=line;i<66;i++)
{
fprintf(fp,"\n");
}
line =1;
fprintf(fp,"\nBOX  3:    %s\n\n",box_string[2]);
fprintf(fp,"\n\n-------------------------------------------
------------------------------------\n\n");
fprintf(fp,"\n\nGRAY VALUE OF LEFT HALF BOX :
%ld",box_quadl[c][2]);
percn1 = box_quadr[c][2] *100.00;
percn = percn1/box_quadl[c][2];
percn1 =box_quadl[c][2]*100.00;
percn2 = percn1/box_quadr[c][2];
fprintf(fp,"\n         DIFF : %ld    %c(L/R) : %.2f
%c(R/L) :
%.2f",box_quadr[c][2]-box_quadl[c][2],'%',percn2,'%',
percn);
fprintf(fp,"\n\nGRAY VALUE OF RIGHT HALF BOX :
%ld",box_quadr[c][2]);
fprintf(fp,"\n\n-------------------------------------------
------------------------------------\n\n");
fprintf(fp,"\n
");
fprintf(fp,"\n
");
fprintf(fp,"\n
");
fprintf(fp,"\n
");
line = 18;
fprintf(fp,"\nBOX  4:    %s\n\n",box_string[3]);
fprintf(fp,"\n\n-------------------------------------------
------------------------------------\n\n");
fprintf(fp,"\n\nGRAY VALUE OF LEFT HALF BOX :
%ld",box_quadl[c][3]);
percn1 = box_quadr[c][3] *100.00;
percn = percn1/box_quadl[c][3];
percn1 =box_quadl[c][3]*100.00;
percn2 = percn1/box_quadr[c][3];
fprintf(fp,"\n         DIFF : %ld    %c(L/R) : %.2f
%c(R/L) :
%.2f",box_quadr[c][3]-box_quadl[c][3],'%',percn2,'%',
percn);
fprintf(fp,"\n\nGRAY VALUE OF RIGHT HALF BOX :
%ld",box_quadr[c][3]);
fprintf(fp,"\n\n-------------------------------------------
------------------------------------\n\n");
fprintf(fp,"\n
");
fprintf(fp,"\n
");
```

```
fprintf(fp,"\n
");
fprintf(fp,"\n
");
line =36;
for(i=line;i<66;i++)
{
fprintf(fp,"\n");
}
break;
}
fclose(fp);
}
disk_ph(c)
char c;
{
float percn,percn1,percn2;
int i,j,line;
FILE *fp;
fp = fopen(file_name,"a");
line=1;
fprintf(fp,"_____\n\n");

line=4;
fprintf(fp,"\n\n   PAIRS %d - %d         PATIENT NAME:
%s     CARD NO. :
%s",first_pair[c],second_pair[c],pat_name,card_no);
fprintf(fp,"\n\n   DATE: %02d/%02d/%02d   TAPE NO : %d
AREA EXAMINED :
%s\n",month,day,year,tape_no,area_examined);
fprintf(fp,"\n\n                                NO. OF WHITE
PIXELS IN QUADRANTS AFTER THRESHOLDING      \n");
fprintf(fp,"_____
--      \n");
fprintf(fp,"\n   THRESHOLD VALUE SELECTED :
%.2f\n",new_thresh1);
line =12;
fprintf(fp,"\n----------------------------------------
----------------------------------------");
fprintf(fp,"\n\n TOP LEFT QUADRANT       :
%ld",frame_pixel[c][0]);
percn1 = frame_pixel[c][2] *100.00;
percn = percn1/frame_pixel[c][0];
percn1 =frame_pixel[c][0]*100.00;
percn2 = percn1/frame_pixel[c][2];
fprintf(fp,"\n        DIFF : %ld   %c(L/R) : %.2f
%c(R/L) :
%.2f",frame_pixel[c][2]-frame_pixel[c][0],'%',percn2,
'%',percn);
fprintf(fp,"\n\n TOP RIGHT QUADRANT      :
%ld",frame_pixel[c][2]);
fprintf(fp,"\n\n BOTTOM LEFT  QUADRANT   :
%ld",frame_pixel[c][1]);
percn1 = frame_pixel[c][3] *100.00;
```

```
percn = percn1/frame_pixel[c][1];
percn1 =frame_pixel[c][1]*100.00;
percn2 = percn1/frame_pixel[c][3];
fprintf(fp,"\n        DIFF : %ld    %c(L/R) : %.2f
%c(R/L) :
%.2f",frame_pixel[c][3]-frame_pixel[c][1],'%',percn2,
'%',percn);
fprintf(fp,"\n\n BOTTOM RIGHT QUADRANT  :
%ld",frame_pixel[c][3]);
fprintf(fp,"\n\n---------------------------------
-------------------------------------\n\n");
fprintf(fp,"\n\n                              NO. OF
BOXES SELECTED - %d",no_box+1);
fprintf(fp,"\n
-------------------\n");
switch(no_box)
{
case 0:
fprintf(fp,"\nBOX  1:    %s\n\n",box_string[0]);
fprintf(fp,"\n\n---------------------------------
-------------------------------------\n\n");
fprintf(fp,"\n\nPIXEL VALUE OF LEFT HALF BOX :
%ld",box_pixell[c][0]);
percn1 = box_pixelr[c][0] *100.00;
percn = percn1/box_pixell[c][0];
percn1 =box_pixell[c][0]*100.00;
percn2 = percn1/box_pixelr[c][0];
fprintf(fp,"\n        DIFF : %ld    %c(L/R) : %.2f
%c(R/L) :
%.2f",box_pixelr[c][0]-box_pixell[c][0],'%',percn2,'%
',percn);
fprintf(fp,"\n\nPIXEL VALUE OF RIGHT HALF BOX :
%ld",box_pixelr[c][0]);
fprintf(fp,"\n\n---------------------------------
-------------------------\n\n");
line =49;
for(i=line;i<66;i++)
{
fprintf(fp,"\n");
}
break;
case 1:
fprintf(fp,"\nBOX  1:    %s\n\n",box_string[0]);
fprintf(fp,"\n\n---------------------------------
-------------------------------\n\n");
fprintf(fp,"\n\nPIXEL VALUE OF LEFT HALF BOX :
%ld",box_pixell[c][0]);
percn1 = box_pixelr[c][0] *100.00;
percn = percn1/box_pixell[c][0];
percn1 =box_pixell[c][0]*100.00;
percn2 = percn1/box_pixelr[c][0];
fprintf(fp,"\n        DIFF : %ld    %c(L/R) : %.2f
%c(R/L) :
%.2f",box_pixelr[c][0]-box_pixell[c][0],'%',percn2,'%
',percn);
```

```
fprintf(fp,"\n\nPIXEL VALUE OF RIGHT HALF BOX :
%ld",box_pixelr[c][0]);
fprintf(fp,"\n\n-----------------------------------
---------------------------------------\n\n");
fprintf(fp,"\nBOX 2:   %s\n\n",box_string[1]);
fprintf(fp,"\n\n-----------------------------------
---------------------------------------\n\n");
fprintf(fp,"\n\nPIXEL VALUE OF LEFT HALF BOX :
%ld",box_pixell[c][1]);
percn1 = box_pixelr[c][1] *100.00;
percn = percn1/box_pixell[c][1];
percn1 =box_pixell[c][1]*100.00;
percn2 = percn1/box_pixelr[c][1];
fprintf(fp,"\n          DIFF : %ld    %c(L/R) : %.2f
%c(R/L) :
%.2f",box_pixelr[c][1]-box_pixell[c][1],'%',percn2,'%
',percn);
fprintf(fp,"\n\nPIXEL VALUE OF RIGHT HALF BOX :
%ld",box_pixelr[c][1]);
fprintf(fp,"\n\n-----------------------------------
---------------------------------------\n\n");

line =63;
for(i=line;i<66;i++)
{
fprintf(fp,"\n");
}
break;
case 2:
fprintf(fp,"\nBOX 1:   %s\n\n",box_string[0]);
fprintf(fp,"\n\n-----------------------------------
---------------------------------------\n\n");
fprintf(fp,"\n\nPIXEL VALUE OF LEFT HALF BOX :
%ld",box_pixell[c][0]);
percn1 = box_pixelr[c][0] *100.00;
percn = percn1/box_pixell[c][0];
percn1 =box_pixell[c][0]*100.00;
percn2 = percn1/box_pixelr[c][0];
fprintf(fp,"\n          DIFF : %ld    %c(L/R) : %.2f
%c(R/L) :
%.2f",box_pixelr[c][0]-box_pixell[c][0],'%',percn2,'%
',percn);
fprintf(fp,"\n\nPIXEL VALUE OF RIGHT HALF BOX :
%ld",box_pixelr[c][0]);
fprintf(fp,"\n\n-----------------------------------
---------------------------------------\n\n");
fprintf(fp,"\nBOX 2:   %s\n\n",box_string[1]);
fprintf(fp,"\n\n-----------------------------------
---------------------------------------\n\n");
fprintf(fp,"\n\nPIXEL VALUE OF LEFT HALF BOX :
%ld",box_pixell[c][1]);
percn1 = box_pixelr[c][1] *100.00;
percn = percn1/box_pixell[c][1];
percn1 =box_pixell[c][1]*100.00;
percn2 = percn1/box_pixelr[c][1];
fprintf(fp,"\n          DIFF : %ld    %c(L/R) : %.2f
%c(R/L) :
```

```
%.2f",box_pixelr[c][1]-box_pixell[c][1],'%',percn2,'%
',percn);
fprintf(fp,"\n\nPIXEL VALUE OF RIGHT HALF BOX :
%ld",box_pixelr[c][1]);
fprintf(fp,"\n\n-------------------------------------
-------------------------------------\n\n");
line =63;
for(i=line;i<66;i++)
{
fprintf(fp,"\n");
}
line =1;
fprintf(fp,"\nBOX  3:   %s\n\n",box_string[2]);
fprintf(fp,"\n\n-------------------------------------
-------------------------------------\n\n");
fprintf(fp,"\n\nPIXEL VALUE OF LEFT HALF BOX :
%ld",box_pixell[c][2]);
percn1 = box_pixelr[c][2] *100.00;
percn = percn1/box_pixell[c][2];
percn1 =box_pixell[c][2]*100.00;
percn2 = percn1/box_pixelr[c][2];
fprintf(fp,"\n         DIFF : %ld    %c(L/R) : %.2f
%c(R/L) :
%.2f",box_pixelr[c][2]-box_pixell[c][2],'%',percn2,'%
',percn);
fprintf(fp,"\n\nPIXEL VALUE OF RIGHT HALF BOX :
%ld",box_pixelr[c][2]);
fprintf(fp,"\n\n-------------------------------------
-------------------------------------\n\n");
line =13;
for(i=line;i<66;i++)
{
fprintf(fp,"\n");
}
break;
case 3:
fprintf(fp,"\nBOX  1:   %s\n\n",box_string[0]);
fprintf(fp,"\n\n-------------------------------------
-------------------------------------\n\n");
fprintf(fp,"\n\nPIXEL VALUE OF LEFT HALF BOX :
%ld",box_pixell[c][0]);
percn1 = box_pixelr[c][0] *100.00;
percn = percn1/box_pixell[c][0];
percn1 =box_pixell[c][0]*100.00;
percn2 = percn1/box_pixelr[c][0];
fprintf(fp,"\n         DIFF : %ld    %c(L/R) : %.2f
%c(R/L) :
%.2f",box_pixelr[c][0]-box_pixell[c][0],'%',percn2,'%
',percn);
fprintf(fp,"\n\nPIXEL VALUE OF RIGHT HALF BOX :
%ld",box_pixelr[c][0]);
fprintf(fp,"\n\n-------------------------------------
-------------------------------------\n\n");
fprintf(fp,"\nBOX  2:    %s\n\n",box_string[1]);
fprintf(fp,"\n\n-------------------------------------
-------------------------------------\n\n");
```

```
fprintf(fp,"\n\nPIXEL VALUE OF LEFT HALF BOX :
%ld",box_pixell[c][1]);
percn1 = box_pixelr[c][1] *100.00;
percn = percn1/box_pixell[c][1];
percn1 =box_pixell[c][1]*100.00;
percn2 = percn1/box_pixelr[c][1];
fprintf(fp,"\n          DIFF : %ld     %c(L/R) : %.2f
%c(R/L) :
%.2f",box_pixelr[c][1]-box_pixell[c][1],'%',percn2,'%
',percn);
fprintf(fp,"\n\nPIXEL VALUE OF RIGHT HALF BOX :
%ld",box_pixelr[c][1]);
fprintf(fp,"\n\n-------------------------------------
------------------------------------\n\n");

line =63;
for(i=line;i<66;i++)
{
fprintf(fp,"\n");
}
fprintf(fp,"\nBOX   3:    %s\n\n",box_string[2]);
fprintf(fp,"\n\n-------------------------------------
------------------------------------\n\n");
fprintf(fp,"\n\nPIXEL VALUE OF LEFT HALF BOX :
%ld",box_pixell[c][2]);
percn1 = box_pixelr[c][2] *100.00;
percn = percn1/box_pixell[c][2];
percn1 =box_pixell[c][2]*100.00;
percn2 = percn1/box_pixelr[c][2];
fprintf(fp,"\n          DIFF : %ld     %c(L/R) : %.2f
%c(R/L) :
%.2f",box_pixelr[c][2]-box_pixell[c][2],'%',percn2,'%
',percn);
fprintf(fp,"\n\nPIXEL VALUE OF RIGHT HALF BOX :
%ld",box_pixelr[c][2]);
fprintf(fp,"\n\n-------------------------------------
-----------------------------\n\n");
fprintf(fp,"\nBOX   4:    %s\n\n",box_string[3]);
fprintf(fp,"\n\n-------------------------------------
------------------------------------\n\n");
fprintf(fp,"\n\nPIXEL VALUE OF LEFT HALF BOX :
%ld",box_pixell[c][3]);
percn1 = box_pixelr[c][3] *100.00;
percn = percn1/box_pixell[c][3];
percn1 =box_pixell[c][3]*100.00;
percn2 = percn1/box_pixelr[c][3];
fprintf(fp,"\n          DIFF : %ld     %c(L/R) : %.2f
%c(R/L) :
%.2f",box_pixelr[c][3]-box_pixell[c][3],'%',percn2,'%
',percn);
fprintf(fp,"\n\nPIXEL VALUE OF RIGHT HALF BOX :
%ld",box_pixelr[c][3]);
fprintf(fp,"\n\n-------------------------------------
----------------------------\n\n");

line =23;
for(i=line;i<66;i++)
{
```

```
fprintf(fp,"\n");
}
break;
}
fclose(fp);
}
printer_reset()
{
regs.h.ah =1;
int86(0x17,®s,®s);
}
patient_name()
{
wn1 = wn_open(0,15,40,34,5,(BLUE << 4 | YELLOW |
BOLD),(BLUE << 4|WHITE|BOLD));
wn_title(wn1,"PATIENT NAME");
frm1 = wn_frmopn(2);
if(!frm1)
{
printf("wn_frmopn failed !!\n");
exit(1);
}
*rec1.filename = NUL;
atrib = (BLUE << 4 ) | WHITE | BOLD;
wn_gtext(SET,frm1,0,wn1,1,1,"ENTER PATIENT NAME :
",atrib,' ',8,rec1.filename,NSTR,NSTR);
if(!wn_frmget(frm1))
{
printf("memory corruption error \n");
exit(1);
}
strcpy(pat_name,rec1.filename);
*rec1.filename=NUL;
wn_gtext(SET,frm1,0,wn1,3,1,"ENTER CARD NO.   :
",atrib,' ',8,rec1.filename,NSTR,NSTR);
if(!wn_frmget(frm1))
{
printf("memory corruption error \n");
exit(1);
}
strcpy(card_no,rec1.filename);
wn_frmcls(frm1);
wn_close(wn1);
wn1 = wn_open(0,13,35,39,7,(BLUE << 4 | YELLOW |
BOLD),(BLUE << 4|WHITE|BOLD));
wn_title(wn1,"EXAM DATE");
frm1 = wn_frmopn(3);
if(!frm1)
{
printf("wn_frmopn failed !!\n");
exit(1);
}
*rec6.date = NUL;
atrib = (BLUE << 4 ) | WHITE | BOLD;
wn_gdate(SET,frm1,0,wn1,1,1,"ENTER DATE: ",atrib,'
',&rec6.month,&rec6.day,&rec6.year,rec6.date,NSTR,NST
R);
```

```
if(!wn_frmget(frm1))
{
printf("memory corruption error \n");
exit(1);
}
month = rec6.month;
day = rec6.day;
year = rec6.year;
wn_gint(SET,frm1,0,wn1,3,1,"ENTER TAPE NO.   :
",atrib,'
',&rec6.tapeno,4,1,9999,rec6.tno,NSTR,NSTR);
if(!wn_frmget(frm1))
{
printf("memory corruption error \n");
exit(1);
}
tape_no=rec6.tapeno;
*rec6.area_exm=NUL;
wn_gtext(SET,frm1,0,wn1,5,1,"AREA EXAMINED: ",atrib,'
',15,rec6.area_exm,NSTR,NSTR);
if(!wn_frmget(frm1))
{
printf("memory corruption error \n");
exit(1);
}
strcpy(area_examined,rec6.area_exm);
wn_frmcls(frm1);
wn_close(wn1);
}
```

In the specific software set forth above, a logo screen initially was invoked and then a main menu was presented. The main menu in this case had four primary modes: the capture mode; the load and store mode; the process mode and the configuration. When In the specific software set forth above, a logo screen initially was invoked and then a main menu was presented. The main menu in this case had four primary modes: the capture mode; the load and store mode; the process mode and the configuration. When the capture mode was selected, another screen was presented that solicited from the user whether or not the user wanted to proceed or change parameters. If the change parameter submode was selected, then the system parameters related to image capture were made available for the user to change and modify. Some typical parameters at this point were normal frame rate, slow frame rate, number of frames for example. If the user selected to proceed with the capture mode, another screen called the capture selection screen was presented where the user could specify the normal rate or slow rate. After the selection of capture rate, another screen was presented to the user where the capture process could be initiated. After the capture process was completed, the user could select to view the captured images individually or as a whole on the display monitor 28. If the user chose the load and store mode, several options were available. These options included retrieving from the disk storage 48, saving to the disk storage 48 and viewing the current images individually or as a whole on the display monitor 28. After the images were viewed via the display monitor 28, the user then was asked to select frames for processing. The user could pass through the frames using cursor keys and marking the frames designated for later analysis. The frames could be marked in two ways. First, pairs could be selected individually for analysis or, alternately, a series of frames could be selected for comparison with a particular reference frame. After the frames were selected, the system automatically returned to the main menu where the user could select the process mode.

In the process mode, screens were presented to the user as an example of the procedure. The processing of the images began with a normalization procedure of the control image, then the subtraction step between the control image and the changed image is effected. At this point, the user was asked to define the coordinates of the body part or face. This was done without the use of marker dots or with the use of marker dots on the face or marker dots on the head holder if available. This step may be done automatically if marker dots were present. After the coordinates were defined, then the user was asked to define the areas of interest using cursor keys. After the areas of interest were defined, the system then proceeded to measure new regions within the defined areas of interest. For random pairs, the system proceeded in the same manner, after the definition of coordinates in the boxes, the system could enter a batch mode and process all of the images at the time. The output of the measurement was recorded on a file for storage or for later printout. After processing, the system return to the main menu for further instruction.

As mentioned before, the present invention particularly is adapted to detect and analyze facial movement.

Diagrammatically shown in FIG. 3 is a patient 80 or, more particularly, a patient's face. Initially, marker dots 82, 84, 86 and 88 are placed on the patient's face, as shown in FIGS. 4 and 5. The mark dots 82, 84, 86 and 88 provide a means to align images or frames. Also, shown in FIGS. 5, 6 and 7 is a head holder 90, and the marker dots or at least three marker dots could be placed on portions of the head holder 90, rather than on the patient's face.

It should be noted that other means also could be utilized to align images or frames for processing. Also, it should be noted that, in one embodiment of the invention, marker dots were not utilized. If marker dots are not utilized, it is important that the patient's 80 head be secured in the same position between images and the camera 32 be positioned in exactly the same position between images with exactly the same camera 32 settings. The head holder 90 comprises a holder stand 92 with only the upper portion of the holder stand 92 being shown in FIGS. 6 and 7. The holder stand 92 may be adapted to be supported on a floor surface or, in the alternative, the holder stand 92 may be adapted to be mounted or supported on a wall surface. The holder stand 92 preferably is cylindrically shaped, although the holder stand 92 could have any other shape if desired in a particular application.

The head holder 90 includes a top pad assembly 94 and a chin pad assembly 96. The top pad assembly 94 is movably connected to the holder stand 92 for movement in a vertically upwardly direction 98 (FIG. 6) and in a vertically downwardly direction 100 (FIG. 6).

The top pad assembly 94 comprises a top bar 102, a top sleeve 104 and a pad 105. The top sleeve 104 has an opening (not shown) extending therethrough and the holder stand 92 is slidingly disposed through the opening (not shown) in the top sleeve 104. One end of the top bar 102 is connected to the top sleeve 104 and the pad 105 is connected to the opposite end of the top bar 102.

p The chin pad assembly 96 comprises a U-shaped chin bar 106, a chin sleeve 108 and a pair of chin pads 110 and 112. The chin sleeve 104 has an opening (not shown) extending therethrough and the holder stand 92 is slidingly disposed through the opening (not shown) in the chin sleeve 108. A mid-portion of the chin bar 106 is connected to the chin sleeve 108. One of the chin pads 110 is connected to one end of the chin bar 106 and the other chin pad 112 is connected to the opposite end of the chin bar 106.

In operation, the patient 80 is seated in front of the head holder 90 with the patient's 80 head disposed generally between the top pad assembly 94 and the chin paid assembly 96. The top pad assembly 94 is moved in the downwardly direction 100 until the pad 105 engages a central portion of the top of the patient's 80 head. The top pad assembly 94 is secured in this position via a fastener 114 which extends through the top sleeve 104 and engages the holder stand 92 to secure the top sleeve 104 in the one adjusted position on the holder stand 92. Then, the chin pad assembly 96 is moved in the upwardly direction 98 to a position wherein the pad 110 engages one side of the patient's 80 chin and the pad 112 engages the opposite side of the patient's 80 chin. The chin pad assembly 96 is secured in this position via a fastener 116 which extends through the chin sleeve 108 and engages the holder stand 92 to secure the chin sleeve 108 in the one adjusted position on the holder stand 92. The patient's 80 head is held in this stationary position secured between the top pad assembly 94 and the chin pad assembly 96.

The video camera 32 is positioned in front of the patient 80. The video camera 32 is focused on the patient's 80 face with the patient's 80 face occupying virtually or substantially the entire image seen by the video camera 32.

It is important to adjust or create the proper lighting about the patient's 80 face. In one embodiment of the present invention, it has been found that soft, low power lighting which comes in from both sides of the patient's 80 face, rather than harsh, studio bright lighting, yields the best results.

With the patient's 80 head secured in the head holder 90, the video camera 32, the video cassette recorder 36 and the video monitor 28 are turned on. The video cassette recorder 36 is conditioned in the record mode and the video camera 32 also is conditioned in the record mode. The video images in the analog format outputted by the video camera 32 over the signal path 34 are inputted into the video cassette recorder 36 which records the video images on video tape. In addition, the video images are outputted over the signal paths 42 and 38 through the frame grabber 40 which outputs the video images over the signal path 30. The video images outputted over the signal path 30 are inputted in the video monitor 28 which displays the received video images. In this manner, the operator is able to view the images being recorded via the video cassette recorder 36 to be sure that proper or desired images in fact are being recorded.

When using the motion analysis apparatus 10 for analyzing facial movements, the operator, for example, would request the patient 80 to perform four tasks: (1) raise eyebrows, (2) close eyes tightly, (3) squint or wrinkle nose, and (4) smile maximally. Each of these tasks is performed by the patient 80 three times to be sure a proper and usable sequence is recorded. In addition, each task begins with the patient's 80 face at rest, then moved to maximum movement and then returned to rest.

After the recording of the video images, the video cassette recorder 36 is conditioned in the playback mode. The video images are outputted by the video cassette recorder 36 over the signal path 38 and the video images are inputted into the frame grabber 40. The video images are passed through the frame grabber 40 and over the signal path 30 and inputted into the video monitor 28 where the video images are displayed.

The video images inputted into the frame grabber 40 are digitized and the frame grabber 40 outputs the digitized images or frames over the signal path 14. The digitized images are inputted into the disk storage 48.

The operator then conditions the processor 16 in the capture mode. In the capture mode, the operator can sequentially output the digitized images or frames from the disk storage 48 and input such digitized images or frames into the frame grabber 40. The frame grabber 40 converts each digitized image into an image in the analog format and the image in the analog format is outputted over the signal path 30 for display on the video monitor 28.

At this stage, the operator can select a select pair mode or a select sequence mode of operation by inputting to the processor 16 via the computer keyboard 22 a select pair command or a select sequence code.

Assuming the operator has selected the select pair mode and again referring to the facial movement example, the operator sequences through the frames. In this instance, the operator selects a control frame where the patient's 80 face is at rest and a moved frame where the patient's face has experienced maximum movement such as where the patient 80 has raised the patient's 80 eyebrow to maximum movement. The frames are selected by the operator inputting a capture code via the computer keyboard 22 to the processor 16. The selected frames are outputted by the frame grabber 40 over the signal paths 14 and 50 and stored in the disk storage.

After the control frame and the moved frame have been captured, the operator then inputs a process code to the processor 16 via the computer keyboard 22 to condition the processor 16 in the process mode. In the process mode, the processor 16 takes the control frame and the moved frame from the disk storage 48 and the processor 16 compares the control frame to the moved frame to produce a compared frame.

The processor 16 then produces a gray frame in a digital format. The gray image is produced from the compared frame by taking only the pixels having a light value above a predetermined light value, for example, above 22. The digitized gray frame is converted to a gray frame in an analog format by the frame grabber 40 and outputted over the signal path 30 and inputted into the display monitor 28 which displays the inputted gray frame. The gray frame provides somewhat of an outline of the patient's 80 head and facial features for the purpose of selecting areas of interest, in a manner which will be described in greater detail below.

After the gray frame has been displayed on the screen of the display monitor 28, the operator selects a center of the displayed image. In the example of analyzing facial motion, a center generally is picked about the end of a patient's 80 nose, a center 118 being shown in FIG. 3 for example. For the purpose of illustrating the selection of areas of interest, it is assumed that FIG. 3 represents the gray image displayed on the screen of the display monitor 28.

After the selection of center 118, a horizontal grid 120 and a vertical grid 122 are displayed on the screen of the display monitor 28 with the grids 120 and 122 intersecting at the selected center 118. Using the computer keyboard 22, the processor 16 is programmed to permit the operator to select an area of interest. Assuming the motion being analyzed is the raising of the patient's 80 eyebrow, the area of interest selected would be the area of interest 124 indicated by dashed lines in FIG. 3 which includes the area of the face which should have been moved or caused to be moved by the raising of the patient's eyebrow. In one embodiment, the operator selects an area of interest 126 on the right side of the patient's face. The processor 16 automatically selects and outlines a corresponding area of interest 128 on the left side of the patient's 80 face. After the area of interest 124 has been selected, the operator then selects either the area of interest 126 or the area of interest 128 to be designated as the control position and the opposite area of interest 126 or 128 to be the moved position.

The operator then selects a threshold. The threshold is a value of the light intensity of a pixel and only pixels having a light value above the threshold are selected for analyzing. In the present embodiment of the invention, the operator has a number of thresholds which the operator can select depending on the desires of the operator and depending upon which threshold level gives the best comparison in the opinion of the operator. For example, a selected threshold might be 22.

After the threshold has been selected, the processor 16 then counts the number of pixels in the selected area 126 and 128 having a light valve above the selected threshold, and determines the movement change using the counted pixels above the selected threshold in the area of interest 124. The processor 16 also determines a percent of movement between the left area of interest 126 and the right area of interest 128. For example, in one patient using one embodiment of the present invention with the selected areas being about the same as the selected areas 124, 126 and 128 and with the patient's 80 requested movement being the raising of the patient's 80 eyebrows, the following movement parameters were determined by the processor 16 and displayed on the screen of the computer monitor 18:

TABLE I

| TOP LEFT QUADRANT: | : 71 | | |
|---|---|---|---|
| DIFF: 101 | % (L/R): 41.28 | | % (R/L): 242.25 |
| TOP RIGHT QUADRANT | : 172 | | |
| BOTTOM LEFT QUADRANT | : 0 | | |
| DIFF: 0 | % (L/R): 0.00 | | % (R/L): 0.00 |
| BOTTOM RIGHT QUADRANT | : 0 | | |

The numbers associated with the DIFF parameter in Table I above are arbitrary numbers representing the change in movement in the areas of interest 126 and 128 between the control frame and the changed frame. The TOP LEFT QUADRANT, TOP RIGHT QUADRANT, BOTTOM LEFT QUADRANT, and BOTTOM RIGHT QUADRANT listed in Table I are pixel counts that represent the number of pixel in the areas of interest 126 and 128 respectively having a light value above the selected threshold in the compare frame. The percent movement numbers in Table I above represent a ratio of the pixel counts between the left and the right side.

Assuming that the operator desires to select a sequence of frames to be analyzed, the process is identical to the process described before with respect to selecting pairs for analyzing, except instead of initiating a select pair code, the operator initiates via the computer keyboard 22 a select sequence code which is inputted into the processor 16 over the signal path 20. In the select sequence mode, the operator selects a sequence of frames to be analyzed. In one present embodiment of the invention, an operator can select up to a maximum of thirty-six frames for analyzing in the select sequence mode of operation.

For example and assuming that the requested movement again was the raising of the patient's 80 eyebrow, the operator might select a sequence of thirty-six frames starting with the patient's face in a rest position and then sequentially selecting a number of frames between the patient's face in the rest position through the maximum movement where the patient's eyebrows are raised and back to the rest position. Each of these frames is captured in the manner described before.

After the sequence of frames has been captured, the operator then selects a reference pair of frames from the selected frames, such as the first frame where the patient's face is at rest and one of the frames showing maximum movement of the patient's face where the eyebrow is in the raised position. The processor 16 compares the reference pair of frames and produces the gray frame in the manner described before with respect to the select pair mode of operation. After the gray frame has been produced, the gray frame is displayed on the computer monitor 18 and the areas of interest are selected in the manner described before with respect to the select pair mode of operation.

After the areas of interest have been selected, the operator then selects a control frame such as the first frame showing the patient's face in the control or rest position. The remaining frames in the sequence of frames are designated moved frames. The processor 16 then compares each moved frame with the control frame in the selected pairs sequentially. The reference frame and the moved frames are compared in sequence in a manner exactly like that described before with respect to the select pair mode of operation to produce a plurality of compare frames. After the processor 16 has compared sequentially the moved frames with the control frame in sequence, the processor 16 then outputs the comparison information similar to Table I, except the information would be included for the comparison of each of the moved frames with respect to the control frame in the selected sequence. For example, Table II below shows the output of the processor 16 where the requested movement was the raising of the patient's 80 eyebrow and the selected frames included the patient's 80 face at rest, through the movement of the eyebrows to a maximum moved position, and back to the patient's 80 face at rest.

TABLE II

| | PATIENT NAME: | CARD NO.: |
|---|---|---|
| PAIRS 10-11 | | |
| TOP LEFT QUADRANT | : 71 | |
| DIFF: 101 | % (L/R): 41.28 | % (R/L): 242.25 |
| TOP RIGHT QUADRANT | : 172 | |
| BOTTOM LEFT QUADRANT | : 0 | |
| DIFF: 0 | % (L/R): 0.00 | % (R/L): 0.00 |
| BOTTOM RIGHT QUADRANT | : 0 | |
| PAIRS 10-12 | | |
| TOP LEFT QUADRANT | : 0 | |
| DIFF: 40 | % (L/R): 0.00 | % (R/L): — |
| TOP RIGHT QUADRANT | : 40 | |
| BOTTOM LEFT QUADRANT | : 0 | |
| DIFF: 0 | % (L/R): 0.00 | % (R/L): 0.00 |
| BOTTOM RIGHT QUADRANT | : 0 | |
| PAIRS 10-13 | | |
| TOP LEFT QUADRANT | : 3085 | |
| DIFF: −1823 | % (L/R): 244.45 | % (R/L): 40.91 |
| TOP RIGHT QUADRANT | : 1262 | |
| BOTTOM LEFT QUADRANT | : 0 | |
| DIFF: 0 | % (L/R): 0.00 | % (R/L): 0.00 |
| BOTTOM RIGHT QUADRANT | : 0 | |
| PAIRS 10-14 | | |
| TOP LEFT QUADRANT | : 5758 | |
| DIFF: −3202 | % (L/R): 225.19 | % (R/L): 44.41 |
| TOP RIGHT QUADRANT | : 2557 | |
| BOTTOM LEFT QUADRANT | : 0 | |
| DIFF: 0 | % (L/R): 0.00 | % (R/L): 0.00 |

TABLE II-continued

PATIENT NAME: CARD NO.:

BOTTOM RIGHT QUADRANT : 0

PAIRS 10-15
TOP LEFT QUADRANT : 5841
  DIFF: −3099    % (L/R): 213.02    % (R/L): 46.94
TOP RIGHT QUADRANT : 2742
BOTTOM LEFT QUADRANT : 0
  DIFF: 0    % (L/R): 0.00    % (R/L): 0.00
BOTTOM RIGHT QUADRANT : 0

PAIRS 10-16
TOP LEFT QUADRANT : 5918
  DIFF: −2988    % (L/R): 201.98    % (R/L): 49.51
TOP RIGHT QUADRANT : 2930
BOTTOM LEFT QUADRANT : 0
  DIFF: 0    % (L/R): 0.00    % (R/L): 0.00
BOTTOM RIGHT QUADRANT : 0

PAIRS 10-17
TOP LEFT QUADRANT : 6098
  DIFF: −3284    % (L/R): 216.70    % (R/L): 46.15
TOP RIGHT QUADRANT : 2814
BOTTOM LEFT QUADRANT : 0
  DIFF: 0    % (L/R): 0.00    % (R/L): 0.00
BOTTOM RIGHT QUADRANT : 0

PAIRS 10-18
TOP LEFT QUADRANT : 6420
  DIFF: −3397    % (L/R): 212.37    % (R/L): 47.09
TOP RIGHT QUADRANT : 3023
BOTTOM LEFT QUADRANT : 0
  DIFF: 0    % (L/R): 0.00    % (R/L): 0.00
BOTTOM RIGHT QUADRANT : 0

PAIRS 10-19
TOP LEFT QUADRANT : 6315
  DIFF: −2862    % (L/R): 182.88    % (R/L): 54.68
TOP RIGHT QUADRANT : 3453
BOTTOM LEFT QUADRANT : 0
  DIFF: 0    % (L/R): 0.00    % (R/L): 0.00
BOTTOM RIGHT QUADRANT : 0

PAIRS 10-20
TOP LEFT QUADRANT : 6552
  DIFF: −3334    % (L/R): 203.60    % (R/L): 49.11
TOP RIGHT QUADRANT : 3218
BOTTOM LEFT QUADRANT : 0
  DIFF: 0    % (L/R): 0.00    % (R/L): 0.00
BOTTOM RIGHT QUADRANT : 0

PAIRS 10-21
TOP LEFT QUADRANT : 6406
  DIFF: −3030    % (L/R): 189.75    % (R/L): 52.70
TOP RIGHT QUADRANT : 3376
BOTTOM LEFT QUADRANT : 0
  DIFF: 0    % (L/R): 0.00    % (R/L): 0.00
BOTTOM RIGHT QUADRANT : 0

PAIRS 10-22
TOP LEFT QUADRANT : 3748
  DIFF: −1493    % (L/R): 166.21    % (R/L): 60.17
TOP RIGHT QUADRANT : 2255
BOTTOM LEFT QUADRANT : 0
  DIFF: 0    % (L/R): 0.00    % (R/L): 0.00
BOTTOM RIGHT QUADRANT : 0

PAIRS 10-23
TOP LEFT QUADRANT : 1295
  DIFF: 131    % (L/R): 90.81    % (R/L): 110.4
TOP RIGHT QUADRANT : 1426
BOTTOM LEFT QUADRANT : 0
  DIFF: 0    % (L/R): 0.00    % (R/L): 0.00
BOTTOM RIGHT QUADRANT : 0

PAIRS 10-24
TOP LEFT QUADRANT : 483
  DIFF: 646    % (L/R): 42.78    % (R/L): 233.75
TOP RIGHT QUADRANT : 1129
BOTTOM LEFT QUADRANT : 0
  DIFF: 0    % (L/R): 0.00    % (R/L): 0.00
BOTTOM RIGHT QUADRANT : 0

PAIRS 10-25
TOP LEFT QUADRANT : 640
  DIFF: 842    % (L/R): 43.18    % (R/L): 231.56
TOP RIGHT QUADRANT : 1482
BOTTOM LEFT QUADRANT : 0
  DIFF: 0    % (L/R): 0.00    % (R/L): 0.00
BOTTOM RIGHT QUADRANT : 0

Table II gives a quantitative picture of the movement of the patient's face from a rest position, to a raised eyebrow position and back to a rest position. Thresholded and non-thresholded gray scale pixel intensity difference values are plotted against rest versus motion pairs. A pair is the reference control frame of the patient's face at rest compared to sequentially changed frames with the patient's face in a requested motion. Pair one, for example, would be the control frame subtracted from the next changed frame in sequence. Pair two, would be the control frame subtracted from the second changed frame in sequence. Pair three would be the control frame compared to the third changed frame in sequence.

By this plotting method, a dynamic function curve can be plotted, resulting from a given facial motion request, such as raising the brow, closing the eyes, wrinkling the nose, or smiling. This dynamic function has a steep contraction phase, a less steeply sloped end of contraction phase, a duration of maximum contraction, then a steeply sloping relaxation phase. This function has amplitude, duration, and an inscribed area as well.

A variety of data can be calculated from the dynamic curves, such as slope, intercept, duration, maximum amplitude, and integrated area under the curve. Each parameter of data then can be normalized to normal populations of varying ages to which similar data parameters from abnormal populations may be compared. By these methods, degrees of facial paresis and abnormal facial movements, such as synkinesis, may be quantitatively compared to normals and to the normal side of a given patient's face.

In some instances, one will analyze a left side and a right side of a patient in a single position or actually unchanged position. In this instance, the left side or one component part of the frame would be designated the reference position and the right side or one other component part of the frame would be designated the changed position, as those terms are used in the claims.

Changes may be made in the construction and the operation of the various components, elements and assemblies described herein and changes may be made in the step or the sequence of steps of the methods described herein without departing from the spirit and the scope of the invention as defined in the following claims.

What is claimed is:

1. A method for detecting surface deformation of a substantially stationary body part comprising:
   producing a digitized frame of the substantially stationary body part in an undeformed surface reference position of the body part, identified as a digitized control frame;
   producing a digitized frame of the body part in a surface deformed position of the body part, different from the undeformed surface position of the body part in the reference position, identified as a digitized changed frame, where the deformed position is produced substantially by musculature movements of the individual; and
   comparing the digitized control frame with the digitized changed frame and determining surface deformations over a defined surface area of the body part from the reference position to the deformed position.

2. The method of claim 1 wherein the step of producing the digitized control frame further comprises:
   videoing using a video camera the body part to produce video images of the body part in an analog format;
   grabbing a frame of the video images in the analog format showing the body part in the control position; and
   digitizing the frame of the video image in the analog format and in the control position to produce the digitized control frame; and wherein the step of producing the digitized changed frame further comprises:
   videoing using a video camera the body part to produce video images of the body part in an analog format;
   grabbing a frame of the video images in the analog format showing the body part in the changed position; and
   digitizing the frame of the video image in the analog format and in the changed position to produce the digitized control frame.

3. The method of claim 1 wherein the step of producing the digitized control frame further comprises:
   taking a image via a still frame camera of the body part in the control position to produce a still frame image in a digital format thereby producing the digitized control frame; and wherein the step of producing the digitized changed frame further comprises:
   taking a image via a still frame camera of the body part in the changed position to produce a still frame image in a digital format thereby producing the digitized changed frame.

4. The method of claim 1 wherein the step of producing the digitized control frame further comprises:
   videoing using a video camera the body part to produce video images of the body part in an analog format and outputting the video images of the body part in the analog format;
   recording the video images in the analog format outputted via the video camera on a video medium in an analog format;
   playing back the video images recorded on the video medium for outputting the video images in the analog format;
   grabbing a frame of the video images in the analog format showing the body part in the control position; and
   digitizing the frame of the body part in the control position to produce the digitized control frame; and wherein the step of producing the digitized changed frame further comprises:
   videoing using a video camera the body part to produce video images of the body part in an analog format and outputting the video images of the body part in the analog format;
   recording the video images in the analog format outputted via the video camera on a video medium in an analog format;
   playing back the video images recorded on the video medium for outputting the video images in the analog format; and
   grabbing a frame of the video images in the analog format showing the body part in the changed position; and
   digitizing the frame of the body part in the changed position to produce the digitized changed frame.

5. The method of claim 1 wherein, prior to the step of comparing the digitized control frame with the digitized changed frame, the method further comprises:
   equalizing the digitized control frame to produce an equalized digitized control frame having an average intensity throughout and with a predetermined distribution of pixel intensity variations;
   equalizing the digitized changed frame to produce an equalized digitized changed frame having an average intensity throughout and with a predetermined distribution of pixel intensity variations.

6. The method of claim 1 wherein the step of comparing the digitized control frame with the digitized changed frame further comprises:
   subtracting out the common areas of pixel values between the digitized control frame and the digitized changed frame to produce a digitized compare frame.

7. The method of claim 1 wherein the step of comparing the digitized control frame with the digitized changed frame is further defined as producing a digitized compare frame, and wherein the step of comparing the digitized control frame and the digitized changed frame further comprises:
   counting the pixels in the digitized compare frame having a brightness value above a predetermined threshold level to provide the movement parameter indicating movement of the body part from the control position to the changed position.

8. The method of claim 1 wherein the step of comparing the digitized control frame with the digitized changed frame is further defined as producing a digitized frame, and wherein the step of comparing the digitized control frame and the digitized changed frame further comprises:

designating a control area of interest in the digitized compare frame; and counting the pixels having a brightness value above a predetermined threshold level in the area of interest.

9. The method of claim 1 wherein the step of comparing the digitized control frame with the digitized changed frame, is further defined as producing a digitized compare frame, and wherein the step of comparing the digitized control frame and the digitized changed frame further comprises:

designating a control area of interest in the digitized compare frame;

designating a changed area of interest in the digitized compare frame; and counting the pixels having a brightness value above a predetermined threshold level in the control level in the control area of interest and counting the pixels having a brightness value above a predetermined threshold level in the changed area of interest to provide a movement parameter indicating a difference in the movement in the control area of interest with respect to the changed area of interest.

10. The method of claim 1 wherein the step of comparing the digitized control frame with the digitized changed frame is further defined as producing a digitized compare frame, and wherein the step of comparing the digitized control frame and the digitized changed frame further comprises:

enhancing all of the pixels in the digitized compare frame having a brightness level above a predetermined value whereby all of the pixels having a brightness value above a predetermined value appear to be more bright.

11. The method of claim 1 wherein the step of comparing the digitized control frame with the digitized changed frame is further defined as producing a digitized compare frame, and wherein the step of comparing the digitized control frame and the digitized changed frame further comprises:

replacing all of the pixels in the digitized compare frame having a brightness value below a predetermined threshold level with a substantially null value and enhancing the pixels in the digitized compare frame having a brightness value above a predetermined threshold level whereby the pixels in the digitized compare frame having a brightness value above the predetermined threshold level appear more bright.

12. The method of claim 1 wherein the step of comparing the digitized control frame with each of the digitized changed frame further comprises producing a plurality of digitized compare frames with each digitized compare frame being produced as a result of the comparison of the digitized control frame with one of the digitized changed frames, and wherein the step of comparing each digitized changed frame with the digitized control frame further comprises:

enhancing all of the pixels in each of the digitized compare frames having a brightness level above a predetermined value whereby all of the pixels having a brightness value above a predetermined value appear to be more bright.

13. A method for detecting and quantifying surface deformations of a substantially stationary body part comprising:

producing a plurality of digitized frames of the substantially stationary body part as the body part is surface deformed from one surface deformed position to another surface deformed position, the deformation being a result substantially of muscular movements of the individual, and designating one of the digitized images as a digitized control frame and the remaining digitized frames as digitized changed frames; and comparing each digitized changed frame with the digitized control frame to determine shape changes over a defined surface area for each comparison, with each of the determined shape changes over the defined surface area being indicative of the surface deformations over the defined surface area of the body part between the digitized changed frame compared with the digitized control frame.

14. The method of claim 13 wherein the step of producing the digitized frames further comprises:

videoing using a video camera the body part as it is being moved from one position to another position to produce video images of the body part in an analog format;

grabbing a plurality of frames of the video images in the analog format showing the body part as the body part is being moved from one position to another position; and digitizing each of the frames to produce the digitized frames with one of the digitized frames being designated the digitized control frame.

15. The method of claim 13 wherein the step of producing the digitized frames including the digitized control frame further comprises:

taking a plurality of images via a still camera of the body part as the body part is being moved from one position to another position to produce a still frame image in a digital format thereby producing the digitized frames including the digitized control frame.

16. The method of claim 13 wherein the step of producing the digitized frames including the digitized control frame further comprises:

videoing using the video camera the body part as the body part is moved from one position to another position to produce video images of the body part in an analog format and outputting the video images of the body part in the analog format;

recording the video images in the analog format outputting via the video camera on a video medium in an analog format;

playing back the video images recorded on the video medium for outputting the video images in the analog format; and grabbing a plurality of frames of the video images in the analog format showing the body part as the body part is being moved from one position to another position; and digitizing the frames of the body part to produce the digitized frames including the digitized control frame.

17. The method of claim 13 wherein, prior to the step of comparing the digitized control frame with the digitized changed frame, the method further comprises:

equalizing the digitized control frame and the digitized changed frames to produce a digitized control frame and digitized changed frames with each having an average intensity throughout and with a predetermined distribution of pixel intensity variations.

18. The method of claim 13 wherein the step of comparing the digitized control frame with each of the digitized changed frame further comprises producing a plurality of digitized compare frames with each digitized compare frame being produced as a result of the comparison of the digitized control frame with one of the digitized changed frames, and wherein the step of comparing each digitized changed frame with the digitized control frame further comprises:
 designating a control area of interest in each of the digitized compare frame;
 counting the pixels having a brightness value above a predetermined level in each of the areas of interest.

19. The method of claim 13 wherein the step of comparing the digitized control frame with each of the digitized changed frame further comprises producing a plurality of digitized compare frames with each digitized compare frame being produced as a result of the comparison of the digitized control frame with one of the digitized changed frames, and wherein the step of comparing each digitized changed frame with the digitized control frame further comprises:
 replacing all of the pixels in each digitized compare frame having a brightness value below a predetermined threshold level with a substantially null value and enhancing the pixels in each of the digitized compare frames having a brightness value above a predetermined threshold level whereby the pixels in each of the digitized compare frames having a brightness value above the predetermined threshold level appear more bright.

20. A method for detecting surface deformation of a substantially stationary body part comprising:
 producing a digitized frame of the substantially stationary body part of the individual and designating a part of the frame as a digitized control frame and one other part of the frame as digitized changed frame; and
 comparing the digitized control frame with the digitized changed frame and determining surface deformation over a defined surface area of the body part from the digitized control frame to the digitized changed frame where the surface deformations between the digitized control frame and the digitized changed frame are produced by muscular movements of the individual.

* * * * *

UNITED STATES PATENT AND TRADEMARK OFFICE
CERTIFICATE OF CORRECTION

PATENT NO. : 5,214,711

DATED : May 25, 1993

INVENTOR(S) : Neely, et al.

It is certified that error appears in the above-identified patent and that said Letters Patent is hereby corrected as shown below:

Column 1, Line 55; after the, please delete "underlined" and substitute therefore --underlying--.

Column 1, Line 63; after and, please delete "Nech" and substitute therefore --Neck--.

Column 3, Line 23; after recorder, please delete "32" and subsittute therefore --36--.

Column 3, Line 60; after connected, please insert --to--".

Column 4, Line 55; after 40, please delete "is" and substitute --,--.

UNITED STATES PATENT AND TRADEMARK OFFICE
CERTIFICATE OF CORRECTION

PATENT NO. : 5,214,711

DATED : May 25, 1993

INVENTOR(S) : Neely, et al.

It is certified that error appears in the above-identified patent and that said Letters Patent is hereby corrected as shown below:

Column 4, Line 65; after digitized, please delete "frame" and substitute therefore --format--.

Column 7, Line 17; after relocated, please insert --and is--.

Column 7, Line 26; after processor 16, please delete "preforms" and substitute therefore --performs--.

Column 8, Line 5; after an, please delete "idea" and substitute therefore --ideal--.

Column 8, Line 7; after image, please delete "have" and substitute therefore --has--.

UNITED STATES PATENT AND TRADEMARK OFFICE
CERTIFICATE OF CORRECTION

PATENT NO. : 5,214,711

DATED : May 25, 1993

INVENTOR(S) : Neely, et al.

It is certified that error appears in the above-identified patent and that said Letters Patent is hereby corrected as shown below:

Column 8, Line 10; after by, please delete "their" and substitute therefore --its--.

Column 10, Line 28; after process (, delete "Different" and substitute therefore --Difference--.

Column 10, Lines 37-38; after pixels (, delete "Threshold" and substitute therefore --Thresholding--.

Colums 157 & 158, after ) of computer program, please delete "In the specific software set forth above, a logo screen initially was invoked and then a main menue was presented. The main menue in this case had four primary modes: the caputure mode; the load and store mode; the process mode and the configuration. When"

UNITED STATES PATENT AND TRADEMARK OFFICE
CERTIFICATE OF CORRECTION

PATENT NO. : 5,214,711

DATED : May 25, 1993

INVENTOR(S) : Neely, et al.

It is certified that error appears in the above-identified patent and that said Letters Patent is hereby corrected as shown below:

Column 159, Line 5, after configuration, insert --mode--.

Column 159, Line 55; after at the, please insert --same--.

Column 160, Line 36; please delete the "p" before The.

Column 160, Line 38; after sleeve, please delete "104" and substitute therefore --108--.

Column 167, Line 63; after taking, please delete "a" and substitute therefore --an--.

Column 168, Line 1; after taking, please delete "a" and substitute therefore --an--.

Column 169, Line 13; after frame, please delete the ","

UNITED STATES PATENT AND TRADEMARK OFFICE
CERTIFICATE OF CORRECTION

PATENT NO. : 5,214,711
DATED : May 25, 1993
INVENTOR(S) : Neely, et al.

It is certified that error appears in the above-identified patent and that said Letters Patent is hereby corrected as shown below:

Column 171, Line 23, after changed, please delete "frame" and substitute therefore --frames--.

Column 172, Line 17; after as, please insert --a--.

Signed and Sealed this

Twelfth Day of April, 1994

Attest:

BRUCE LEHMAN

Attesting Officer

Commissioner of Patents and Trademarks